(12) United States Patent
Hartsock

(10) Patent No.: US 10,754,693 B2
(45) Date of Patent: Aug. 25, 2020

(54) SECURE TRANSFER OF CONTROL OVER COMPUTATIONAL ENTITIES IN A DISTRIBUTED COMPUTING ENVIRONMENT

(71) Applicant: VMware, Inc., Palo Alto, CA (US)

(72) Inventor: Shawn Rud Hartsock, Pittsboro, NC (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 16/027,874

(22) Filed: Jul. 5, 2018

(65) Prior Publication Data

US 2020/0012527 A1  Jan. 9, 2020

(51) Int. Cl.
| | |
|---|---|
| *G06F 13/00* | (2006.01) |
| *G06F 9/50* | (2006.01) |
| *H04L 9/06* | (2006.01) |
| *G06F 9/455* | (2018.01) |
| *H04L 9/08* | (2006.01) |
| *G06F 16/18* | (2019.01) |

(52) U.S. Cl.
CPC ........ *G06F 9/5027* (2013.01); *G06F 9/45558* (2013.01); *G06F 16/1805* (2019.01); *H04L 9/0643* (2013.01); *H04L 9/0825* (2013.01); *G06F 2009/4557* (2013.01); *H04L 2209/38* (2013.01)

(58) Field of Classification Search
CPC ............. H04L 9/0637; H04L 29/08135; H04L 29/08153; H04L 29/08549; H04L 29/08882; H04L 67/10; H04L 67/1097; H04L 5/0032; H04L 9/0643; H04L 9/0825; H04L 2209/38; G06Q 20/06; G06F 3/067; G06F 11/3006; G06F 15/17331; G06F 9/5027; G06F 9/45558; G06F 16/1805; G06F 2009/4557
USPC ................................ 709/201, 230, 227–229
See application file for complete search history.

(56) References Cited

U.S. PATENT DOCUMENTS

| | | | |
|---|---|---|---|
| 10,396,997 B2* | 8/2019 | Brady | G06Q 50/18 |
| 2016/0321769 A1* | 11/2016 | McCoy | G06Q 30/0185 |
| 2018/0167217 A1* | 6/2018 | Brady | G06F 8/65 |

(Continued)

*Primary Examiner* — Kenneth R Coulter

(57) ABSTRACT

The current document is directed to methods and systems that establish secure, verifiable chains of control for computational entities within a distributed computing system. When a computational entity is first instantiated or introduced into the distributed computing system, public and private identities are generated for the computational entity and secure control is established over the computational entity by an initial controlling entity. Subsequently, control of the computational entity may be transferred from the initial controlling entity to a different controlling entity using a secure, three-party transaction that records the transfer of control in a distributed public ledger. As control of the computational entity is subsequently transferred to different controlling entities by secure three-party transactions, a chain of control from one controlling entity to another is established and recorded in the distributed public ledger. The computational entity is controlled by a single controlling entity at each point in time from the first instantiation or introduction into the distributed computing system to termination or removal from the distributed computing system.

20 Claims, 52 Drawing Sheets

(56) References Cited

U.S. PATENT DOCUMENTS

| | | | |
|---|---|---|---|
| 2018/0315143 A1* | 11/2018 | Rang | G06Q 50/186 |
| 2019/0034892 A1* | 1/2019 | Smith | G06N 5/043 |
| 2019/0043050 A1* | 2/2019 | Smith | H04L 9/3239 |
| 2019/0102837 A1* | 4/2019 | Smith | G06Q 20/223 |
| 2019/0268147 A1* | 8/2019 | Baird, III | G06F 16/182 |
| 2019/0349205 A1* | 11/2019 | Brady | G06F 8/65 |
| 2019/0370793 A1* | 12/2019 | Zhu | G06Q 20/401 |
| 2020/0005290 A1* | 1/2020 | Madisetti | H04L 9/3268 |

* cited by examiner

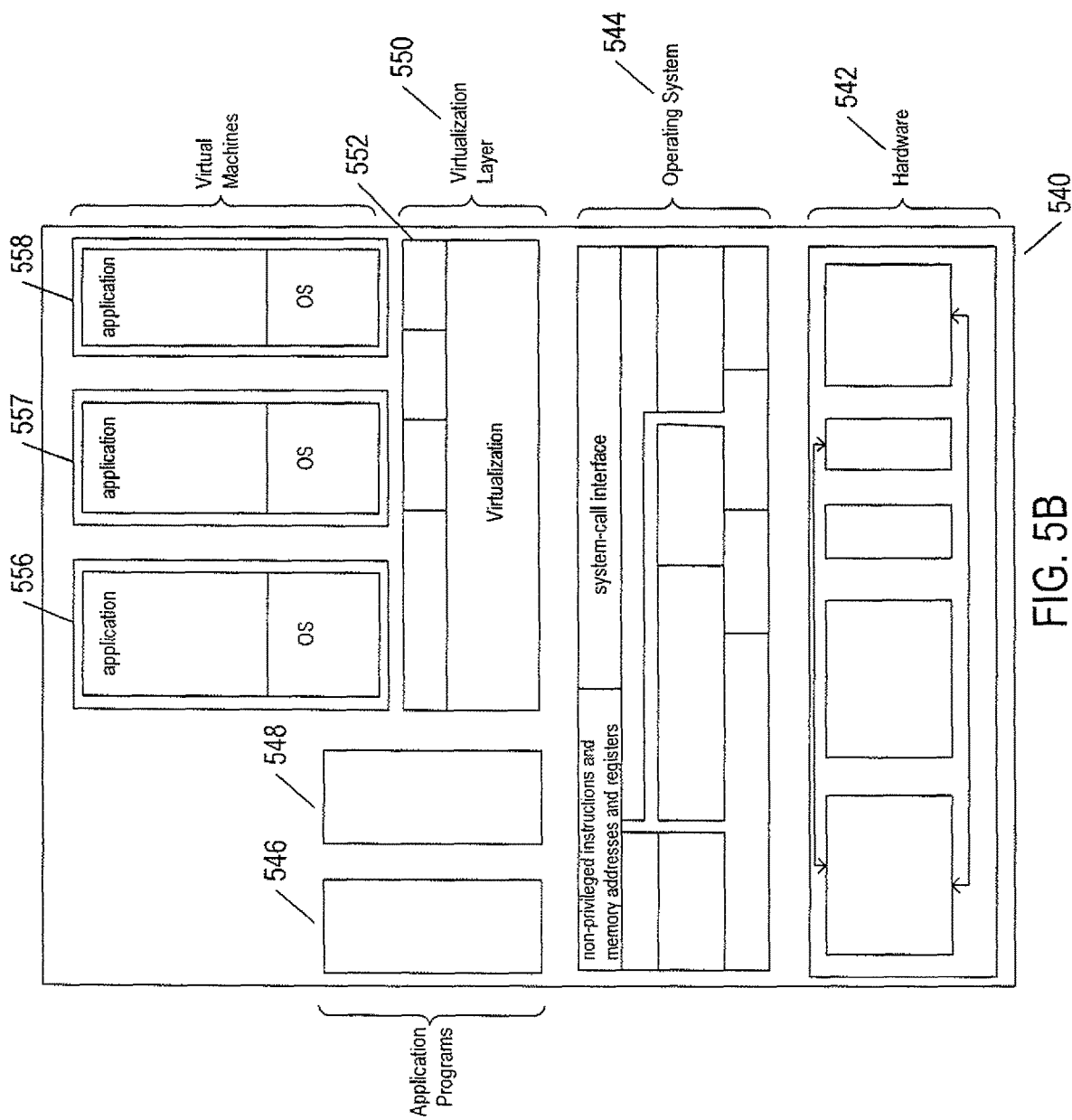

public/private key encryption select two distinct prime numbers $p$ and $q$
$n = pq$
$\varphi(n) = (p-1)(q-1)$
select $e$: $1 < e < \varphi(n)$ and $gcd(e, \varphi(n)) = 1$
compute $d$: $(d*e) \mod \varphi(n) = 1$
$k_e = (e, n)$    (public key)
$K_d = (d, n, p, q)$, $(d, p, q)$, or $(d, n)$    (private key)

to encrypt $M$
    $M \rightarrow m$: $0 < m < n$
    $C \leftarrow (OAEP(m))^e (\mod n)$
to decrypt $C$
    $m = OAEP^{-1}(C^d (\mod n))$
    $M \leftarrow m$ digital signature to sign:
    $m\text{Hash} = \text{hash}(M)$
    $EM = \text{transform}(m\text{Hash})$
    $signature = EM^d \mod n = DEC(EM, k_d)$
to verify:
    $m\text{Hash} = \text{hash}(M)$
    $EM' = signature^e (\mod n) = ENC(signature, k_e)$
    $m\text{Hash}' = \text{transform}^{-1}(EM')$
    when $m\text{Hash} = m\text{Hash}'$, $signature$ is verified symmetric-key encryption
Symmetric key $k$
$C \leftarrow ENC(M, k)$
$M \rightarrow DEC(C, k)$

FIG. 12 finite field $GF(p^n)$ has $p^n$ elements, where p is prime and n is the dimension $GF(p) = \{i \mid 0 \leq i < p\}$ —— 1402

$+, -, \times$ modulo $p$ $p = 5$
$GF(5) = \{0, 1, 2, 3, 4\}$
$1 + 4 = 1 + 4 \text{ modulo } 5 = 0$
$3 - 4 = 3 - 4 \text{ modulo } 5 = 4$
$2 \times 3 = 2 \times 3 \text{ modulo } 5 = 1$ ⎬ 1404 finite cyclic group $Q = \{i \mid 1 \leq i < q, q \in \mathbb{P}\}$ —— 1406

$q = 5$
$Q = \{1, 2, 3, 4\}$ $g = 2$ $g^0 = 1$
$g^1 = 2$
$g^2 = g \cdot g \bmod q = 4$
$g^3 = g^2 \cdot g \bmod q = 8 \bmod q = 3$
$g^4 = g^2 \cdot g^2 \bmod q = 1$
$g^5 = g^3 \cdot g^2 \bmod q = 2$
$g^6 = g^3 \cdot g^3 \bmod q = 4$
$g^7 = g^4 \cdot g^3 \bmod q = 3$ ⎬ 1404

FIG. 14

$\{(x,y) \in \mathbb{R}^2 \mid y^2 = x^3 + ax + b, 4a^3 + 27b^2 \neq 0\} \cup \{0\}$ G = abelian group — 1802

$$\left.\begin{array}{l} a,b \in G \rightarrow a + b \in G \\ a \in G \rightarrow a + 0 = 0 + a = a \\ (x,y) \in G \rightarrow (x,y) + (x,-y) = 0 \\ a,b \in G \rightarrow a + b = b + a \end{array}\right\} 1804$$

$P, Q \in G$ —— 1806

$$\left.\begin{array}{l} P = (x_1, y_1) \\ Q = (x_2, y_2) \\ R = (x_3, y_3) \end{array}\right\} 1808$$

1810 $\left\{\begin{array}{l} x_1 \neq x_2 \rightarrow \exists \{(i,j) \in \mathbb{R}^2 \mid j = mi + b\} = L, P \in L, Q \in L, m = \dfrac{y_1 - y_2}{x_1 - x_2}, \\ \exists R \in L, R \in G, x_3 = m^2 - x_1 - x_2, y_3 = y_1 + m(x_3 - x_2), \\ P + Q = (x_3, -y_3) = -R \end{array}\right.$ 1812 $\left\{\begin{array}{l} P, Q \in G, P = Q \rightarrow \exists \{(i,j) \in \mathbb{R}^2 \mid j = mi + b\} = L, P \in L, Q \in L, \\ m = \dfrac{3x_1^2 + a}{2y_1}, \exists R \in L, R \in G, x_3 = m^2 - x_1 - x_2, \\ y_3 = y_1 + m(x_3 - x_2), P + Q = (x_3, -y_3) = -R \end{array}\right.$ $$\left.\begin{array}{l} 1P = P \\ 2P = P + P \\ 3P = P + P + P \\ \\ nP = P + P + \ldots + P \text{ where } n \in \mathbb{N} \end{array}\right\} 1814$$

1816 $\left\{\begin{array}{l} \text{given } n \text{ and } P, Q = nP \text{ can be computed in time } O(\log n) \\ \text{given } P \text{ and } Q, \text{ finding } n \text{ such that } Q = nP \text{ is generally not easy} \end{array}\right.$ $\mathbb{Z}_p = GF(p) = \mathbb{F}_p = \{0, \ldots, p-1\}$, where $p \in P$ —— 1818

$$\left.\begin{array}{l} a \in \mathbb{F}_p \rightarrow \exists b \text{ such that } a \cdot b = 1 \\ a \in \mathbb{F}_p \rightarrow a + 0 = 0 + a = a \\ a,b \in \mathbb{F}_p \rightarrow a \square b \in \mathbb{F}_p, \text{ where } \square = \{+, -, \cdot\} \end{array}\right\} 1820$$

FIG. 18

$$F = \{(x,y) \in \mathbb{F}_p \times \mathbb{F}_p \mid y^2 = x^3 + ax + b \pmod{p}, 4a^3 + 27b^2 \neq 0 \pmod{p}\} \cup \{0\}$$

$$\left.\begin{array}{l} P, Q \in F \\ P = (x_1, y_1) \\ Q = (x_2, y_2) \\ R = (x_3, y_3) \end{array}\right\} 2004$$

— 2002

$$\left.\begin{array}{l} m = \begin{cases} x_1 \neq x_2, & \dfrac{y_1 - y_2}{x_1 - x_2} \mod p = (y_1 - y_2)(x_1 - x_2)^{-1} \mod p \\ x_1 = x_2, & (3x_1^2 + a)(2y_1)^{-1} \mod p \end{cases} \\ \\ x_3 = (m^2 - x_1 - x_2) \mod p \\ y_3 = (y_1 + m(x_3 - x_1)) \mod p \\ P + Q = (x_3, -y_3) \end{array}\right\} 2006$$

$$\left.\begin{array}{l} 1P = P \\ 2P = P + P \\ 3P = P + P + P \\ \\ nP = \underbrace{P + P + \ldots + P}_{n \text{ terms}}, \text{ where } n \in \mathbb{N} \end{array}\right\} 2004$$

$kP$ = cyclic group $C \subset F$, where $P$ = generator — 2010

$|C| = n \rightarrow |F| \mod n = 0$ —— 2012

$h = |F| / |C|$ = cofactor of $C$ —— 2014 — 2016

$n \in \mathbb{P}$, $G = hP$, $nG = 0 \rightarrow G = 0$ OR $G$ = generator for $C$, where $|C| = n$ $Q = kP$, where $Q$ and $P$ known, is hard computationally — 2018

$C$ described by $p, a, b, G, n, h$ — 2020

FIG. 20

SECURE TRANSFER OF CONTROL OVER COMPUTATIONAL ENTITIES IN A DISTRIBUTED COMPUTING ENVIRONMENT

TECHNICAL FIELD

The current document is directed to distributed computing systems and, in particular, to methods and systems that establish a verifiable chain of control with respect to various types of computational entities within a distributed computing system.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computing systems, as a result of which owners, administrators, and users of distributed computing systems and consumers of computational resources provided by distributed computing systems increasingly rely on automated and semi-automated management and computational-resource-distribution subsystems to organize the activities of many users and computational-resource consumers and to control access to, and use of, computational resources within distributed computing systems.

One problem domain that has emerged in the area of distributed computing systems concerns control over various computational entities, including virtual machines, processor-controlled hardware devices, network-attached data-storage devices, and other such computational entities. Although, in modern distributed computing systems, many security technologies are employed to secure computational entities from misuse or hijack, the complexities of modern distributed computing systems and the exposure of internal components of modern distributed computing systems to network access often results in many different types of security vulnerabilities that can be exploited by malicious parties. When external malicious parties succeed in acquiring management control over computational entities within a distributed computing system, for even relatively brief periods of time, the security of the distributed computing system may be severely compromised, leading to unauthorized access to distributed-computing-system data, data loss, and unauthorized operations that can have severe, world-wide repercussions.

SUMMARY

The current document is directed to methods and systems that establish secure, verifiable chains of control for computational entities within a distributed computing system. When a computational entity is first instantiated or introduced into the distributed computing system, public and private identities are generated for the computational entity and secure control is established over the computational entity by an initial controlling entity. Subsequently, control of the computational entity may be transferred from the initial controlling entity to a different controlling entity using a secure, three-party transaction that records the transfer of control in a distributed public ledger. As control of the computational entity is subsequently transferred to different controlling entities by secure three-party transactions, a chain of control from one controlling entity to another is established and recorded in the distributed public ledger. The computational entity is controlled by a single controlling entity at each point in time from the first instantiation or introduction into the distributed computing system to termination or removal from the distributed computing system.

BRIEF DESCRIPTION OF THE DRAWINGS

FIGS. 5A-D illustrate two types of virtual machine and virtual-machine execution environments.

FIG. 12 summarizes three basic encryption-based techniques.

FIG. 14 illustrates various types of mathematical entities that arise in finite-field arithmetic.

FIG. 18 provides expressions that formally describe the group of elements generated from an elliptic curve.

FIG. 20 provides expressions that formally describe the finite field of elements generated from an elliptic curve.

DETAILED DESCRIPTION

Figure 1:
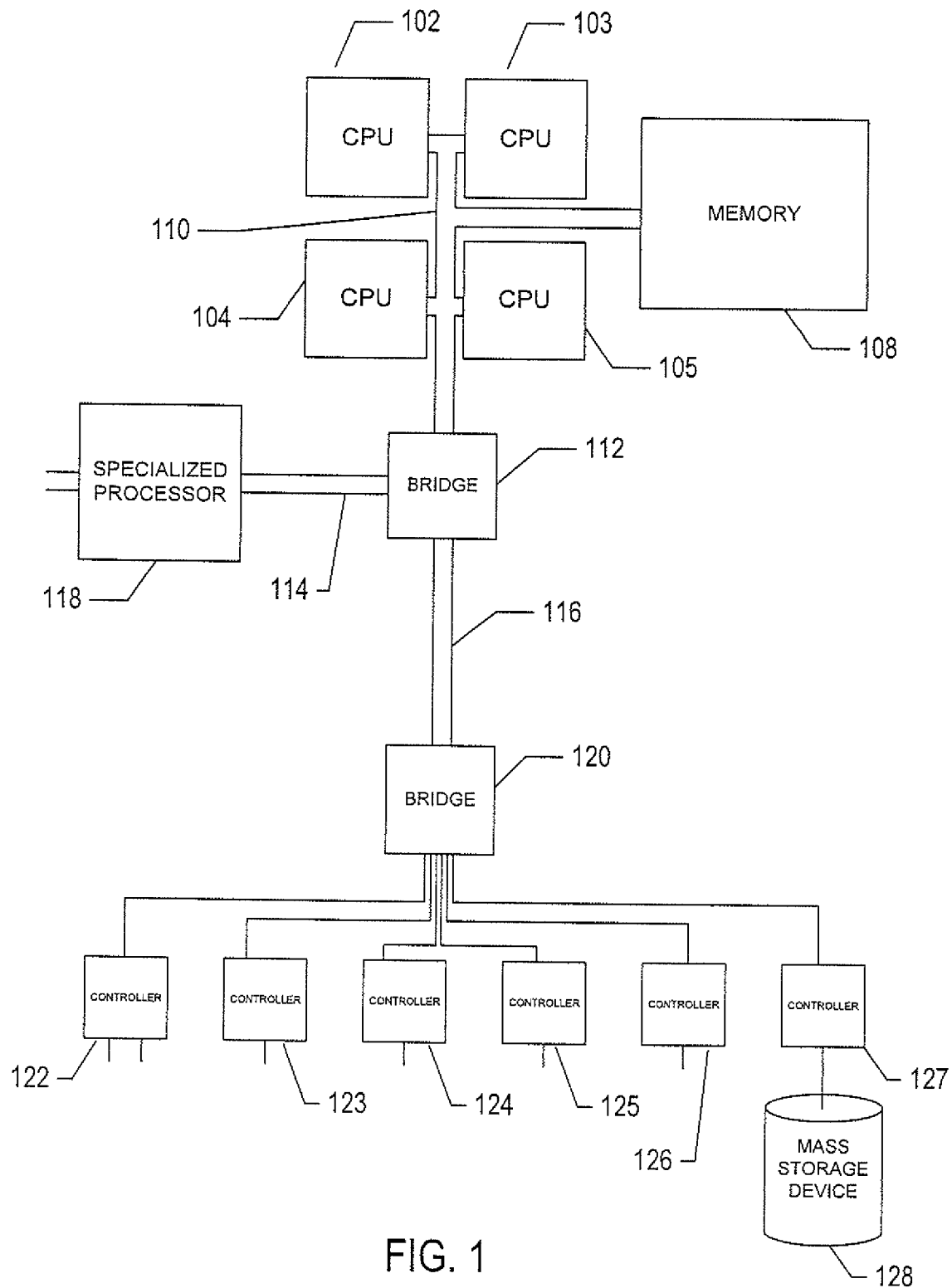
FIG. 1 provides a general architectural diagram for various types of computers.

The current document is directed to methods and systems that establish secure, verifiable chains of control for computational entities within a distributed computing system. In a first subsection, below, a detailed description of computer hardware, complex computational systems, and virtualization is provided with reference to FIGS. 1-10. In a second subsection, an overview of cryptographic methods is provided with reference to FIGS. 11-25. A following third subsection provides an overview of trusted platform modules, with reference to FIG. 26, followed by a fourth subsection that provides an overview of blockchain ledgers, with reference to FIGS. 27-34. Finally, the methods and systems to which the current document is directed is provided in a fifth subsection, with reference to FIGS. 35-40.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
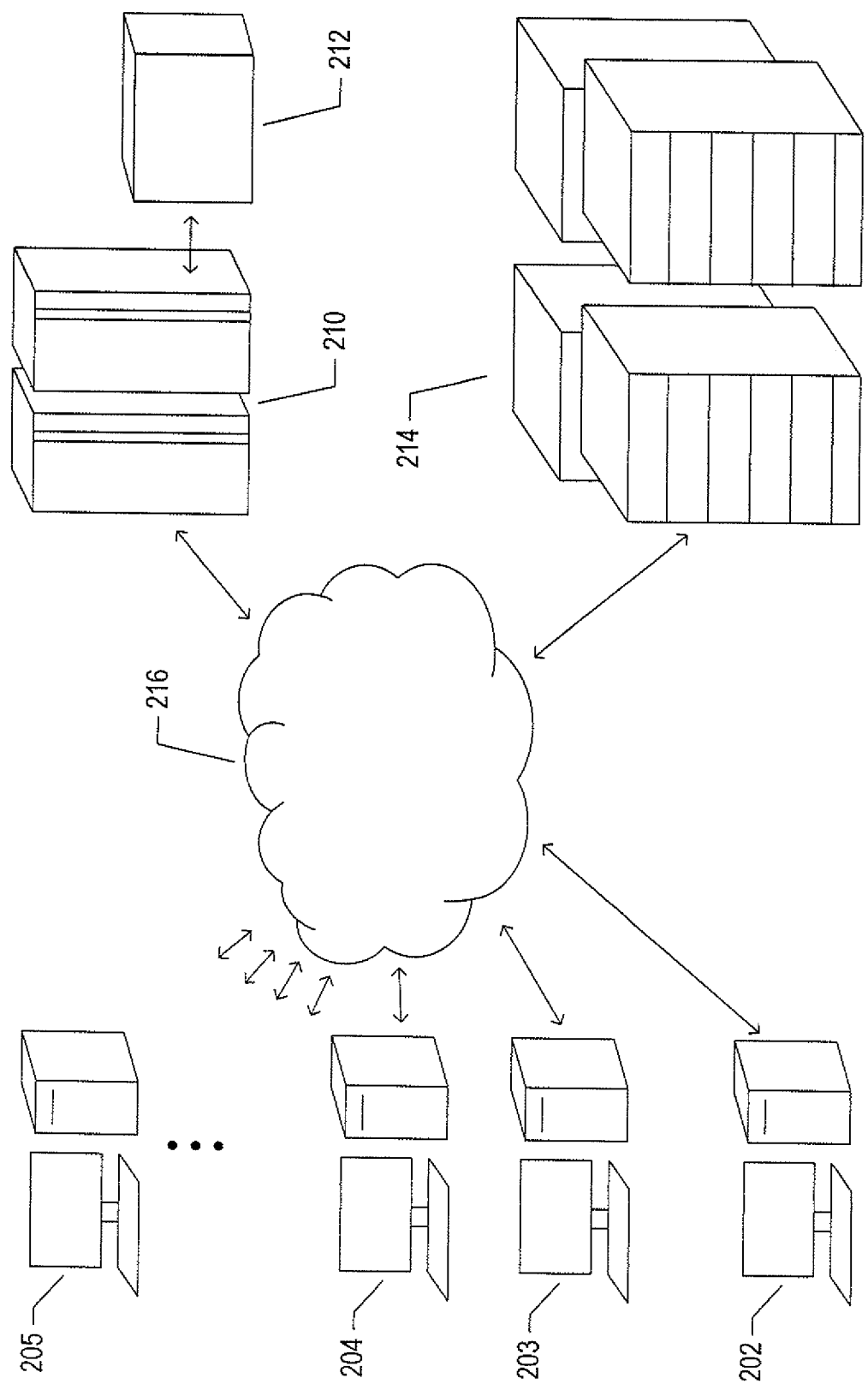
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
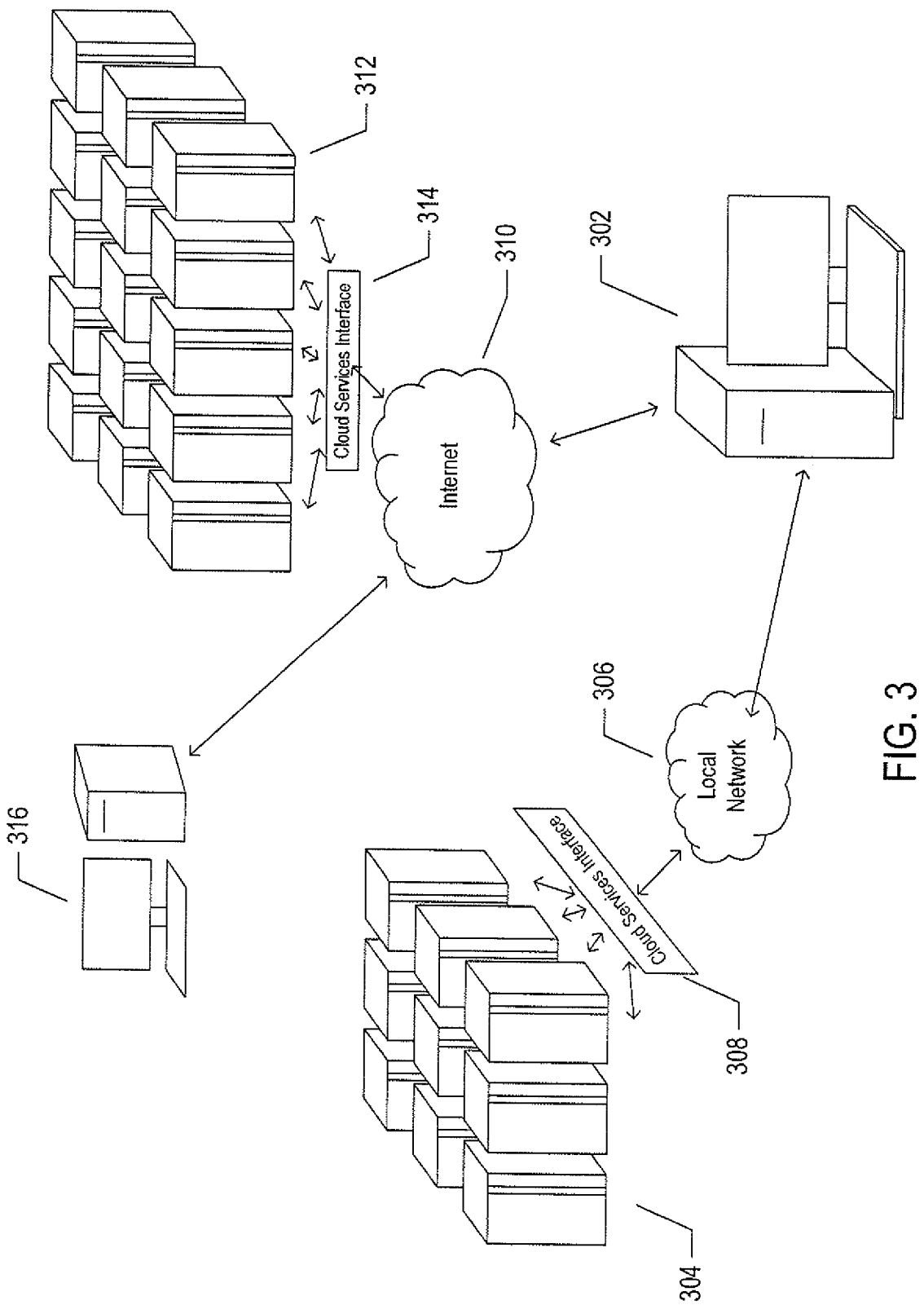
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
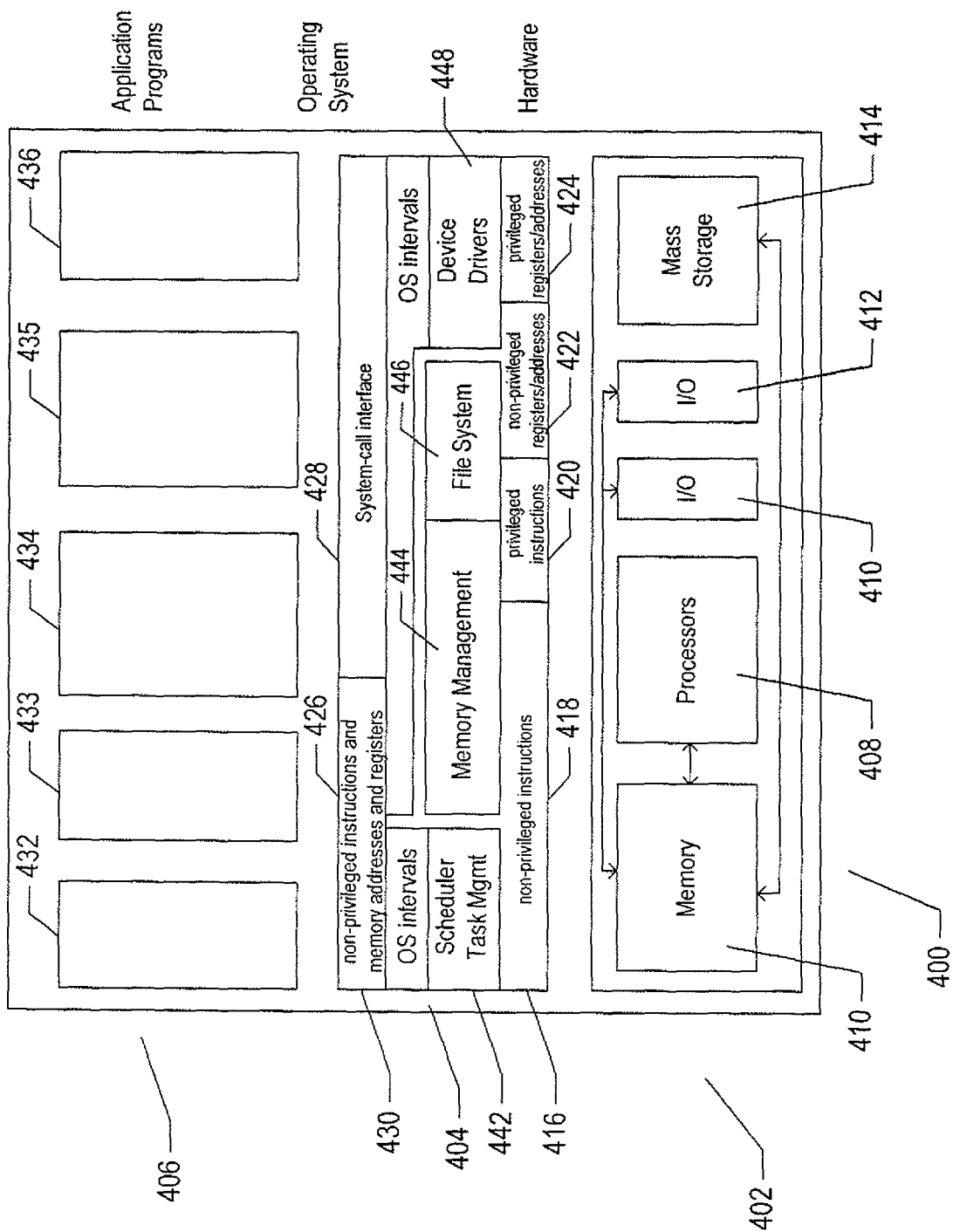
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
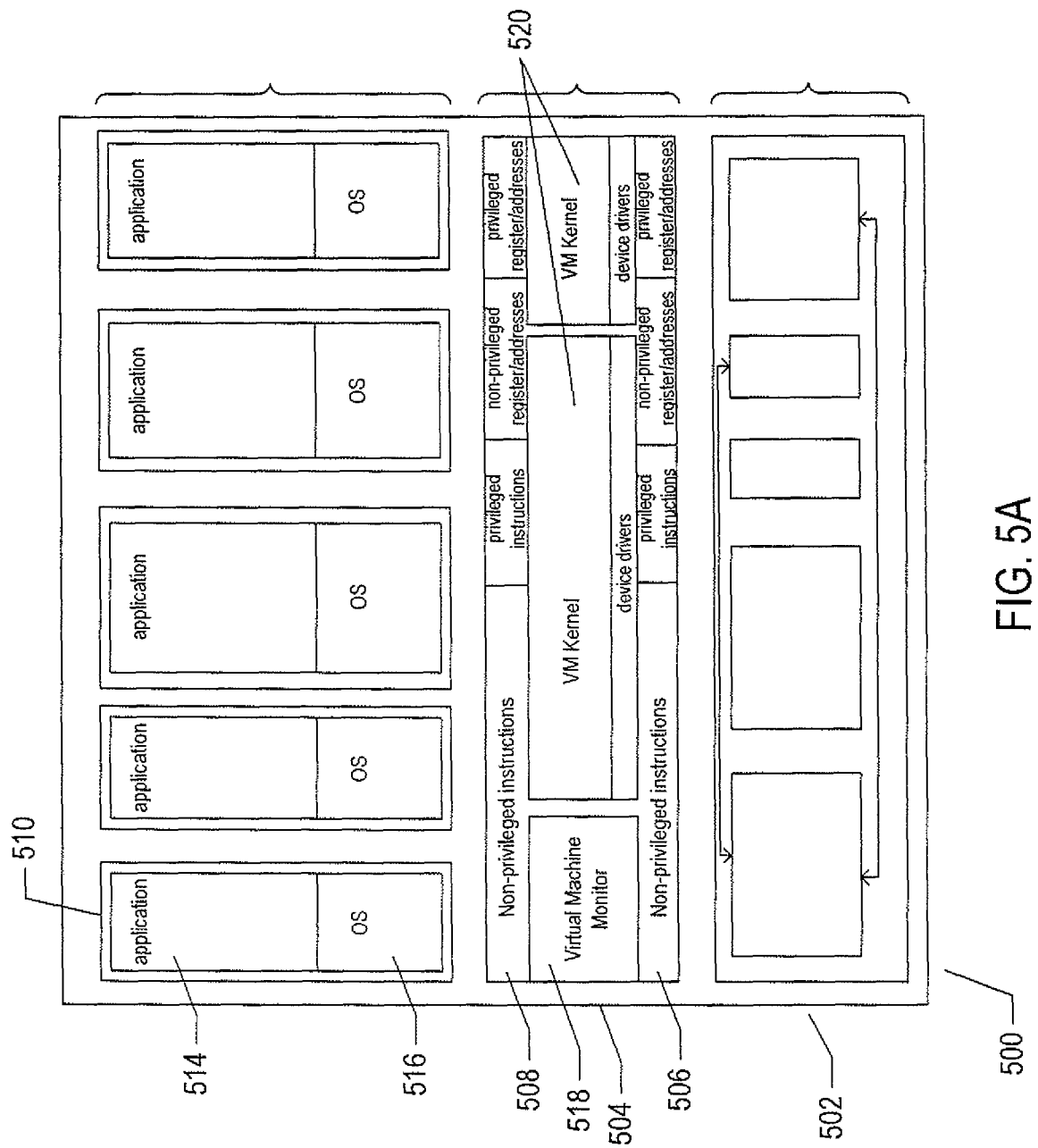

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
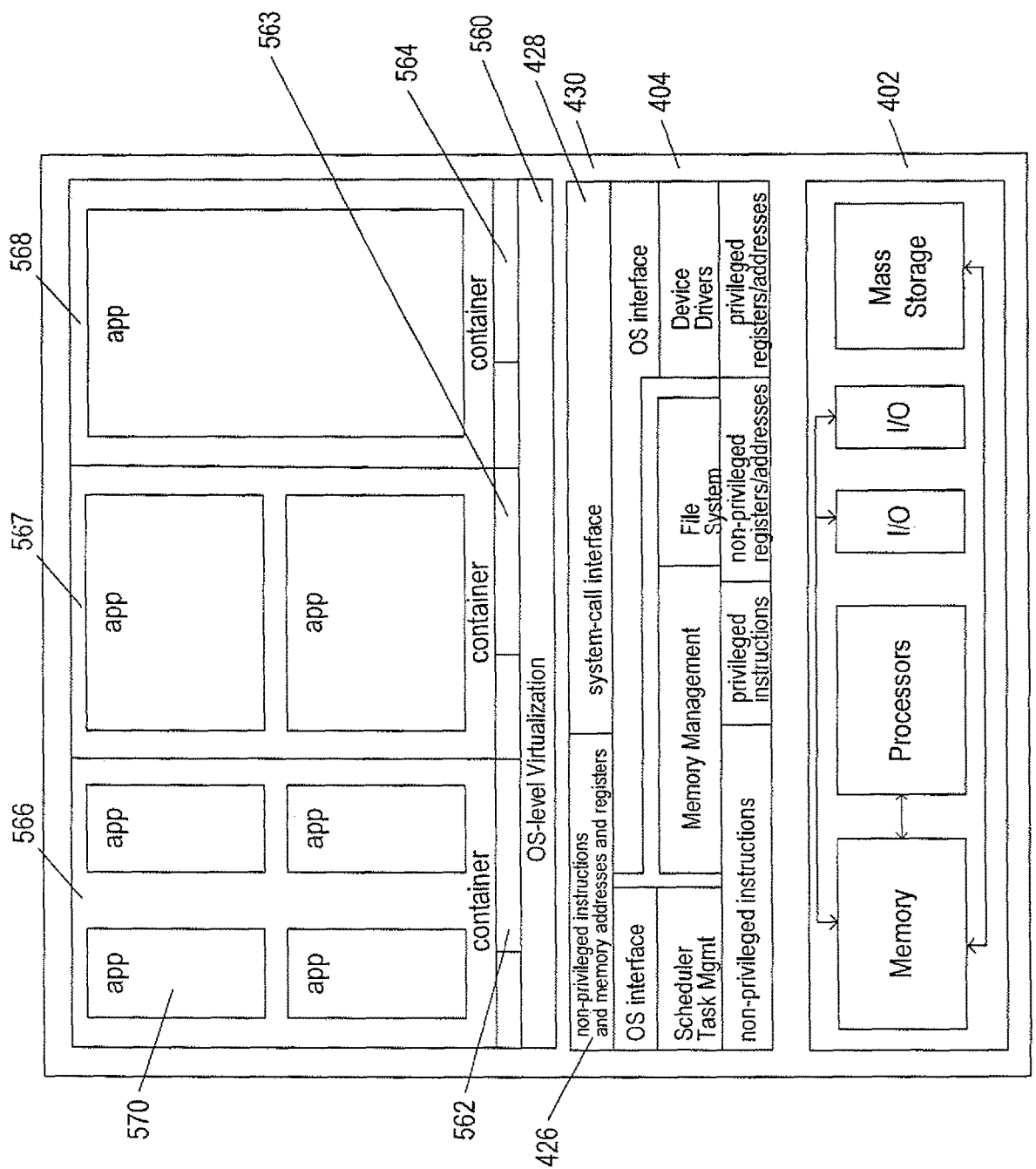

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
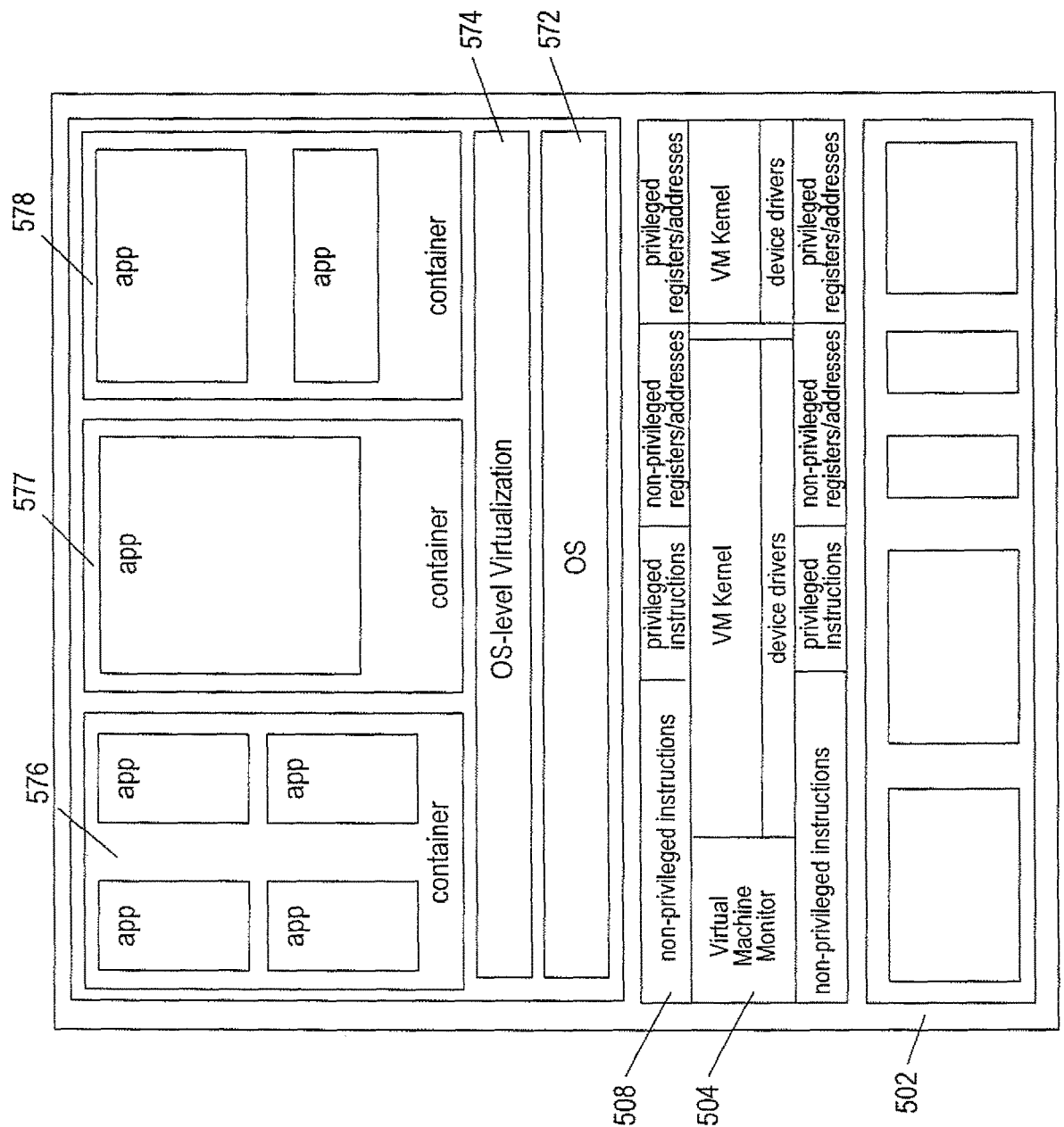

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
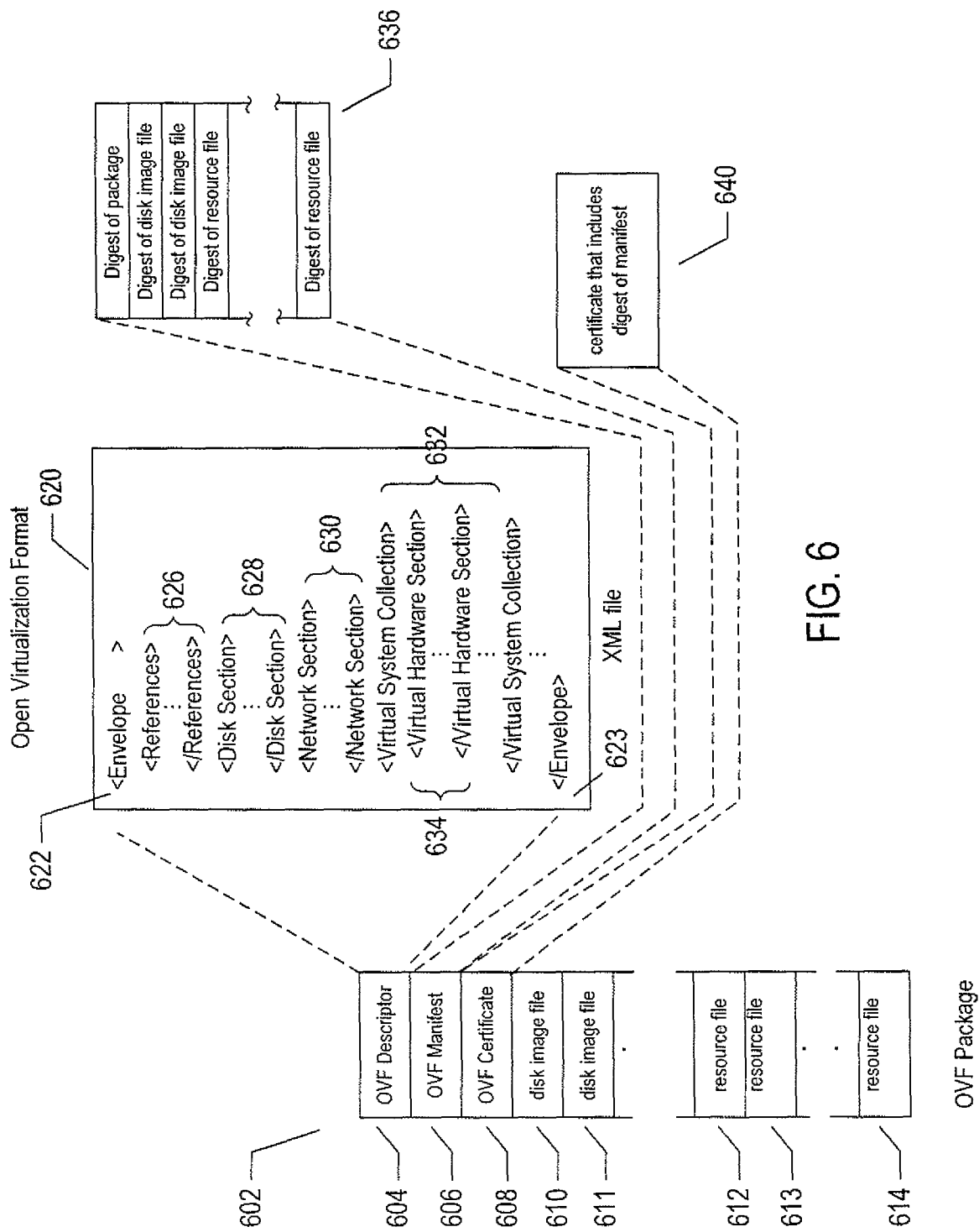
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
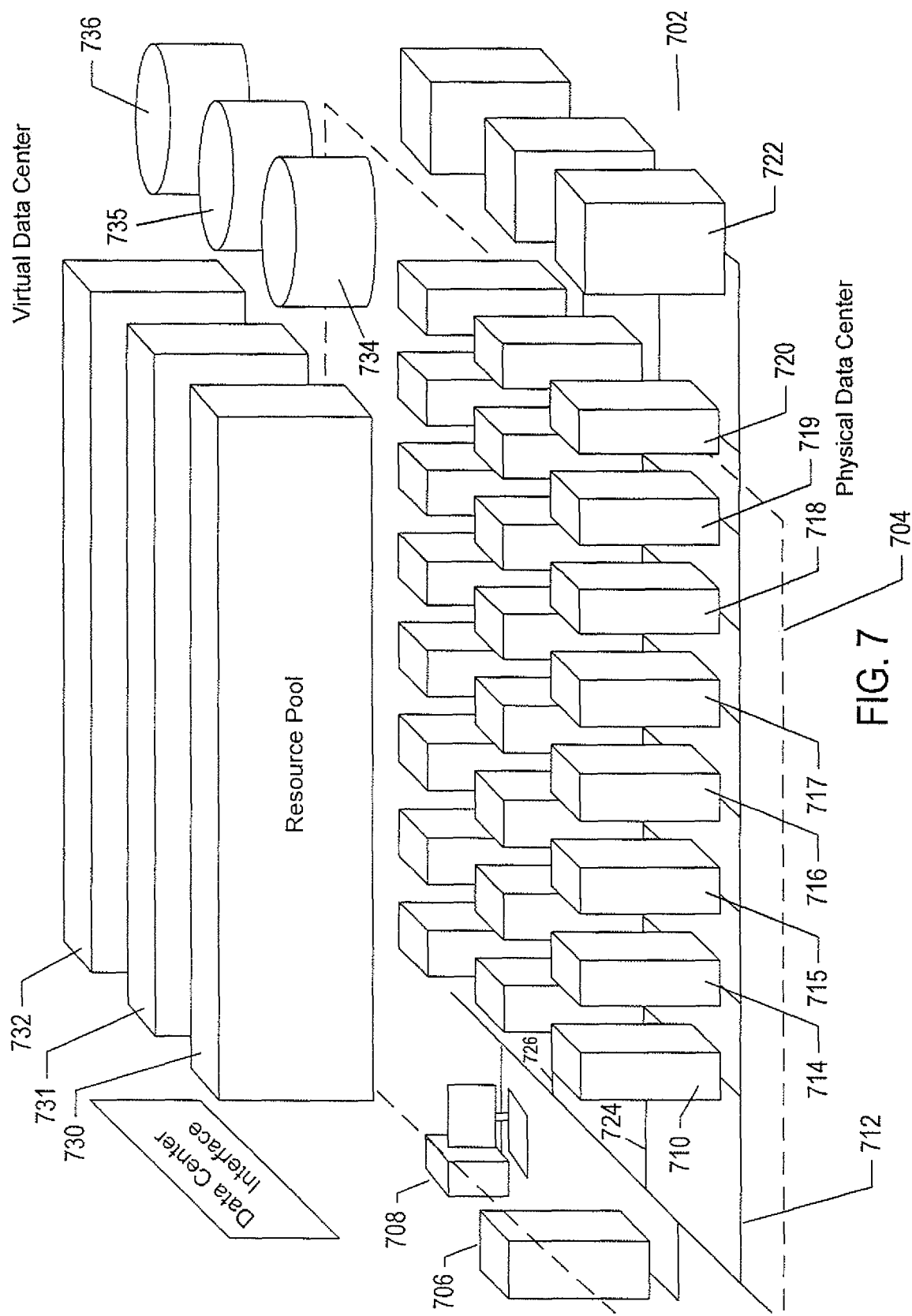
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers miming on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
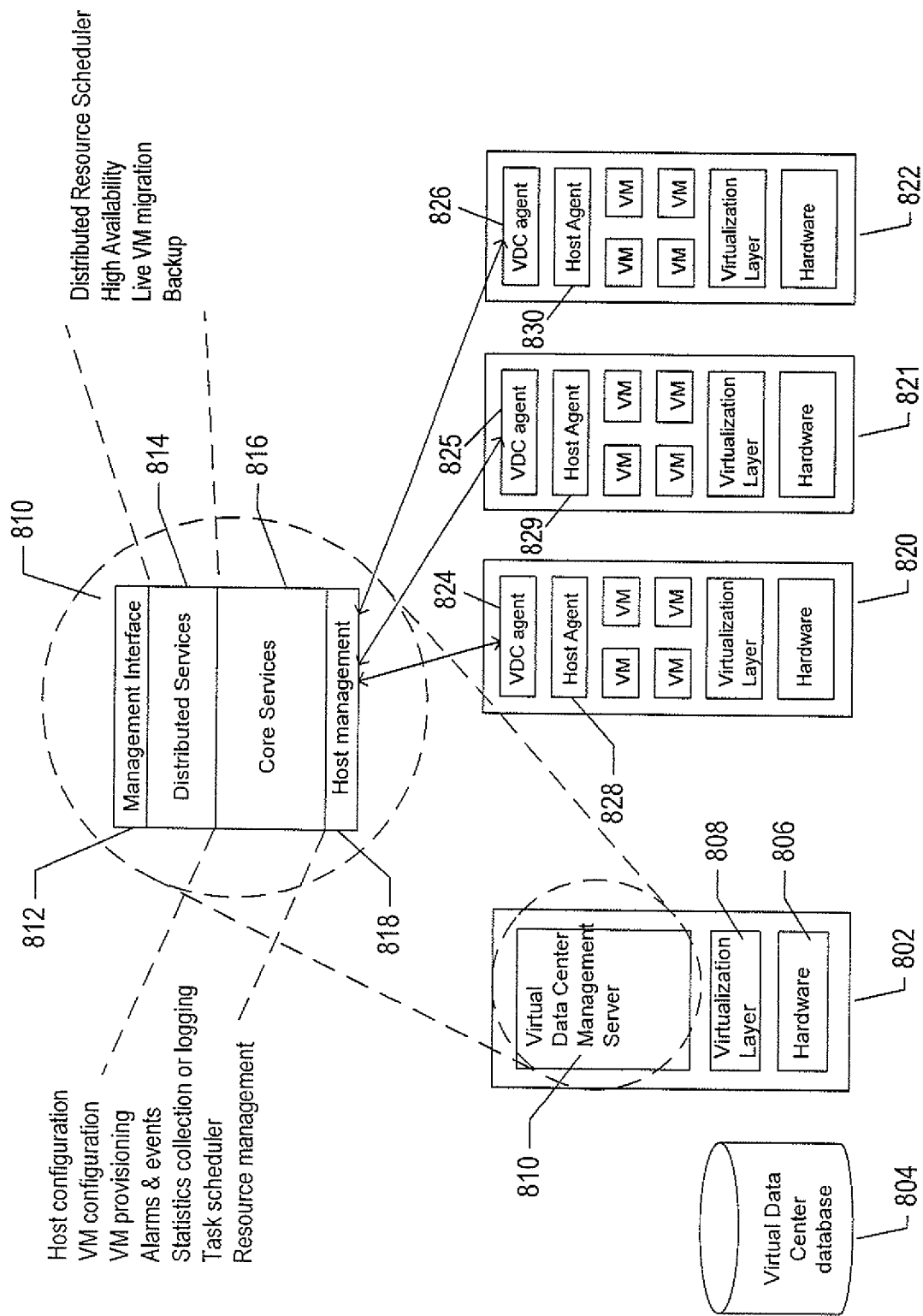
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
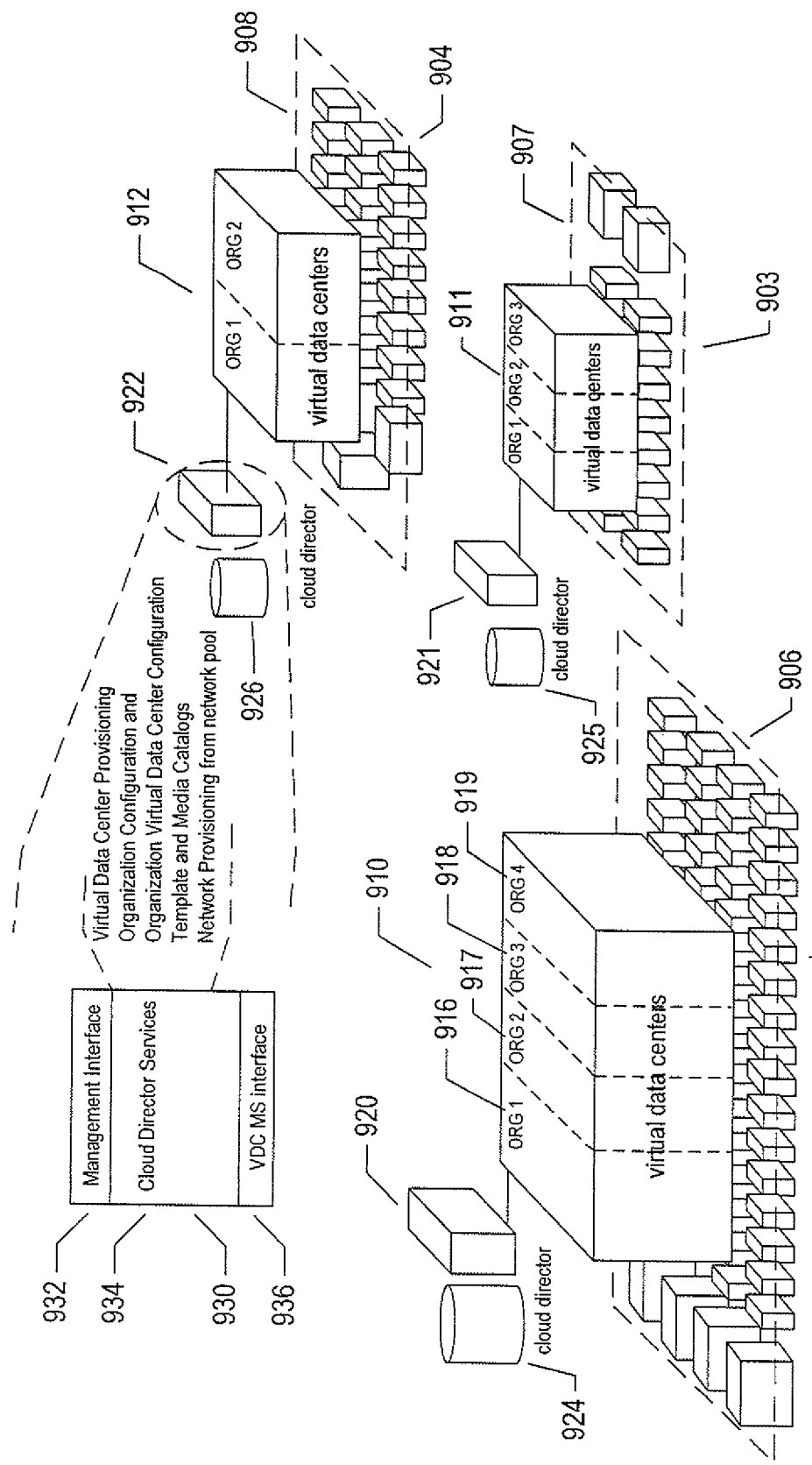
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
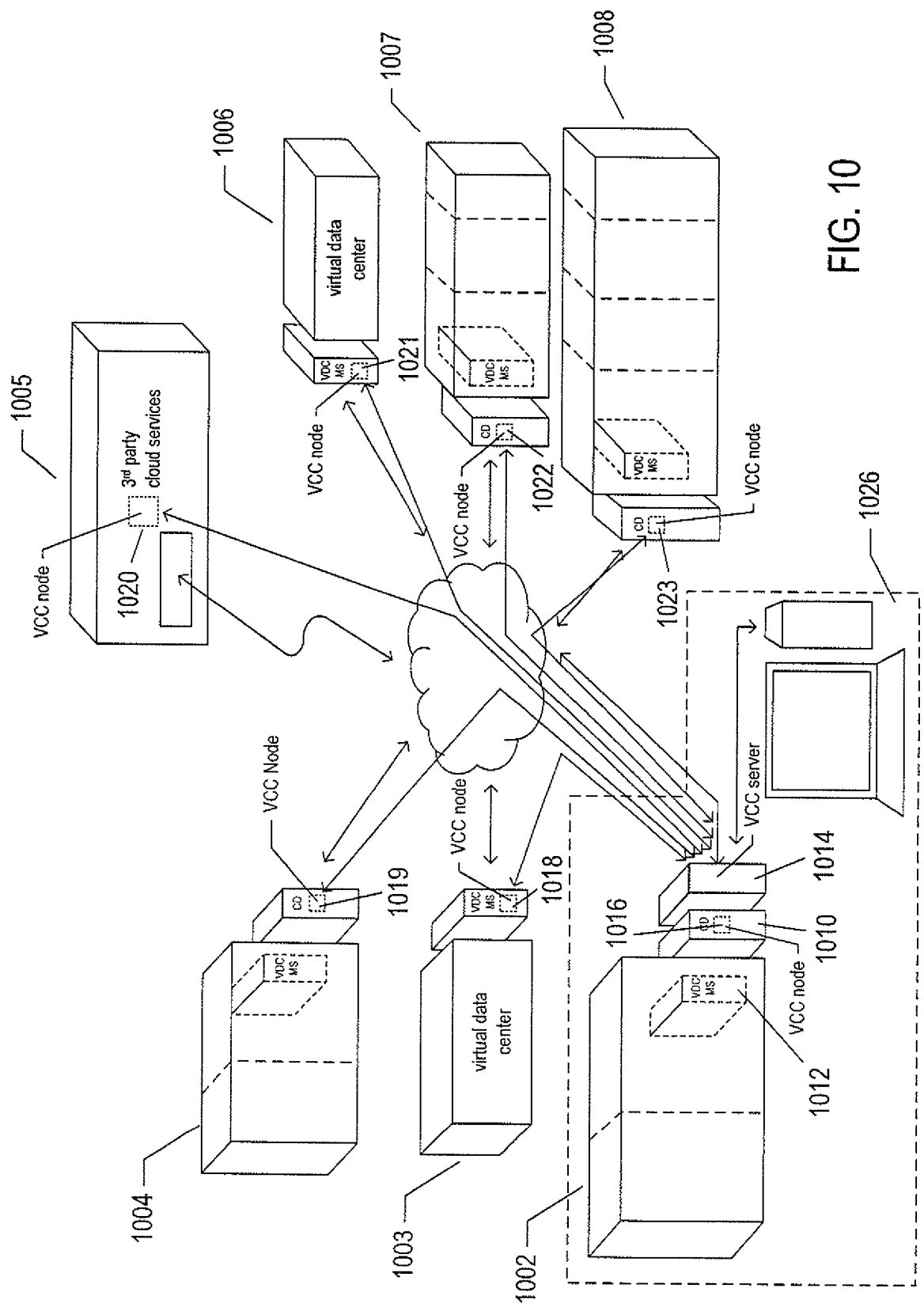
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Overview of Cryptographic Methods

Figure 11:
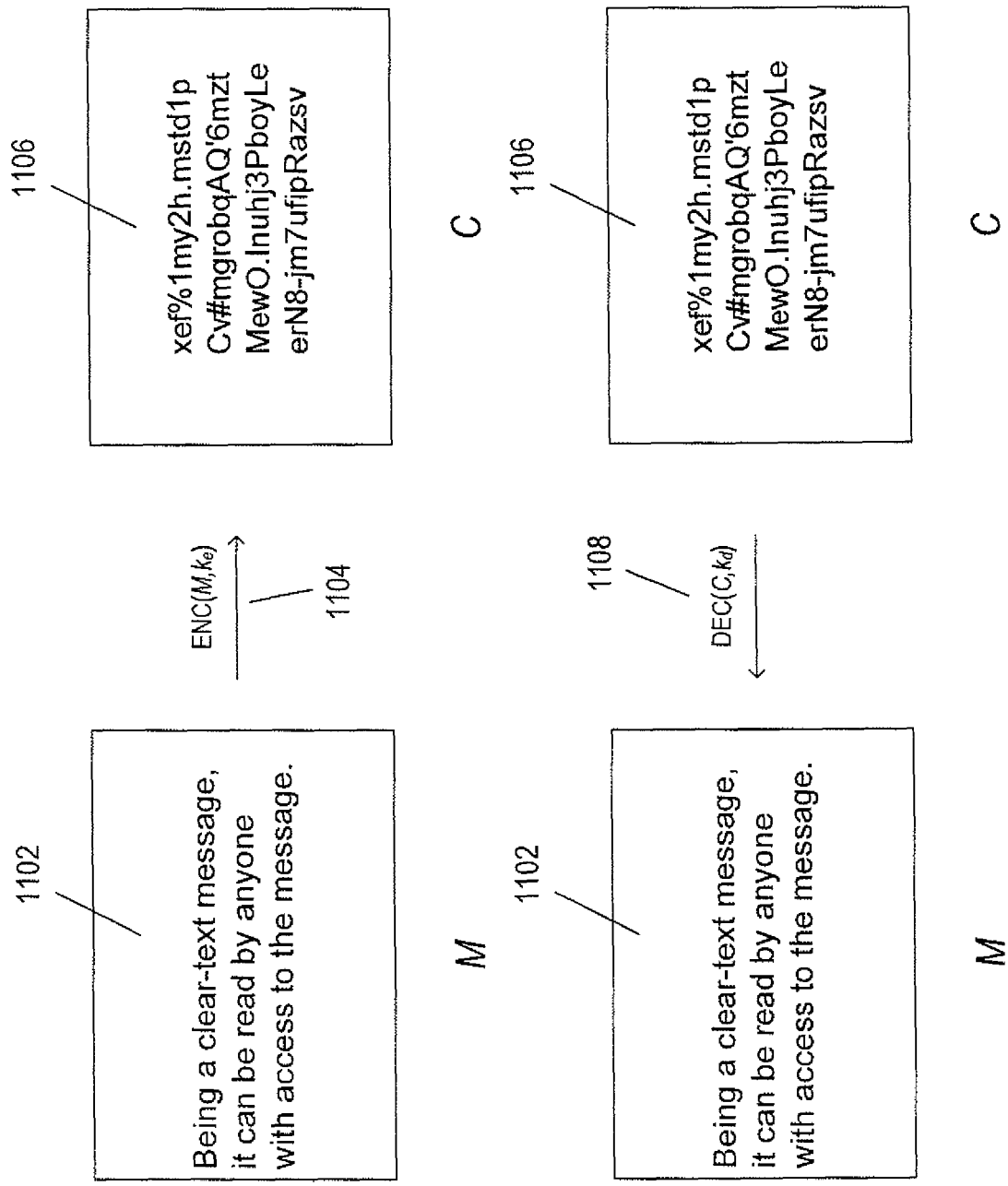
FIG. 11 illustrates encryption and decryption processes.

Encryption methods transform a digitally encoded sequence of symbols, including text and numerical data, into a corresponding encrypted symbol sequence that cannot be straightforwardly read or interpreted, in general, but that contains the same information that is contained in the original symbol sequence that was encrypted to produce the encrypted symbol sequence. A party possessing a decryption key or other decryption-facilitating information can carry out an inverse transformation to regenerate the original symbol sequence. FIG. 11 illustrates encryption and decryption processes. As mentioned above, encryption is used to transform a clear-text message or symbol string into encrypted form that cannot be interpreted by normal symbol-string interpretation algorithms, such as by reading natural-language statements. Decryption is the inverse process by which encrypted symbol strings are transformed back to clear-text form. In FIG. 11, an initial natural-language message M 1102 is transformed, by encryption 1104, to an encrypted message C 1106. In the current discussion, the expression "ENC(M, $k_e$)" stands for encryption of message M using encryption key $k_e$. By comparing clear-text message M with encrypted message C, it is clear that the meaning of encrypted message C cannot be extracted by normal text-processing means. Instead, an encrypted message C needs to be first reverse-transformed back to a clear-text message by the decryption process 1108. The expression "DEC(C, $k_d$)" stands for decryption of encrypted message C using decryption key $k_d$. This can be alternatively expressed as "$ENC^{-1}(C, k_d)$."

FIG. 12 summarizes three different encryption-based techniques referred to in the following discussions. Public-key/private-key encryption is widely used in commercial transactions and information-exchange protocols. One commercially successful public-key/private-key cryptosystem, also referred to as an "asymmetric" cryptosystem because different keys are used by the sender and the receiver, is named the "RSA" cryptosystem. The name RSA comprises the first letters of the last names of the inventors of the method: Ron Rivest, Adi Shamir, and Leonard Adleman. In this asymmetric cryptosystem, pairs of encryption/decryption keys are generated. In general, one member of the encryption-key pair is publicly distributed, and is referred to as the "public key," while the other member of the encryption-key pair is held in secret by the key-pair-owning party and is referred to as the "private key" or "secret key." In normal usage, anyone can access the public key and encrypt a message using the public key, but only the party in possession of the private key can decrypt and read the encrypted message.

For certain types of secure communications, two parties exchange their public encryption keys so that each party can encrypt a message and transmit the encrypted message to the other party for decryption and reading by the other party. However, because of the relatively high computational overhead for asymmetric cryptography, protocols such as the transport layer security ("TLS") protocol, the secure socket layer ("SSL") protocol, and the SSH protocol usually begin a session with a handshake step in which public/private cryptography is initially used to establish a symmetric key that can be subsequently used more computationally efficiently for message encryption and decryption. Both parties use the symmetric key for the remainder of the session. The symmetric key is referred to as a "session key."

To generate an encryption/decryption key pair for the RSA cryptosystem, two different prime numbers p and q are first selected, and the product n=pq is computed and saved. Next, the Euler totient function $\varphi(n)$ is computed, which has the value (p−1)(q−1) when p and q are both prime. Then, an integer e in the range (1, $\varphi(n)$) is selected such that the greatest common divisor of e and $\varphi(n)$ is 1. A corresponding integer d is computed such that (d·e) mod $\varphi(n)$=1. The public encryption key $k_e$ is the pair of integers (e, n) and the private, or secret, decryption key $k_d$ can be the four-tuple (d, n, p, q), the three-tuple (d, p, q), or the pair (d, n). To encrypt a message M, M is first transformed to an integer m in the range (0, n), the integer m is then subjected to the Optimal Asymmetric Encryption Padding ("OAEP") randomized padding scheme, and the result is then raised to the power e modulo n or, as shown in FIG. 12:

$$C = (OAEP(m))^e \bmod n.$$

To decrypt the encrypted message C, the integer m is recovered by applying the inverse of the randomized padding scheme to the result of decrypting the message C by raising C to the power d modulo n, as shown in FIG. 12:

$$m = OAEP^{-1}(C^d \bmod n).$$

Finally, the integer in is transformed back into message M by the inverse of the forward transformation of M to in, performed as the first step of the encryption method. In certain cases, the initial transformation and final inverse transformations are omitted. As discussed above, because the number m is generally large, the above described operations need to be carried out on byte sequences programmatically, rather than by using single hardware arithmetic operations. In addition, encryption is generally carried out on sequential blocks of data into which the message is partitioned.

The RSA encryption/decryption method can also be used to digitally sign a message to provide authentication of the integrity of a transmitted message. Digital signing relies on the fact that, for a given initial value less than n, encryption is the inverse operation of the decryption operation, and vice versa. Digital signing proceeds as follows. First, a one-way cryptographic hash function is applied to the message M to produce a hash value mHash, referred to as a "hash digest" of the message. Then, an optional transform may be applied to mHash to generate a further encoded message EM. Alternatively, the hash digest can be directly used as EM. Next, a signature for the message is generated by raising EM to the power d modulo n, equivalent to applying the RSA decryption method to EM using secret key $k_d$. This signature is appended to message M, along with the public encryption key, $k_e$, to be used to recover EM from the signature. A recipient of the message can verify the message by first generating mHash by applying the same one-way cryptographic hash function to the message M. The recipient next applies the RSA encryption method to the signature to generate a value EM' or, as expressed in FIG. 12:

$$EM'=signature^e(\bmod\ n)=ENC(signature,k_e).$$

Next, in the case that the optional transform was applied to generate the signature, a corresponding reverse transform is applied to EM to generate mHash'. When mHash' is equal to mHash, the hash value initially generated by applying the one-way cryptographic hash function to message M, the signature is verified. Note that the signer of the message uses the signer's private key, while the message can be verified by anyone with access to the signer's corresponding public key. Verification proves that the text of a received message M is identical to the text in the original message M that was signed by a party possessing the secret key $k_d$. A digitally signed message generally comprises three elements: message contents M, a signature, and a public key used to recover a hash digest from the signature that is compared to a hash digest computed for M in order to verify M by a recipient of the message.

Finally, other types of encryption/decryption methods employ a single key for both encryption and decryption. These methods are referred to as "symmetric key" cryptosystems. In this case:

$$C \leftarrow ENC(M,k)$$

$$M \leftarrow DEC(C,k).$$

Symmetric-key encryption uses a single key k for both encryption and decryption. There are many different cryptosystems for symmetric key encryption. One example is the Advanced Encryption Standard ("AES"). In general, symmetric-key encryption employs a series of deterministic operations for encryption that can be inverted for decryption. For symmetric-key encryption, the encryption key k is held in secret by both communicating parties since, once revealed, a message encrypted using the key k can be readily decrypted when k becomes known and when the particular symmetric-key-encryption method is also known.

Figure 13:
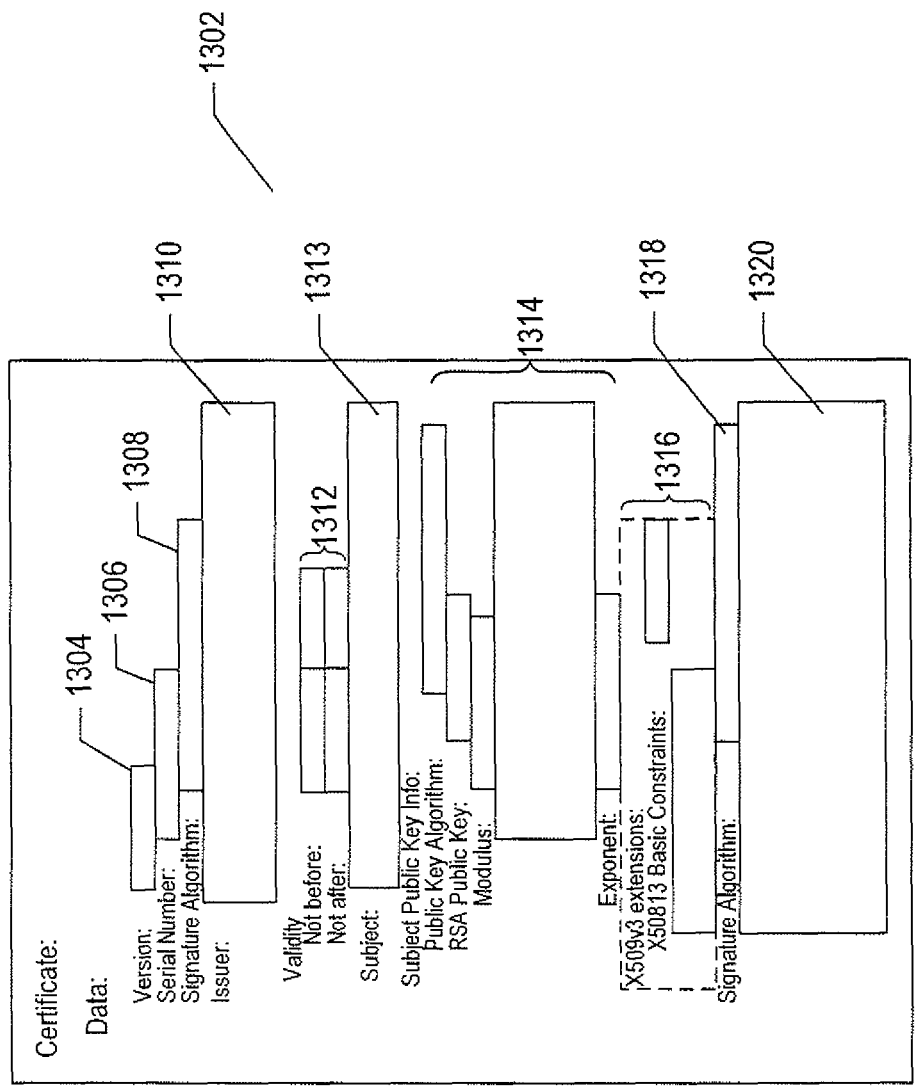
FIG. 13 illustrates the structure of an RSA X.509 public-key certificate.

Public-key certificates, including certificates that follow the X.509 ITU-T standard, are frequently used in secure communications for verifiably binding a public key to a name or identifier, such as a business entity name or a business or personal email address. FIG. 13 illustrates the structure of an X.509 public-key certificate. The X.509 certificate 1302 is essentially a data record that contains a sequence of standard fields that contain information needed to employ the certificate for verifying the binding, or association, of a user identifier or system identifier with a public key. These fields include a certificate version number 1304, a serial number 1306 that is unique with respect to a particular certificate authority that issues public-key certificates, an encoding of an identifier for the cryptographic method used to compute a signature over the certificate 1308, information that identifies the issuer of the certificate 1310, two date and time values 1312 that indicate the beginning date and time at which the certificate becomes valid and the ending date and time at which the validity of the certificate ends, identifying information for the user or system that is bound by the certificate to a public key 1313, a group of fields that indicate the cryptographic algorithm for which the public key is used and that include the public key 1314, optional fields 1316, referred to as extensions, that include additional information, an indication of the signature algorithm 1318, and the signature, computed by the issuing entity over the remaining fields of the certificate 1320. In some cases, the additional information section can contain indications of a security protocol to be used when establishing a secure connection.

In general, public-key certificates are issued by trusted computer systems within entrusted organizations known as "Certificate Authorities" ("CAs"). CAs are well-known certificate-issuing organizations that issue public/private key pairs, including corresponding public-key certificates, as a commercial service. These organizations employ various due-diligence information-gathering techniques to verify the identity of a requesting entity prior to issuing a key pair and public-key certificate. Large organizations, such as universities or big companies, may perform the function of a CA in order to generate public-key certificates for their use, referred to as "self-signing."

A public-key certificate is transmitted, by a first entity possessing the public-key certificate and the corresponding private key, to other entities in order to enable the other entities to securely transmit information to the first entity and to enable the first entity to digitally sign information that can then be verified by use of the public key by the other entities. For email, a sender transmits the sender's public key to other entities by signing emails transmitted to the other entities. The public key component of the digital signature can be saved for further use by those who receive the emails. Public-key distribution by this method generally involves public-key management, including procedures for public-key revocation, expiration, and replacement.

In many different cryptographic methods, finite-field arithmetic is employed. FIG. 14 illustrates various types of mathematical entities that arise in finite-field arithmetic. In general, a finite field, or Galois Field, is denoted $GF(p^n)$, where p is a prime number and n is a natural number. The finite field $GF(p^n)$ has $p^n$ elements and has the dimension n. The ring of integers, $GF(p)$, is the set of integers from 0 to p−1, as indicated by expression 1402 in FIG. 14. The familiar binary arithmetic operators +, −, and × are applied to elements of $GF(p)$ modulo p, and thus the ring $GF(p)$ is closed with respect to these arithmetic operations. An example ring with p=5 and example arithmetic operations modulo 5 are shown in FIG. 14 by expressions 1404. A finite cyclic group is a set of integers from 1 to q−1, where q is prime, as indicated by expression 1406 in FIG. 14. A finite cyclic group has at least one generator element g. Every element in a finite cyclic group can be generated as an integer power of g modulo q. Expressions 1408 in FIG. 14 illustrate a finite cyclic group with q=5 and g=2.

Figure 15:
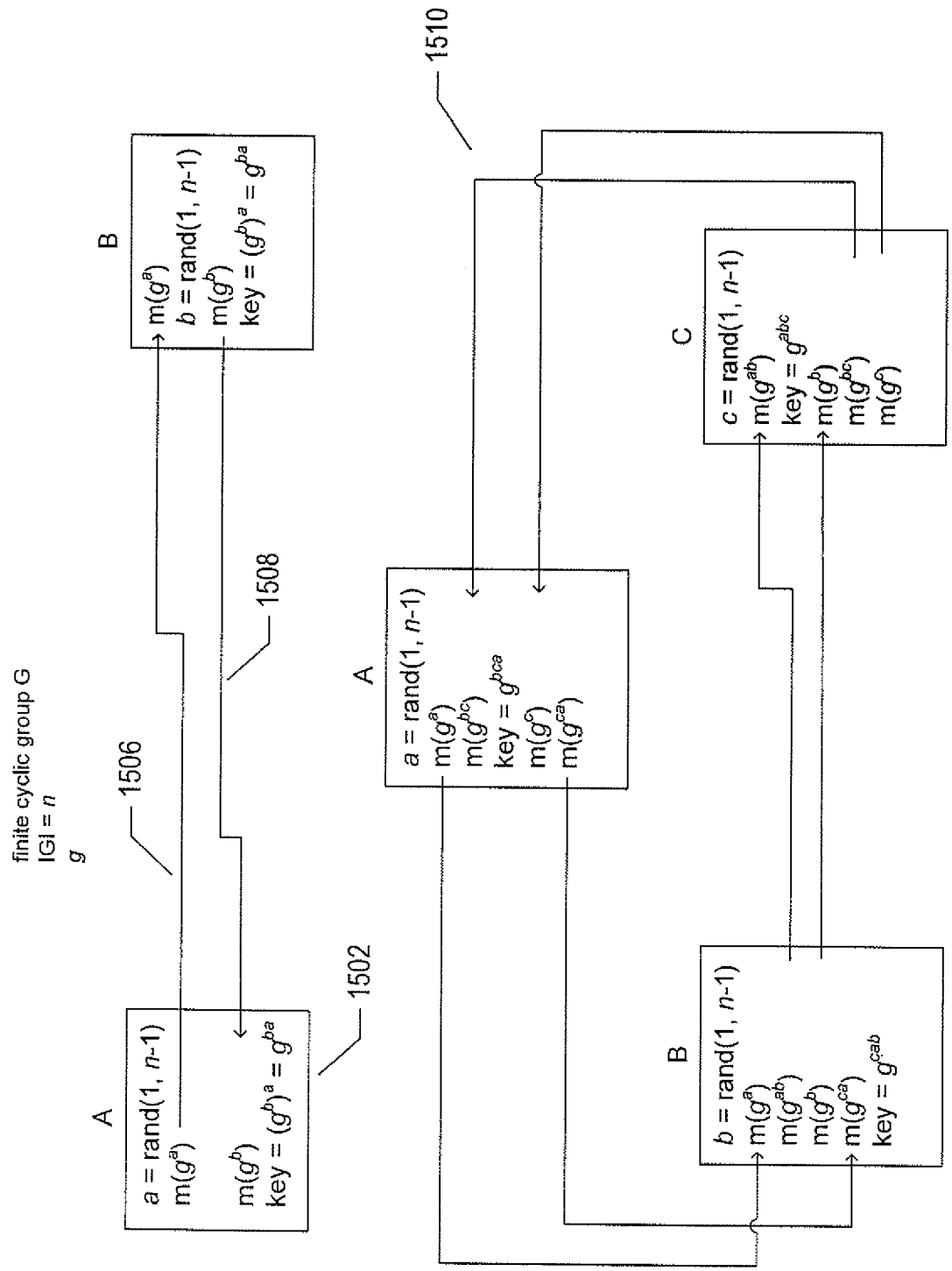
FIG. 15 illustrates secure distribution of a secret value using a finite cyclic group G with n elements and a generator element g.

FIG. 15 illustrates secure distribution of a secret value using a finite cyclic group G with n elements and a generator element g. Secure distribution of a secret value between two communicating computational entities, A 1502 and B 1504, is shown at the top of FIG. 15. First, entity A generates a random integer a in the range [1, n−1]. Then, entity A creates a message m containing the value $g^a$ and sends the message to entity B, as indicated by arrow 1506. Note that, as discussed above, $g^a$ is computed as $g^a$ modulo n for the finite cyclic group G, for which all arithmetic operations are modulo n. Entity B receives the message, generates a random integer b in the range [1, n−1], creates a message m containing the value $g^b$, and sends the message to entity A, as indicated by arrow 1508. Entity A, upon receiving the message from entity B, computes the secret value from the two known values a and $g^b$ as $(g^b)^a = g^{ab}$ and entity B, upon receiving the message from entity A, computes the secret value from the two known values b and $g^a$ as $(g^a)^b = g^{ab}$. Although g and n are known, and although an eavesdropping third-party may intercept the messages containing $g^b$ and $g^a$, knowledge of g, n, $g^a$, and $g^b$ is insufficient to easily determine the secret value $g^{ab}$. The secret value can, in turn, be used as, or used to generate, a symmetric encryption key. This secret-value distribution technique, referred to as the "Diffie-Hellman key exchange," allows encryption keys to be shared among multiple parties securely, at least with respect to interception of communications between the parties. The lower portion 1510 of FIG. 15 illustrates, using illustration conventions similar to those used to illustrate secure distribution of the secret value between two communicating computational entities in the upper portion of FIG. 15, a three-party Diffie-Hellman key exchange. The Diffie-Hellman key exchange can be extended to an arbitrary number of communicating parties.

Figure 16:
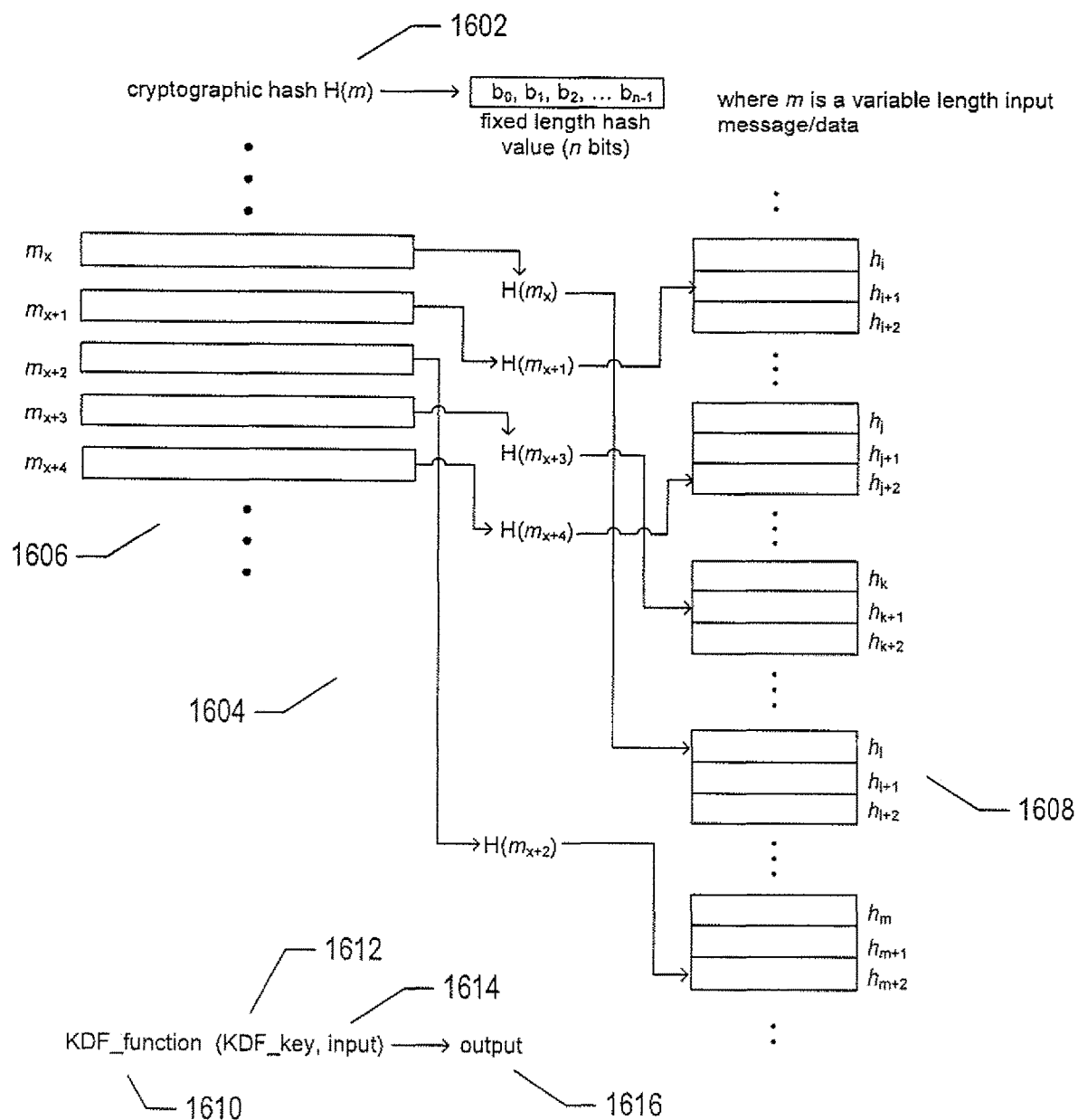
FIG. 16 illustrates cryptographic hash functions and key-derivation functions.

FIG. 16 illustrates cryptographic hash functions and key-derivation functions. A common class of cryptographic hash functions, represented as H(m) 1602 in FIG. 16, receive a variable length input symbol sequence m and return a fixed-size hash value h of n bits. The process represented by the cryptographic hash function H(m) is illustrated by diagram 1604 in FIG. 16, where the cryptographic hash function H(m) can be thought of as a mapping between the set of all possible inputs m 1606 and the set of all possible fixed-size hash values h 1608. In general, good cryptographic hash functions provide mappings that unpredictably map input values to hash values, so that knowledge of the hash value for a particular input value, alone, provides no information from which the mapping for different input values can be easily discerned, absent detailed information about the cryptographic hash function. Moreover, good cryptographic hash functions are one-way, meaning that the cryptographic hash function provides an easily computable method for mapping an input value m to an output hash value h, while no easily computable method for mapping an output hash value h back to a corresponding input value m is known. A variety of cryptographic hash functions are known, including the SHA-1, SHA-2, and SHA-256 hash functions, where the acronym "SHA" is derived from the phrase "secure hash algorithm." Many cryptographic hash functions involve partitioning the input value into multiple blocks and carrying out relatively complex bitwise operations between the blocks and between intermediate blocks produced by initial bitwise operations. Because the input values are generally larger than the output fixed-size hash values, the mapping represented by a cryptographic hash function can produce the same hash value for two different input messages. However, the likelihood of such hash-value collisions is relatively low in most practical applications when the number of bits n of the output hash values is sufficiently large.

A key-derivation function ("KDF") 1610 is a function related to cryptographic hash functions, one class of which receives a key value 1612 and an input value 1614 and returns an output value 1616. Key-derivation functions are commonly used to increase the size of encryption keys and to generate encryption keys from secret values, such as the secret value shared among communicating entities using the above-discussed Diffie-Hellman key exchange. Many key-derivation functions are implemented using cryptographic hash functions.

Figure 17A:
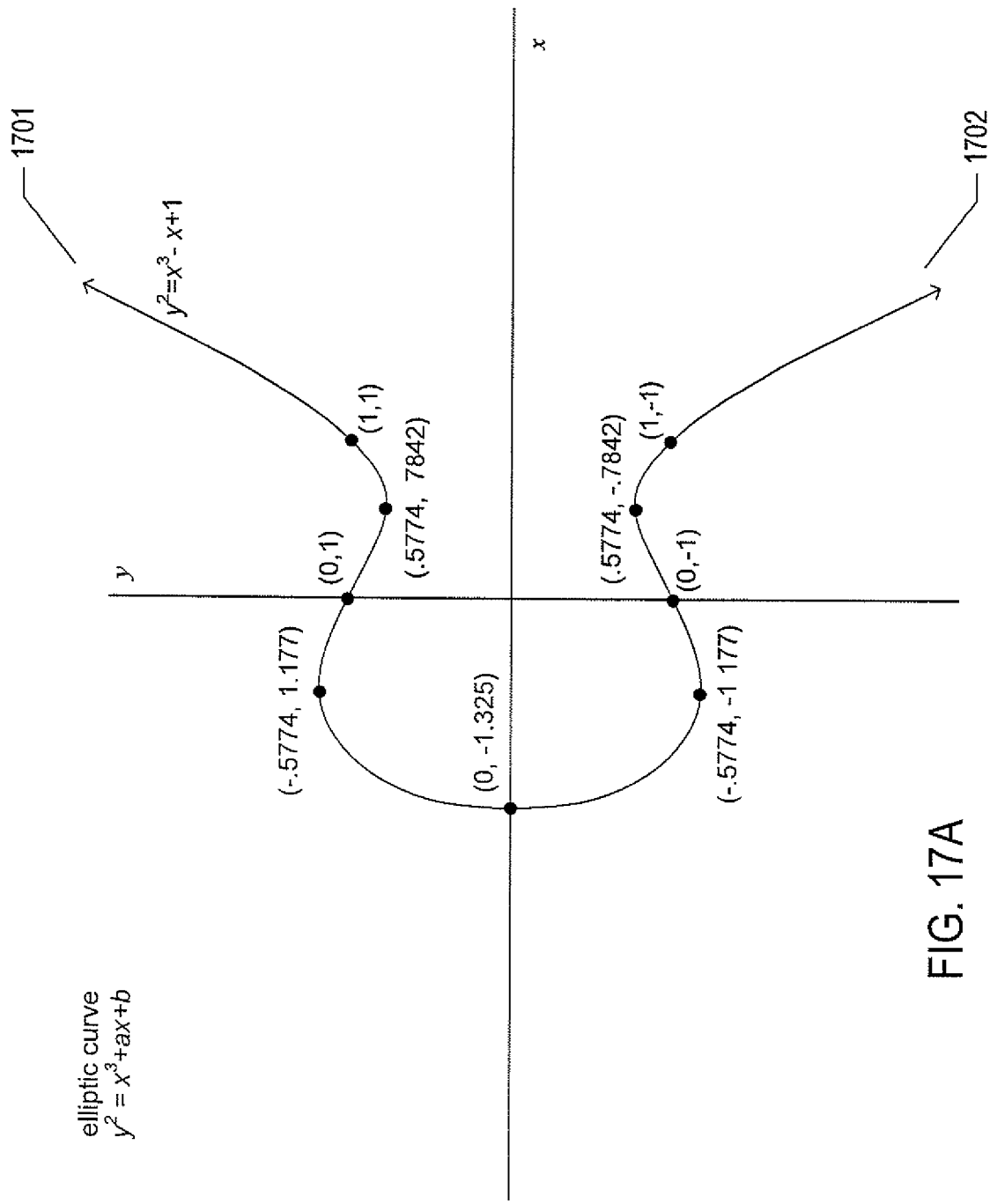
FIGS. 17A-D provide an illustration of the generation of a finite group for the real field based on a simple elliptic curve.

Finite groups based on elliptic curves provide a foundation for various types of cryptographic methods. FIGS. 17A-D provide an illustration of certain aspects of a finite group for the real field based on a simple elliptic curve. FIG. 17A provides a plot of a portion of a well-known elliptic curve $y^2 = x^3 - x + 1$. A large class, or family, of elliptic curves used in cryptography can be expressed in the form:

$$y = ^3 + ax + b,$$

where x, y, a, and b∈R.
In certain cases, when the discriminant $\Delta = -16(4a^3 + 27b^2)$ is positive, a plot of the elliptic curve produces two, non-intersecting components while, as in the case of the elliptic curve plotted in FIG. 17A, when the discriminant is negative, only a single component is produced. The elliptic curve plotted in FIG. 17A is represented by the expression:

$$y^2 = ^3 - x + 1,$$

where a=−1 and b=1.
Arrows 1701 and 1702 at the ends of the portion of the curve plotted in FIG. 17A indicate that the curve continues upward and downward, respectively. Because the y term is squared, the curve is bilaterally symmetric with respect to the x axis.

A group of points with real coordinates can be generated from an elliptic curve, such as the elliptic curve plotted in FIG. 17A. A group comprises a set of elements and a binary operation, such as the binary operation "+," that generates a result member of the group from two elements of the group. A group includes an identity element for the operation "+" and every element of the group has an inverse element. When the operation "+" is commutative, the group is referred to as an abelian group. To construct a group from the points along an elliptic curve, the elliptic curve is first extended to include a point at infinity, denoted as "0." This point at infinity is the identity element for the group of elements with respect to the group operation "+." Second, the inverse of any point P on the elliptic curve is defined to be the point −P, obtained by reflecting P through the axis. In other words, if P=(x, y), then the inverse −P=(x, −y).

Figure 17B:
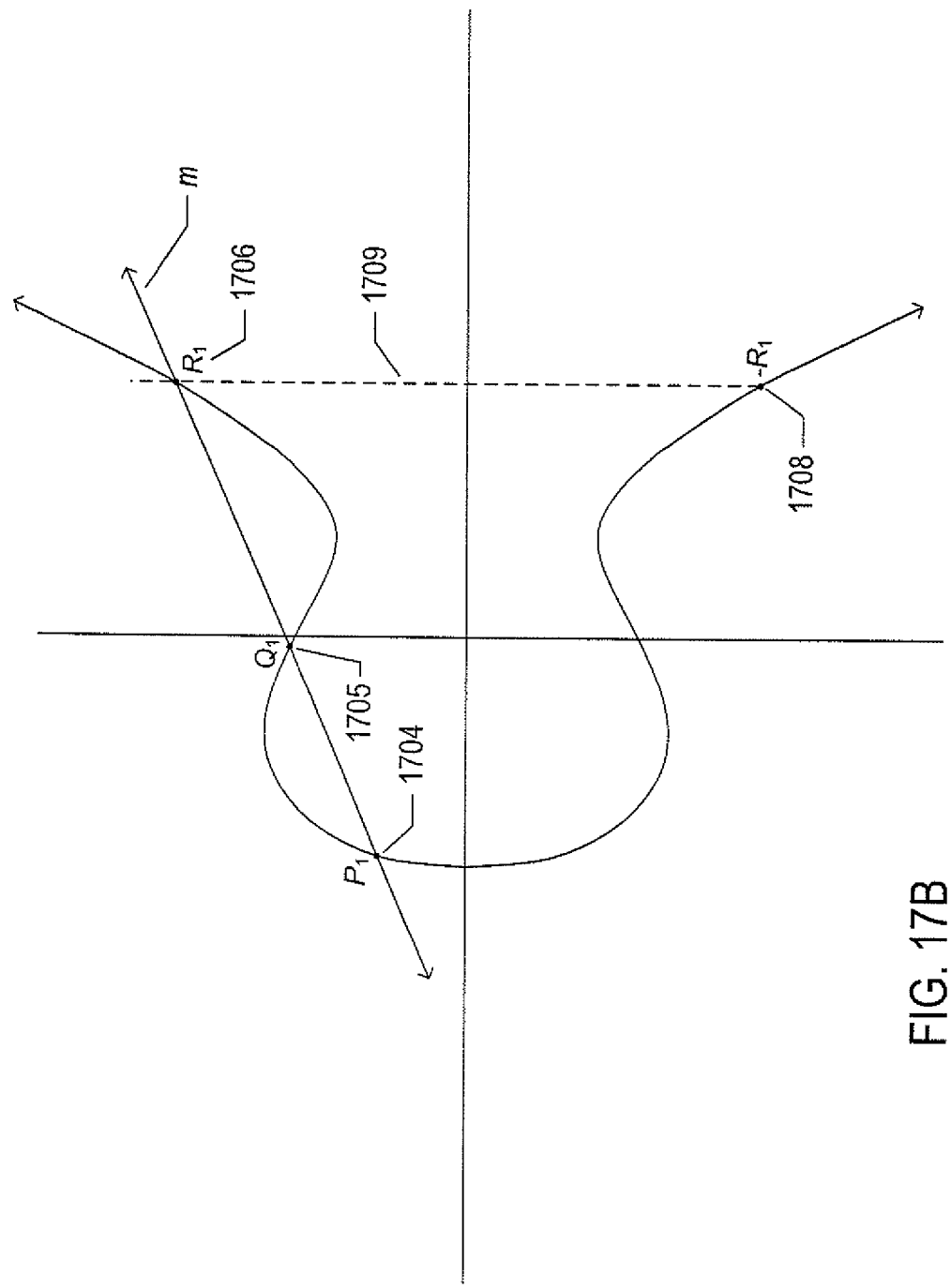
Figure 17C:
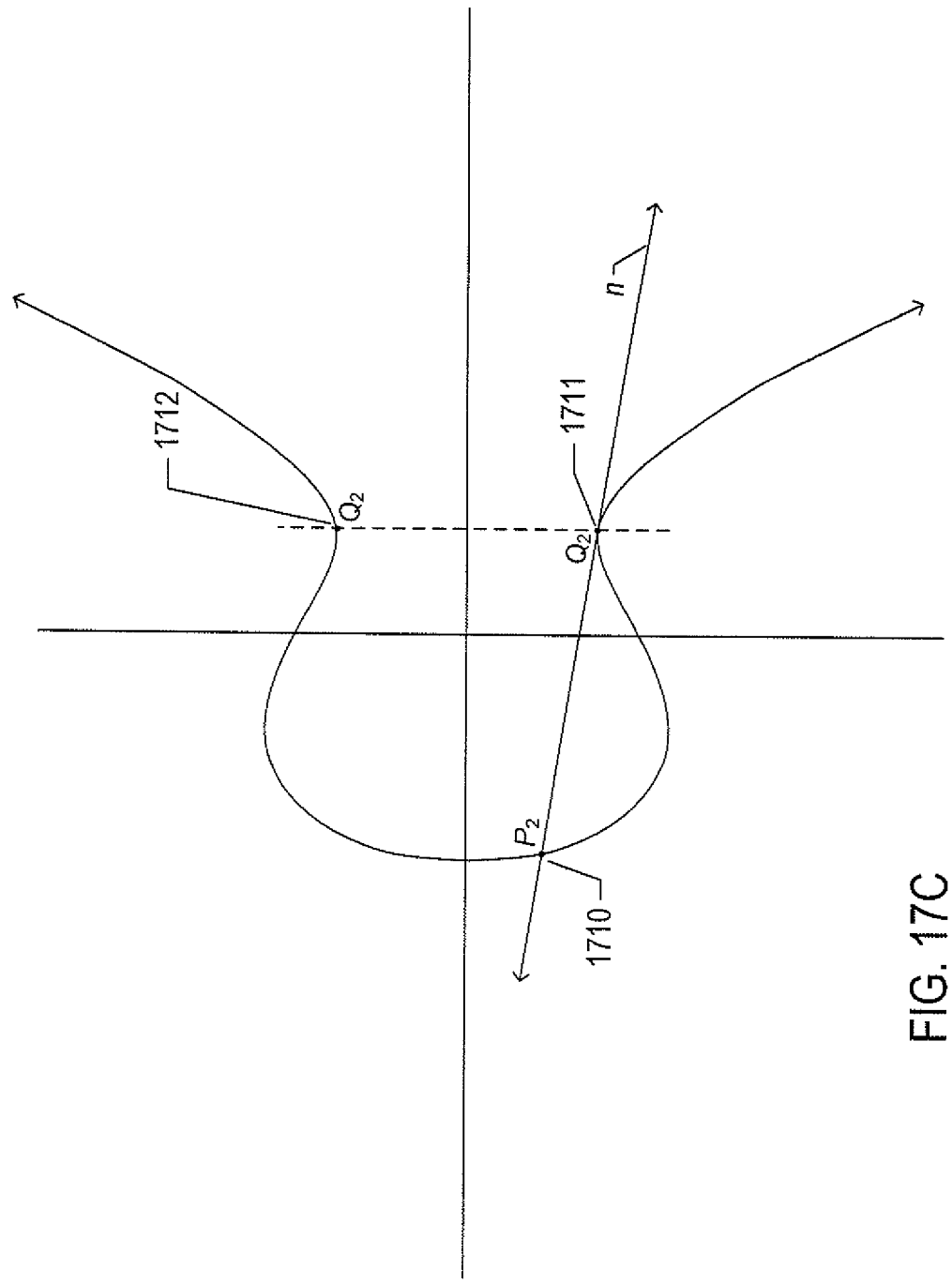
Figure 17D:
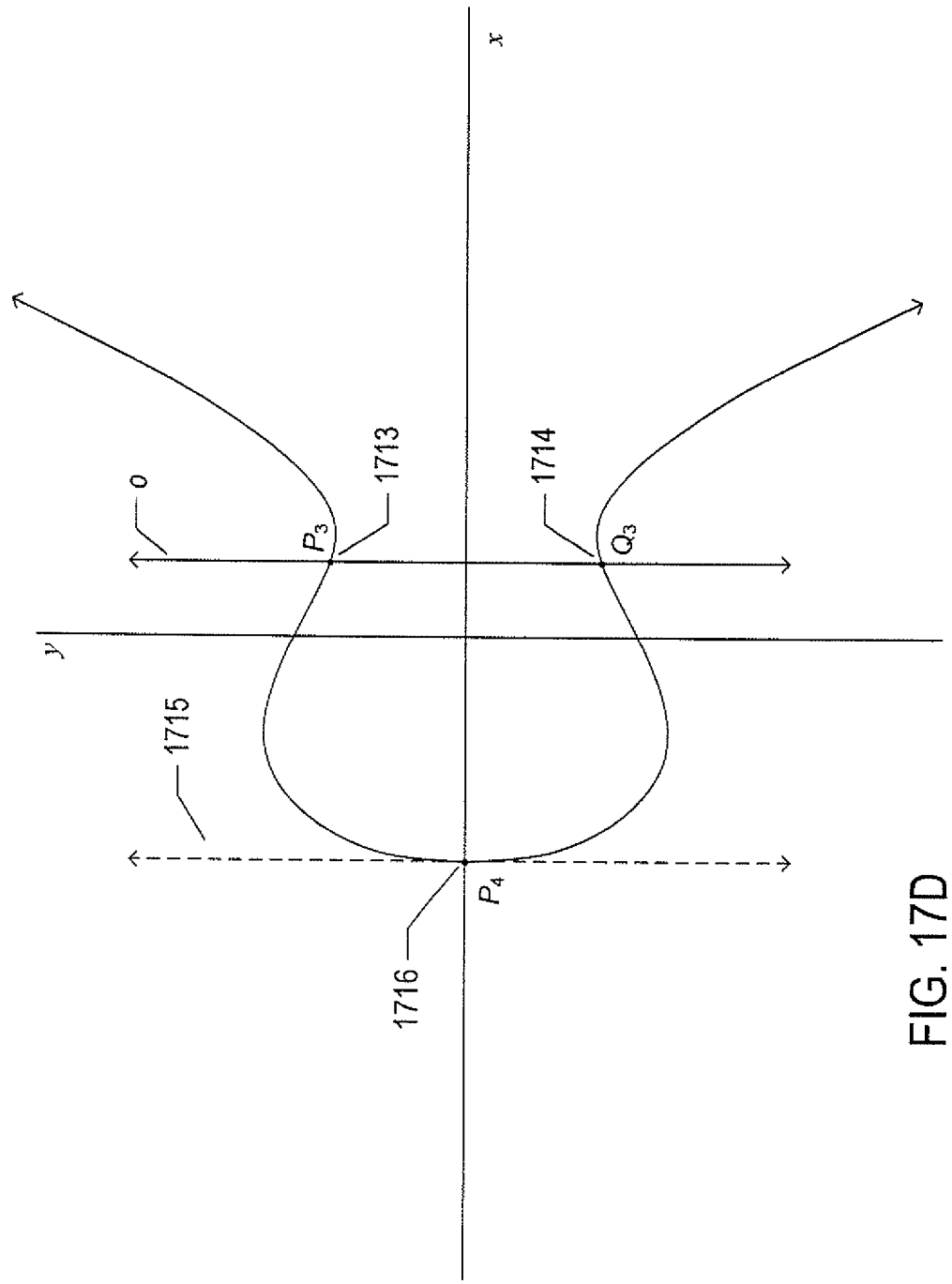

The group operation "+" is defined using straight lines that intersect the elliptic curve. FIGS. 17B-D illustrate three different cases in which a straight line intersects an elliptic curve. As shown in FIG. 17B, a straight line m may intersect the elliptic curve at a maximum of four points, $P_1$ 1704, $Q_1$ 1705, and $R_1$ 1706, as well as the point at infinity 0. Note that the point $-R_1$ 1708 is the inverse of point $R_1$, with dashed line 1709 indicating reflection across the x axis. In another case, shown in FIG. 17C, a straight line n may intersect the elliptic curve at only two points, $P_2$ 1710 and $Q_2$ 1711. In yet an additional case, shown in FIG. 17D, the straight line o may be parallel to they axis and intersect the elliptic curve at points $P_3$ 1713 and $Q_3$ 1714. When the vertical line o is shifted leftward to the position indicated by the dashed vertical line 1715, there is a special case in which the vertical line intersects the elliptical curve at the single point $P_4$ 1716. An addition rule is next defined. The sum of three colinear points P, Q, and R lying along an elliptic curve is defined to be the point at infinity, 0. As a result, $P+Q+R=0$, $P+Q+R+-R=-R+0=-R$, $P+Q+0=-R$, $P+Q=-R$.

Similarly, $P+R=-Q$, and $Q+R=-P$.

Thus, as shown in FIG. 17B, $P_1+Q_1$ can be geometrically obtained by drawing a line through $P_1$ and $Q_1$, identifying the third point of intersection with the elliptic curve $R_1$, and then reflecting that point across the x axis to obtain the point $-R_1$, which is the sum of $P_1$ and $Q_1$. In the case shown in FIG. 17C, the point $Q_2$ is a point at which the straight line n is tangent to the elliptic curve. In this case, by considering a point $Q_2'$ near $Q_2$ and taking the limit as $Q_2'$ approaches $Q_2$, the sum $Q_2+Q_2$ is seen to lie along the tangent line to the elliptical curve at $Q_2$ and at the point where the tangent line intersect the elliptical curve, which is, in fact, point $P_2$. Therefore, by the construction method described above:

$P_2+Q_2+Q_2=0$, $P+Q_2+=-Q_2$.

FIG. 18 provides expressions that formally describe the group of elements generated from an elliptic curve, as discussed above. Expression 1802 states that the elements of the group G are real-number pairs (x, y), where each real-number pair represents a point of an elliptic curve or the point at infinity 0, discussed above. The set of expressions 1804 represent the above-mentioned group properties that include closure, additive identity, inverse, and a commutative binary operator "+." Expression 1806 indicates that the points P and Q are elements of the group G. The set of expressions 1808 define the points P and Q in terms of real-number pairs and introduce a third point R, also defined in terms of a real-number pair. Expression 1810 provides an algebraic definition of the binary operator "+," as illustrated in FIG. 17B. Expression 1812 provides an algebraic definition of the binary operator "+," as illustrated in FIG. 17C. A scaler multiplication operation is defined by the set of expressions 1814. As shown in these equations, the scaler product nP, where n is a natural number and P is an element of the group G is equal to a sum of n terms, each term equal to P. The set of expressions 1816 provide the basis for various cryptographic methods based on elliptical curves. As indicated in the set of expressions 1816, given a natural number n and a group G element P, it is computationally straightforward to compute the scaler product Q=nP, but given two group elements P and Q, it is computationally difficult to determine a natural number n such that Q=nP.

To facilitate computing elliptic-curve-based cryptographic keys and other cryptographic values, elliptic-curve-based methods are generally carried out over finite fields, rather than the real numbers. As discussed above, a finite field can be constructed from a prime number p as the set of integers $\{0, \ldots p-1\}$. As indicated by expression 1818 in FIG. 18, this finite field is generally designated as one of $Z_p$, GF (p), and $F_p$. Expressions 1820 in FIG. 18 indicate that the finite field $F_p$ includes a multiplicative inverse for each element and an additive-identity element, and is closed under the familiar binary arithmetic operations addition, subtraction, and multiplication. As also discussed above, these binary arithmetic operations in the finite field $F_p$ are all carried out modulo p.

Figure 19:
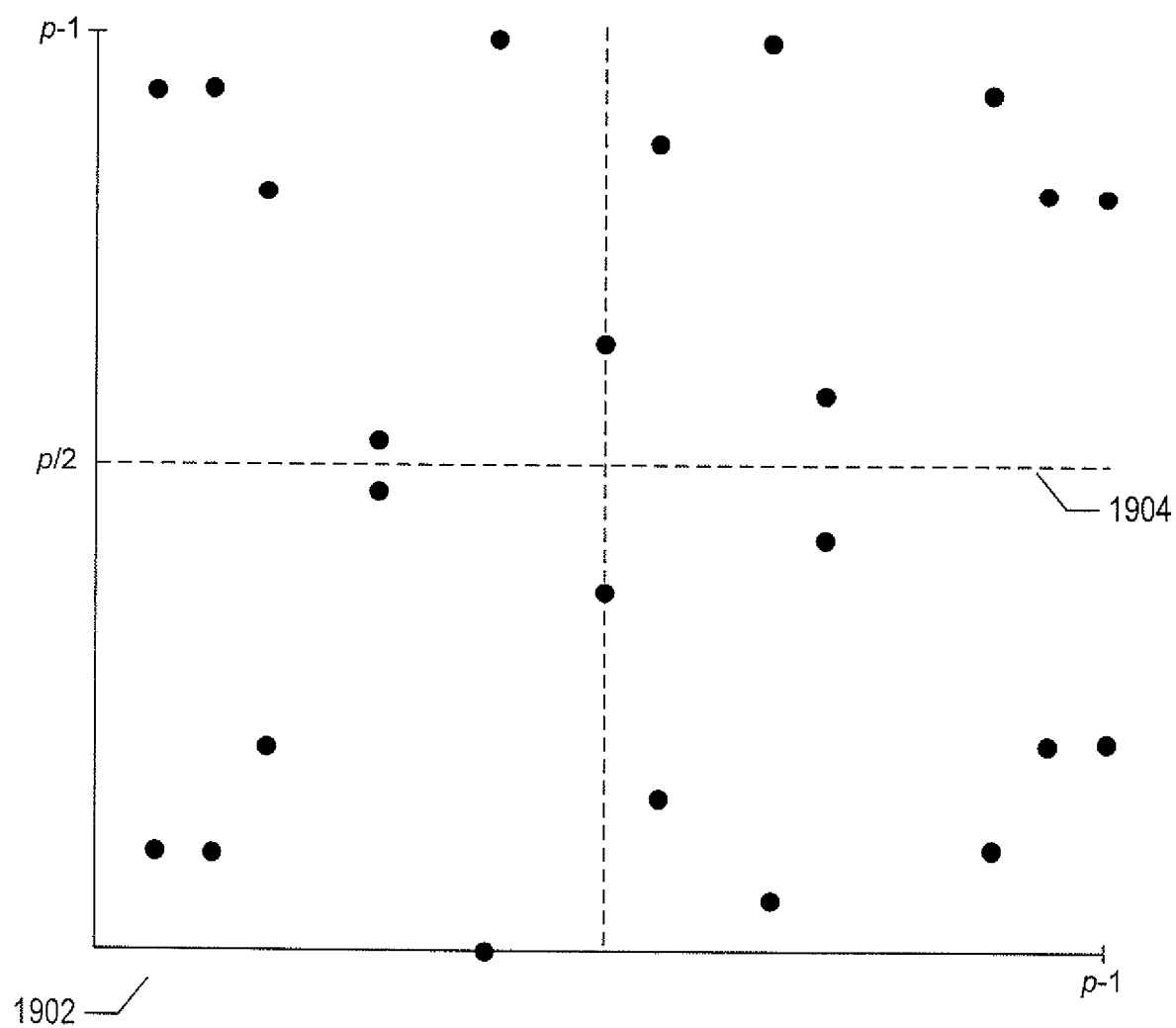
FIG. 19 shows a plot of the elements within a finite field $F_p$ where p=19 and the elements are generated from the elliptic curve $y^2=x^3-7x+10$.

FIG. 19 shows a plot of the elements within a finite field $F_p$ where p=19 and the elements are generated from the elliptic curve $y^2=x^3-7x+10$. As with the elliptic curves over the real numbers, shown in FIGS. 17A-D, the elements in the elliptic curve over the finite field $F_p$, shown plotted in a 2-dimensional plot 1902, are bilaterally symmetric with respect to a horizontal axis of symmetry 1904. The elements are all contained within the square plot 1902 area with sides of length p−1, with the horizontal axis 1904 described by the expression $$y = \frac{p}{2}.$$

FIG. 20 provides expressions that formally describe the finite field of elements generated from an elliptic curve, as discussed above. The elliptic-curve-derived finite field F is described as a set, in expression 2002, similar to the set description of the group G and expression 1802 of FIG. 18. Expressions 2004 parallel expressions 1806 and 1808 in FIG. 18, with P and Q described as elements of F and elements P, Q, and R represented as coordinate pairs, with the coordinates having values in the finite field $F_p$. Expressions 2006 define the addition operation in similar fashion to the definition of the addition operation provided by expressions 1810 and 1812 in FIG. 18. Expressions 2008 are analogous to expressions 1814 in FIG. 18. For many elliptic-curve-based finite fields F, a particular element of the field P may be a generator for a cyclic group C that is a subset of F, where the elements of the cyclic group C are generated from P by scaler multiplication. The generation of a cyclic group C is described by expression 2010 in FIG. 20. Note that kP represents scaler multiplication of the element P by the natural number k, which is the addition of k terms, each term comprising the element P, where addition in the finite field $F_p$ it is defined by the sets of expressions 2004 and 2006. The number of elements in the cyclic group C is denoted by |C| and, when the number of elements in the cyclic group C is equal to n, the number of elements in the elliptic-curve-derived finite field F is evenly divisible by n, as indicated by expression 2012. The cofactor of the cyclic group C, h, is computed as the number of elements in the elliptic-curve-derived finite field F divided by the number of elements in the cyclic group C, as indicated by expression 2014. As represented by expression 2016, when the natural number n is a prime number, when the element G of the elliptic-curve-derived finite field F is computed from an element P of the elliptic-curve-derived finite field F by scaler multiplication of P by the cofactor h of a cyclic group C with n elements, hP, and when scaler multiplication of G by n is equal to 0, then either G=0 or G is a generator for the cyclic group C with n elements. This provides a method for determining the cyclic group C with a desired number of elements n from an elliptic-curve-derived finite field F. First, the order of the elliptic-curve-derived finite field F is computed, for which there are known computationally tractable methods, including Schoof's algorithm. Then, the cofactor h is computed by dividing the computed order by n. Then, random points P can be selected from F and the candidate points G can be computed from P as the scaler multiple of P by h. When G is not equal to 0, G is a generator for a cyclic group C with n elements. When Q and P are both known elements of a large cyclic group derived from an elliptic-curve-derive finite field, finding a natural number k, such that Q=kP, is a computationally hard problem. This problem is the basis for generating private/public encryption keys from cyclic groups derived from elliptic-curve-derived finite fields. Note that such a derived cyclic group can be fully characterized by the set of parameters: p, the prime number that defines $F_p$; a and b, parameters for the elliptic curve that defines the elliptic-curve-derived finite field F; G, the generator for the derived cyclic group; n, the number of elements in the derived cyclic group; and h, the cofactor for the derived cyclic group, as indicated by expression 2020 in FIG. 20.

Figure 21:
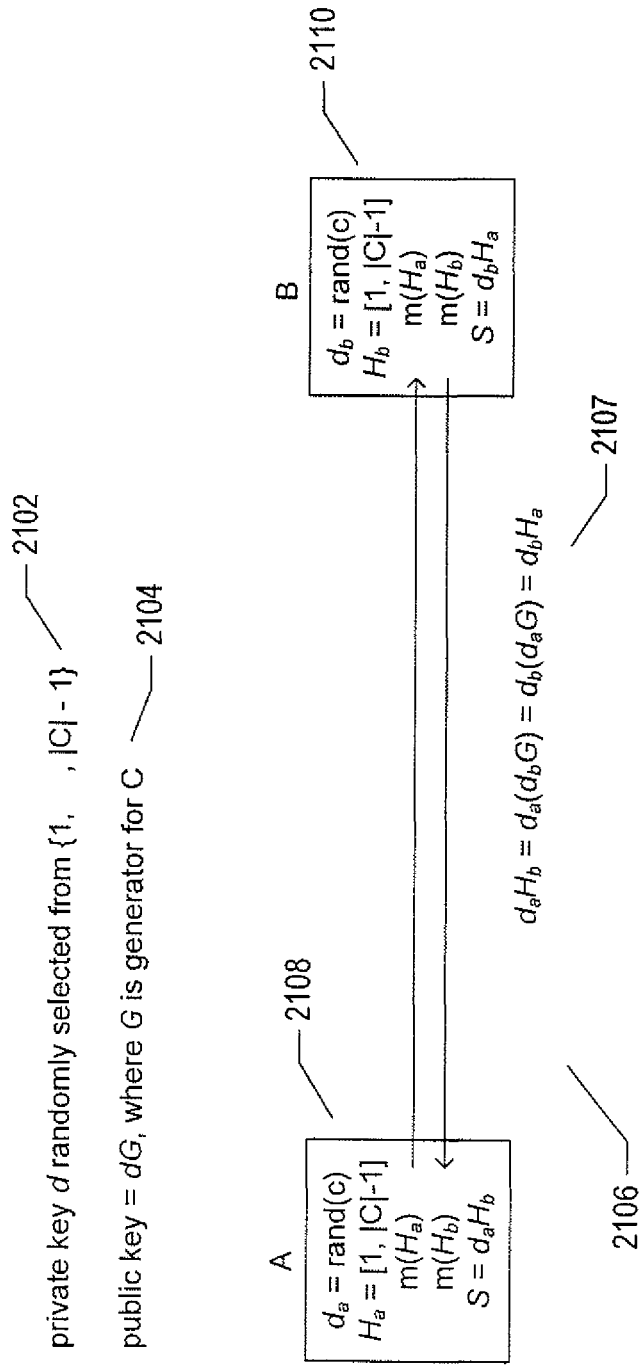
FIG. 21 illustrates private/public encryption key generation and distribution based on elliptic-curve-derive finite fields.

FIG. 21 illustrates private/public encryption key generation and distribution based on elliptic-curve-derive finite fields. The private key d is randomly selected from the set of integers $\{1, \ldots, |C|-1\}$, where C is a cyclic group derived from an elliptic-curve-derive finite field, as indicated by expression 2102. The public-key is computed as dG, where G is a generator for C, as indicated by expression 2104. Again, the expression dG indicates scaler multiplication of a cyclic-group element by the scaler value d, as discussed above with reference to FIG. 20. Diagram 2106 illustrates secure generation of a secret value S by two communicating entities A 2108 and B 2110 using illustration conventions similar to those used in FIG. 15. Both entities generate private keys, $d_a$ for entity A and $d_b$ for entity B, and corresponding public keys $H_a$ and $H_b$, exchange the public keys, and then compute a shared secret S by a modified Diffie-Hellman key-exchange method. Note that, as indicated by expression 2107, the secret $S_a$, $d_a H_b$, computed by entity A is equal to the secret $S_b$, $d_b H_a$, computed by entity B, since multiplication of scalers is commutative. The method depends on easy computation of public keys and the fact that determining d from G and dG is difficult for cyclic groups C where |C| is large. As discussed above, the secret S can be used as a symmetric encryption key or can be used to generate a symmetric key.

Figure 22:
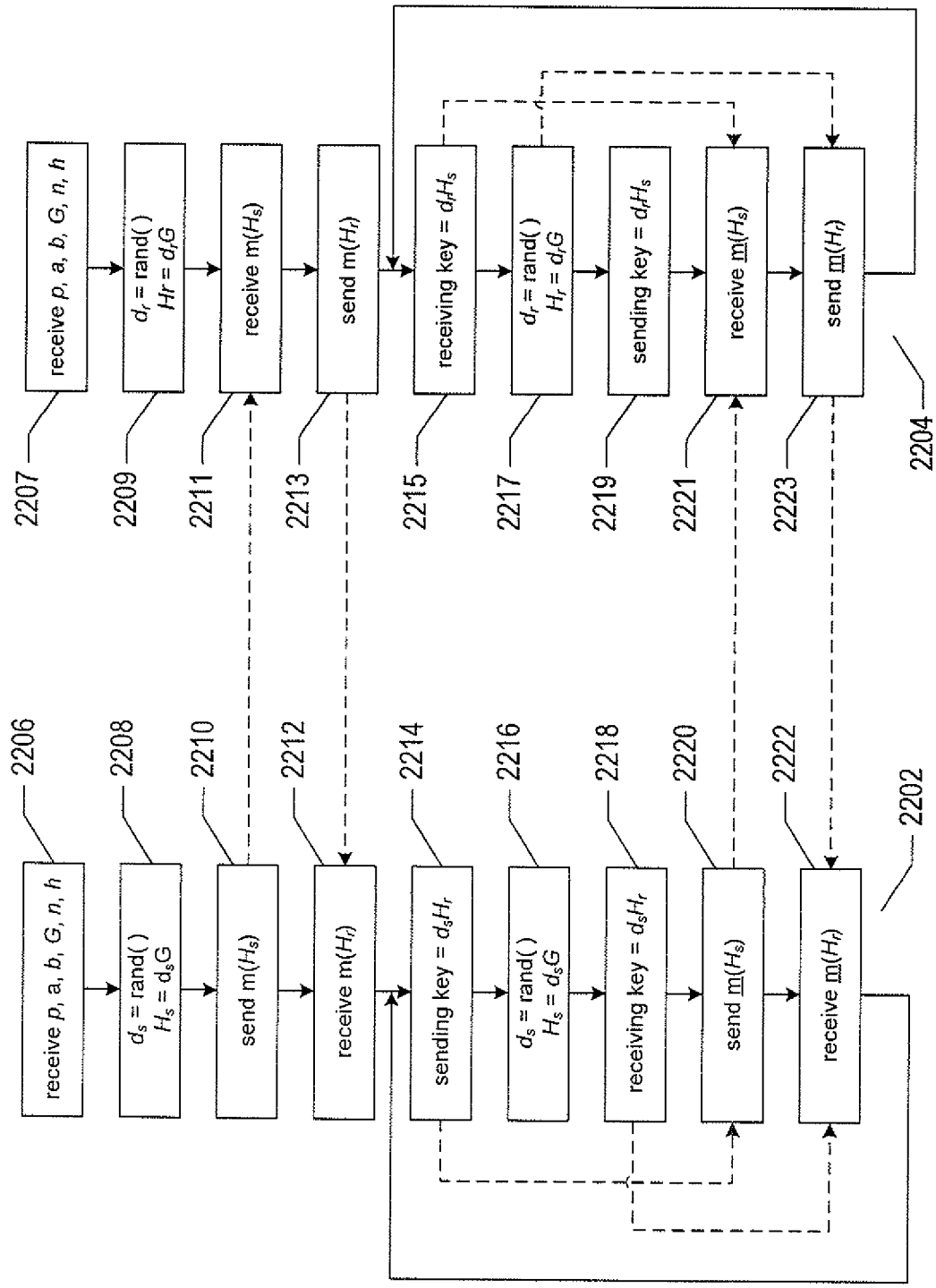
FIG. 22 illustrates an encryption-key ratchet system.

FIG. 22 illustrates an encryption-key ratchet system. The encryption-key ratchet system uses the above-mentioned elliptic-curve-based private/public key generation and distribution method. In FIG. 22, the left-hand flow diagram 2202 represents the ratchet logic for a first communicating entity and the right-hand flow diagram 2204 represents the ratchet logic for a second communicating entity. The communicating entities continuously generate new symmetric encryption keys as they exchange messages so that even were a malicious, eavesdropping third-party to obtain a single symmetric encryption key in the sequence of symmetric encryption keys generated and used by the two communicating parties, the third-party would be able, at most, to decrypt one message and would not be able to generate any other of the encryption keys in the sequence of encryption keys from the single obtained encryption key. Both communicating entities receive the parameters for a cyclic group derived from an elliptic-curve-derived finite field in steps 2206 and 2207. In steps 2208 and 2209, the first communicating entity, referred to as the sending entity s, generates a new private key d, and a new public key $H_s$ and the second communicating entity, referred to as the receiving entity r, generates a new private key $d_r$ and a new public key $H_r$. In steps 2210 and 2211, the sending entity s sends a message to receiving entity r that includes the newly generated public key $H_s$ and, in steps 2212-2213, the receiving entity r sends a message that contains the newly generated public key $H_r$ to sending entity s. Up to this point, the messages are sent in an encrypted form, since no symmetric encryption keys have been generated. The following steps are iteratively repeated to transmit messages back and forth between the two communicating entities. In step 2214, sending entity s sets the new sending key to $d_s H_r$ and receiving entity r sets anew receiving key to $d_r H_s$ in step 2215. Note that, as discussed above with reference to FIG. 21, $d_s H_r = d_r H_s$. In step 2216, sending entity s generates a new private key $d_s$ and a new public key $H_s$ while, in step 2217, receiving entity are generates a new private key $d_r$ and a new public key $H_r$. In step 2218, sending entity s sets a new receiving key to $d_s H_r$ and, in step 2219, receiving entity r sets a new sending key to $d_r H_s$. In step 2220, sending entity s sends a new message, which includes the newly generated public key $H_s$ and which is encrypted with the sending key generated in step 2214, to receiving entity r, while receiving entity r, in step 2221, receives the encrypted message from entity s and decrypts the received message using the receiving key generated in step 2215. In step 2223, the receiving entity r sends a message, which contains the new public key $H_r$ generated in step 2217 and which is encrypted using the sending key generated in step 2219, to sending entity s, which receives the encrypted message in step 2222 and decrypts the received message using the receiving key generated in step 2218. The two communicating entities s and r can continue to send and receive messages by subsequent iterations of steps 2214-2223.

Figure 23:
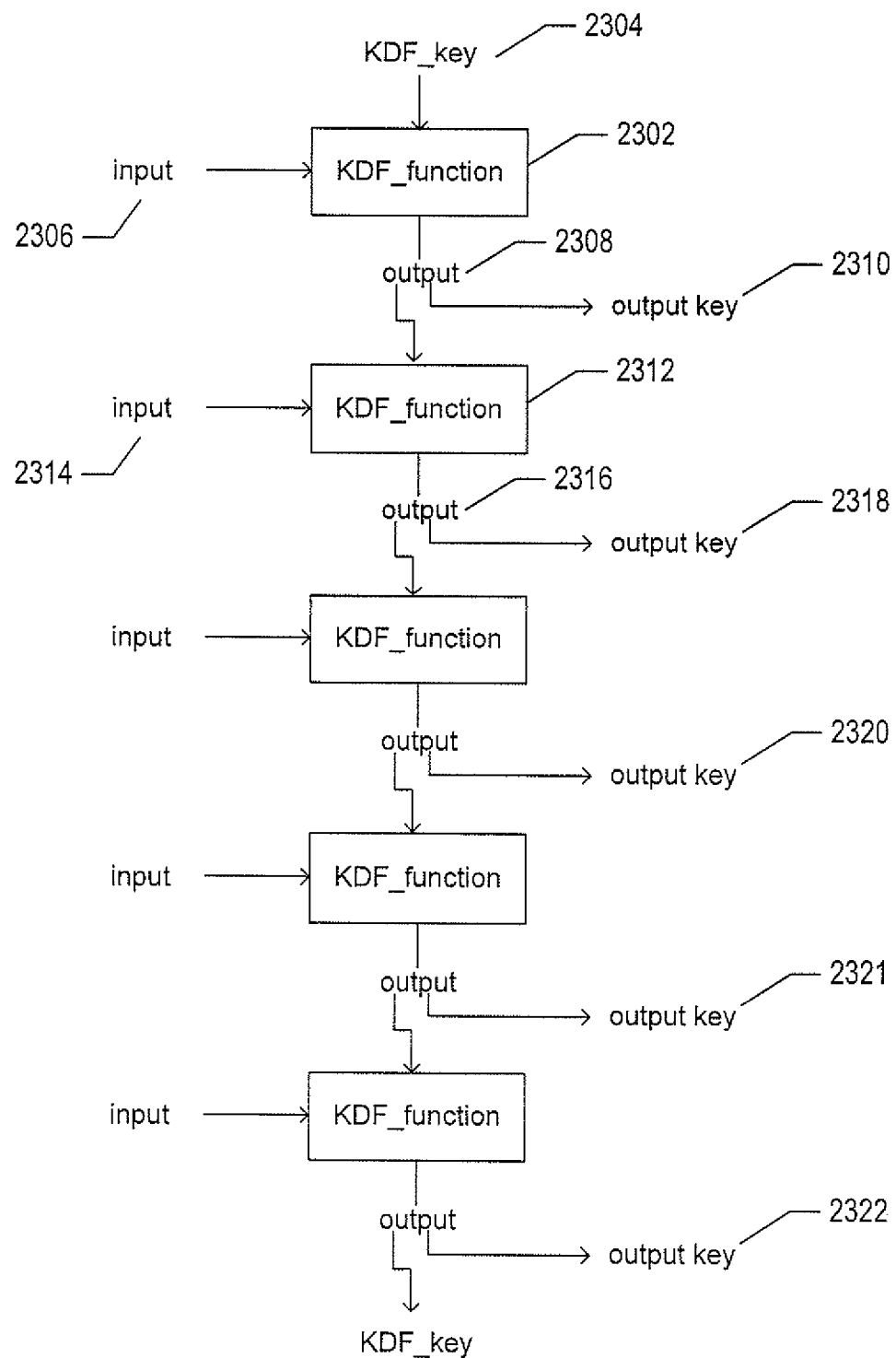
FIG. 23 illustrates a second type of sequential key-generation technique.

FIG. 23 illustrates a second type of sequential key-generation technique. This technique uses the above-discussed key-derivation function. As shown in FIG. 23, a KDF function 2302 is supplied with an initial KDF_key 2304 and an input value 2306 and produces an output value 2308 that can be used as an encryption key 2310 or from which encryption key can be derived by additional processing. The output value 2308 is additionally input to the KDF function 2312 along with an input value 2314 to generate another output value 2316 that can be used as an encryption key or from which an encryption key can be derived from additional processing 2318. These calls to the KDF function continue for an arbitrary number of iterations to generate a sequence of encryption keys 2310, 2318, and 2320-2322.

Figure 24:
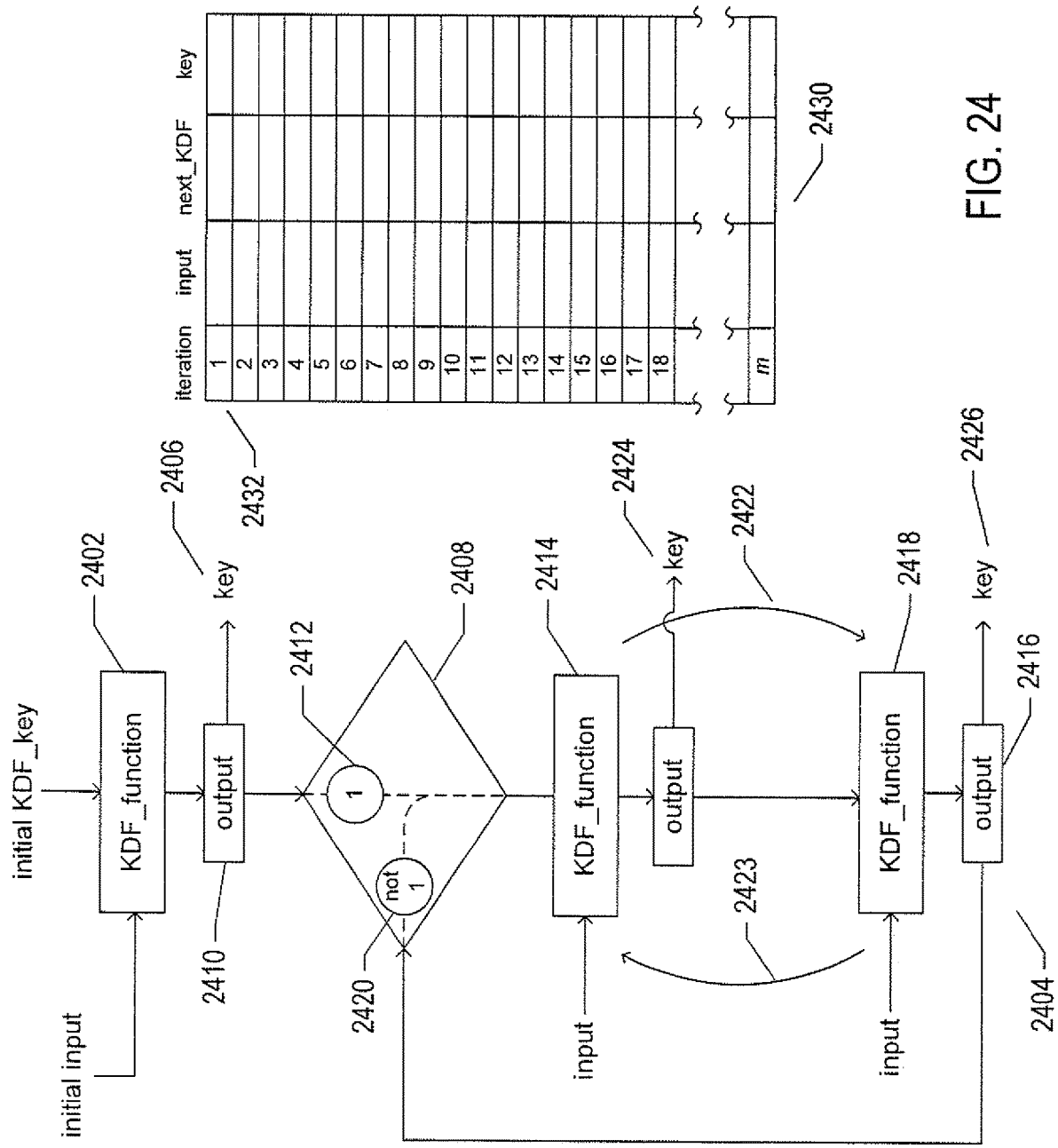
FIG. 24 illustrates the sequence of generation of encryption keys, discussed above with reference to FIG. 23, in a different fashion.

FIG. 24 illustrates the sequence of generation of encryption keys, discussed above with reference to FIG. 23, in a different fashion. In this illustration, the KDF function 2402 is initially called at the top of the control-flow diagram 2404 to produce an initial encryption key 2406 and input feature 2408 takes the output from the first KDF-function invocation, as represented by the circled "1" symbol 2412 for input to KDF function 2414 and thereafter selects input for KDF function 2414 from the output 2416 from KDF function 2418, as represented by the language "not 1" 2420 in the input-selection feature 2408. KDF function 2414 and KDF function 2418 are iteratively called, as represented by arrows 2422-2423, to output a next pair of encryption keys 2424 and 2426 during each iteration. The output of control-flow diagram 2404 can be thought of as a table 2430 in which the first row 2432 represents the first call to the KDF function 2402 and each successive pair of rows following the first row represent output from the calls to the KDF functions 2414 and 2418.

Figure 25:
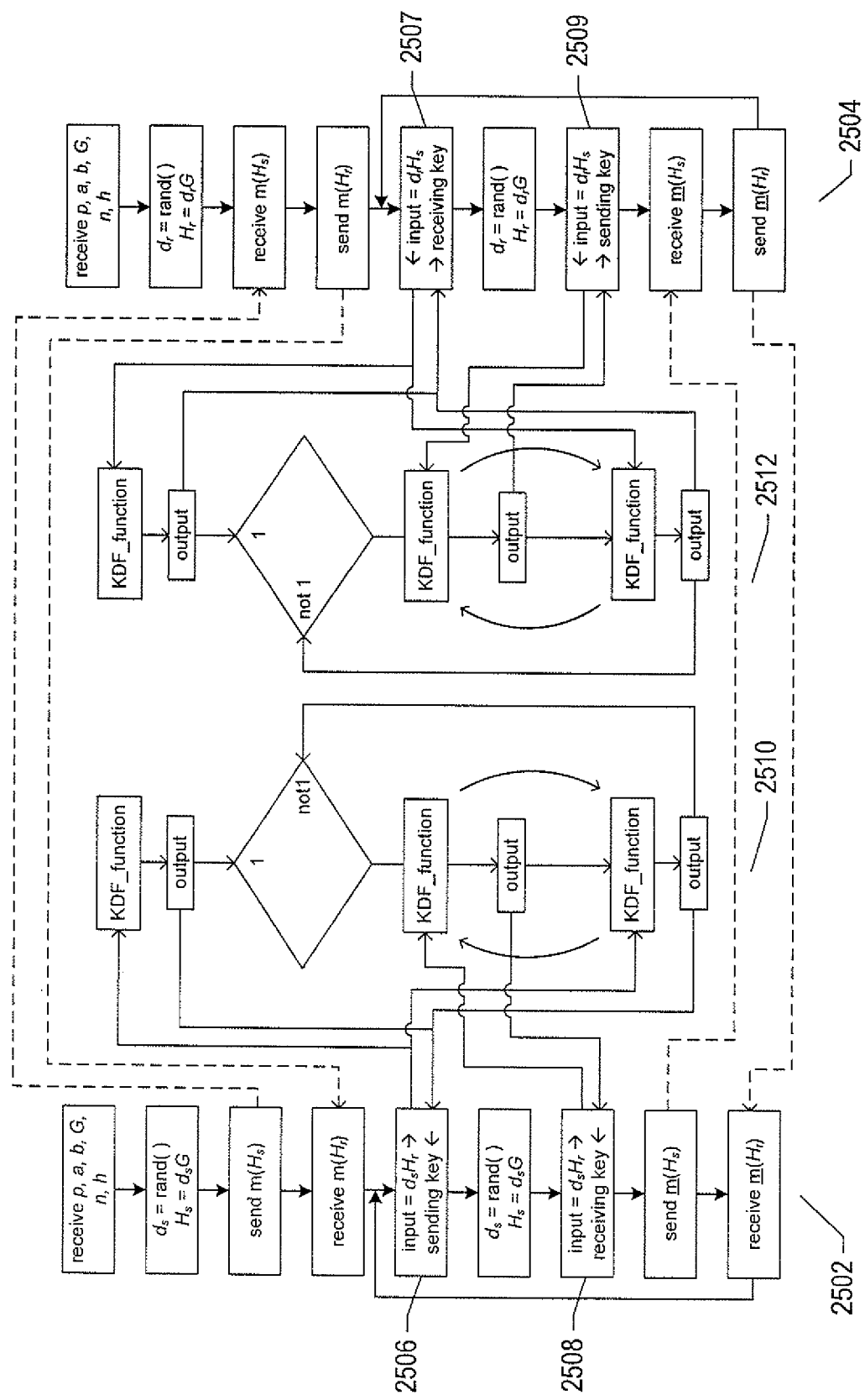
FIG. 25 illustrates a double-ratchet encryption-key-generation method that combines the ratchet technique discussed above with reference to FIG. 22 and the technique for sequential generation of encryption keys discussed above with reference to FIGS. 23-24.

FIG. 25 illustrates a double-ratchet encryption-key-generation method that combines the ratchet technique discussed above with reference to FIG. 22 and the technique for sequential generation of encryption keys discussed above with reference to FIGS. 23-24. The two flow diagrams 2502 and 2504 are equivalent to flow diagrams 2202 and 2204 in FIG. 22, with the exception that, in steps 2506 and 2507 as well as in steps 2508 and 2509, the generated secrets are output to two KDF-function-based encryption-key-generation flow diagrams 2510 and 2512, each equivalent to flow diagram 2404 in FIG. 24. Thus, the secrets generated by the ratchet technique, used for symmetric encryption keys in FIG. 22, are fed into the KDF-function-based key-generation flow diagrams in FIG. 25 to generate the sequence of symmetric encryption keys used by the communicating entities. Note that the states of the two KDF-function-based flow diagrams 2510 and 2512 are identical, since the same generated secrets are furnished to each in the same order by the two ratchet flow diagrams 2502 and 2504.

Overview of Trusted Platform Modules

Figure 26:
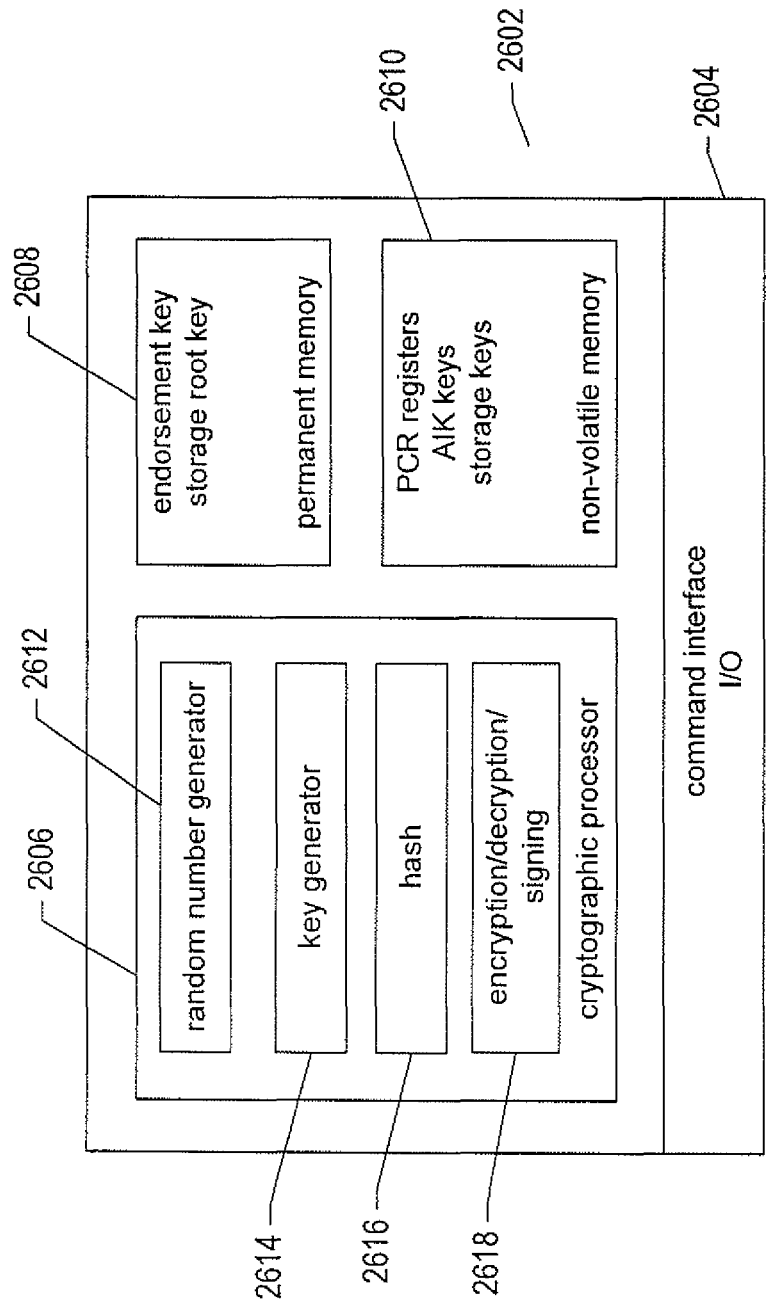
FIG. 26 shows a block diagram of a trusted platform module ("TPM").

FIG. 26 shows a block diagram of a trusted platform module ("TPM"). TPMs were developed in the early 2000s and were standardized in 2009. A TPM is a secure crypto processor implemented by a microcontroller that is included on the motherboard of personal computers, server computers, and other processor-controlled devices and systems. The TPM 2602 includes a command I/O interface 2604 through which it receives a variety of different types of commands and returns responses to those commands. The TPM includes a cryptographic processor 2606, a small amount of permanent memory 2608, and a somewhat larger amount of the non-volatile random-access memory 2610. The cryptographic processor includes a random number generator 2612, a cryptographic key generator 2614 that can generate both symmetric and asymmetric encryption keys, a cryptographic hash module that computes cryptographic hash values from input data 2616, and an encryption/decryption/signing module 2618 that can encrypt input data, decrypt encrypted input data, and sign input data using encryption keys stored within the TPM, which may be generated by the TPM via the key generator 2614. Thus, private keys need not be exported from the TPM, but can instead be used internally for signing and decrypting data passed into the TPM through the command I/O interface 2604. The permanent memory includes an endorsement key that is hardwired into the TPM during manufacture. This key provides a basis for uniquely identifying the TPM and for establishing a chain of trust for the computer system that includes the TPM. In addition, storage root keys derived from the endorsement key provide a basis for deriving multiple different types of keys for each of multiple users. The nonvolatile memory storage platform configuration registers ("PCRs") attestation identity keys ("AIKs") used for proving that a private key was used within a particular TPM, and storage keys that can be used for hardware-level encryption and decryption of mass storage devices within the computer system. A TPM, in tandem with a remote certificate authority, can provide a signed certificate that uniquely identifies the TPM. In addition, a TPM can be used to collect various types of configuration metrics, during the boot process of the computer system that includes the TPM, from which a set of hash values are generated and stored in the PCRs to represent the hardware and software configuration of the computer system. These values can be used to provide an attestation of the current configuration of the computer system that includes the TPM to remote computer systems. In general, the functionalities provided by a TPM can be alternatively implemented within a computer system, but the alternative implementations may be less computationally efficient.

Overview of Blockchain Ledgers

FIGS. 27-34 illustrate various aspects of the blockchain public ledger. Blockchain encompasses a data structure, a transaction-recordation protocol, and a cryptographic method, and is the basis of the Bitcoin protocol used for bitcoin digital currency. However, blockchain has many general applications in addition to digital currencies and financial transactions.

Figure 27:
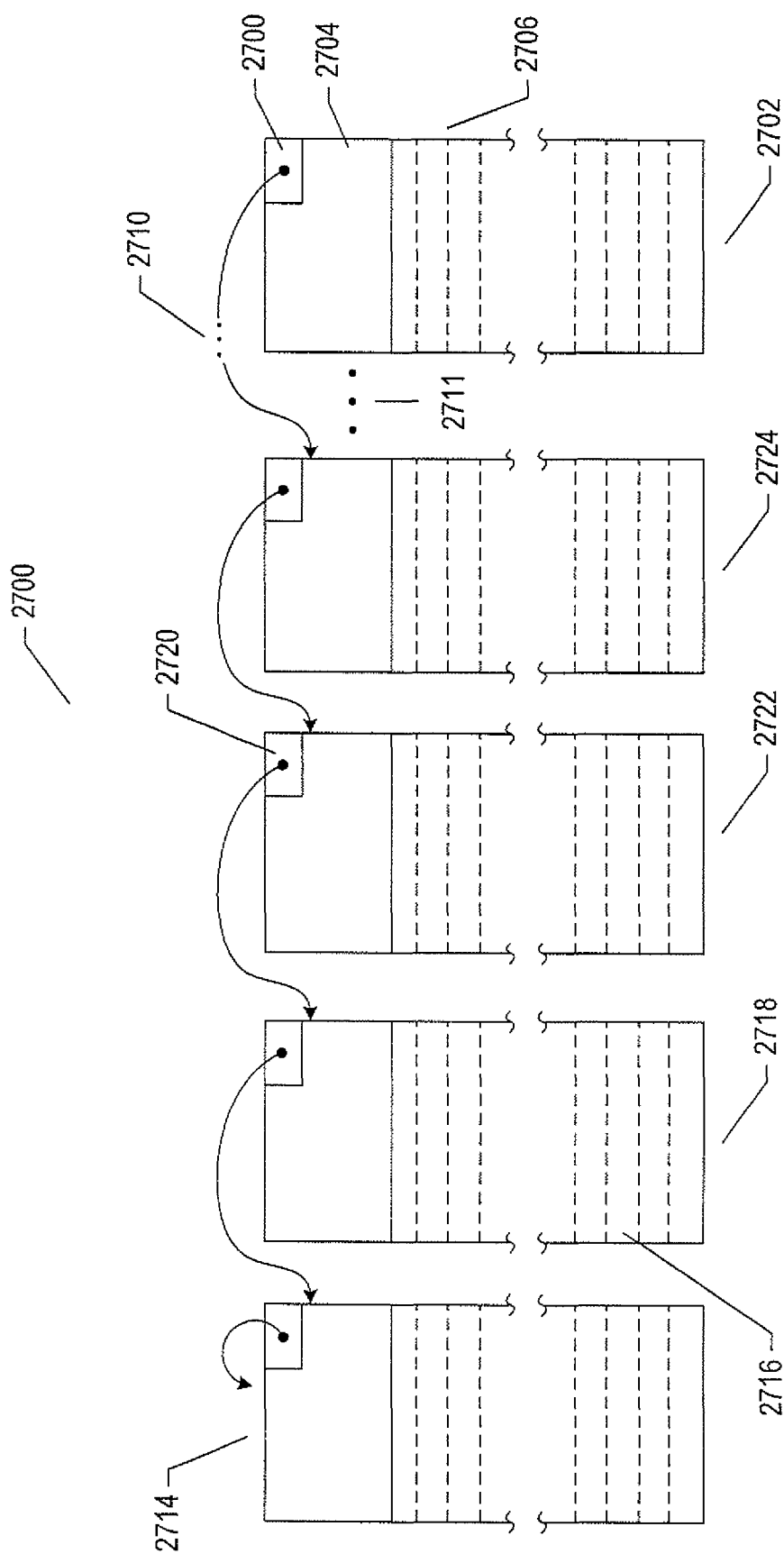
FIG. 27 illustrates the basic blockchain data structure.

FIG. 27 illustrates the basic blockchain data structure. The blockchain data structure 2700 is essentially a chain, or linked list, of blocks, such as block 2702 at the end of the linked list that represents the active head of the linked list to which an additional block can be added. Each block, such as block 2702, includes a header 2704 and a list of transactions 2706, with each transaction illustrated as a row or cell separated from adjacent transactions by dashed lines. The header 2704 includes a link 2708 that links the block to a previous block in the blockchain. Ellipses 2710-2711 in FIG. 27 are used to indicate that there may be many additional blocks and links in the blockchain 2700 illustrated in FIG. 27. The link 2708 is not a memory address, as is typically the case in in-memory data structures, but is instead a cryptographic hash value generated from the header of the preceding block in the blockchain. The initial block 2714 for the blockchain is referred to as the "genesis block." Details of the contents of the blocks and other aspects of blockchains are provided below. However, even from the few details illustrated in FIG. 27, it is clear that the contents of the blockchain blocks are essentially fixed and unchangeable, since, for example, a change made to the contents of transaction 2716 in block 2718 would change the cryptographic hash value of the header of block 2718 stored in field 2720 of block 2722, and similar changes would need to be propagated through all of the subsequent blocks, starting with block 2724. However, because the blockchain is a distributed data structure, with copies maintained by many computational nodes, such changes to one copy of the blockchain would be immediately detected by monitoring nodes, and the altered copy would be readily identified as having been corrupted. The blockchain is a public ledger in that the contents of the blockchain are publicly available and shared among many computational nodes.

Figure 28:
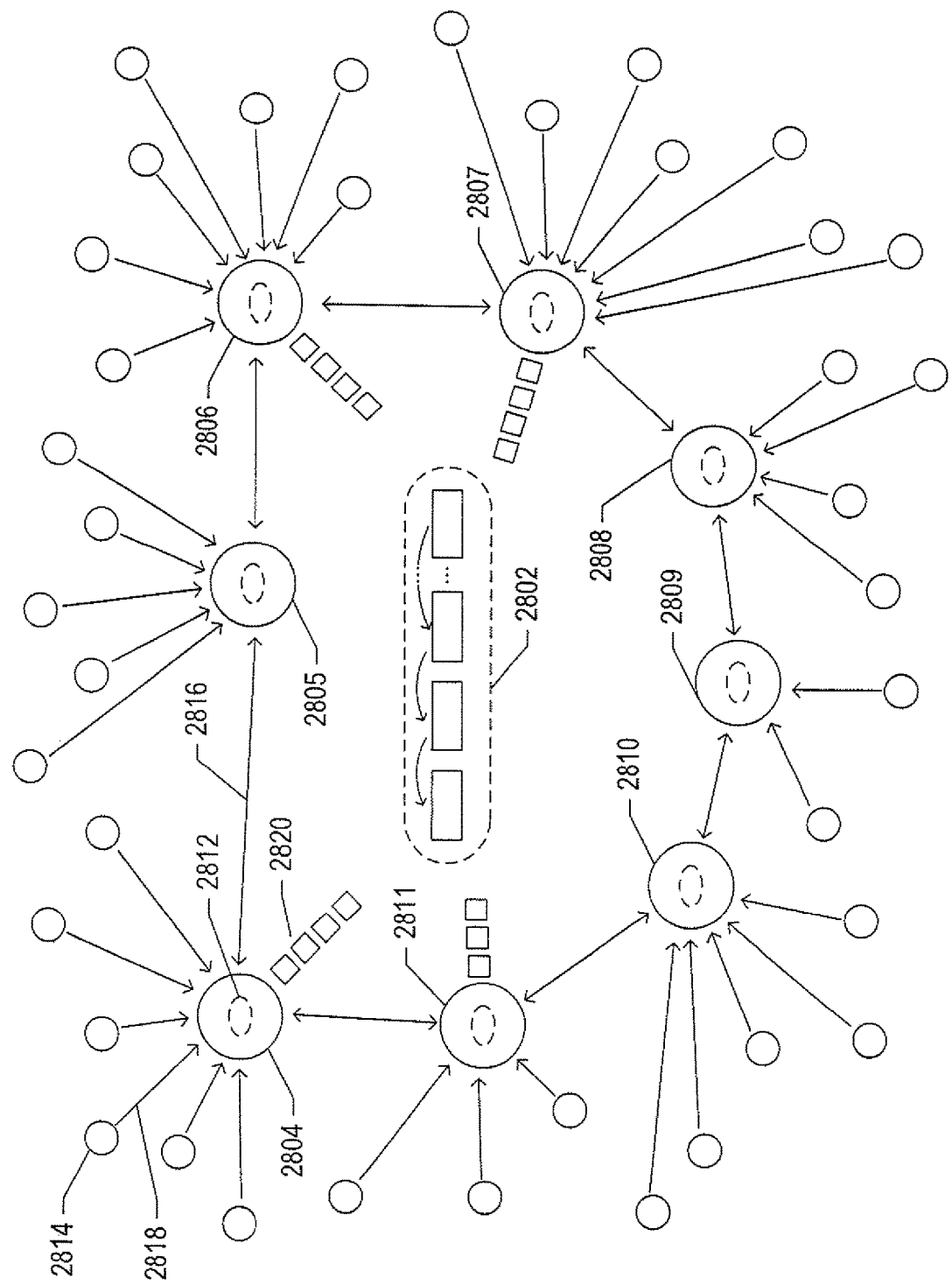
FIGS. 28-29 illustrates how the blockchain grows, over time.
Figure 29:
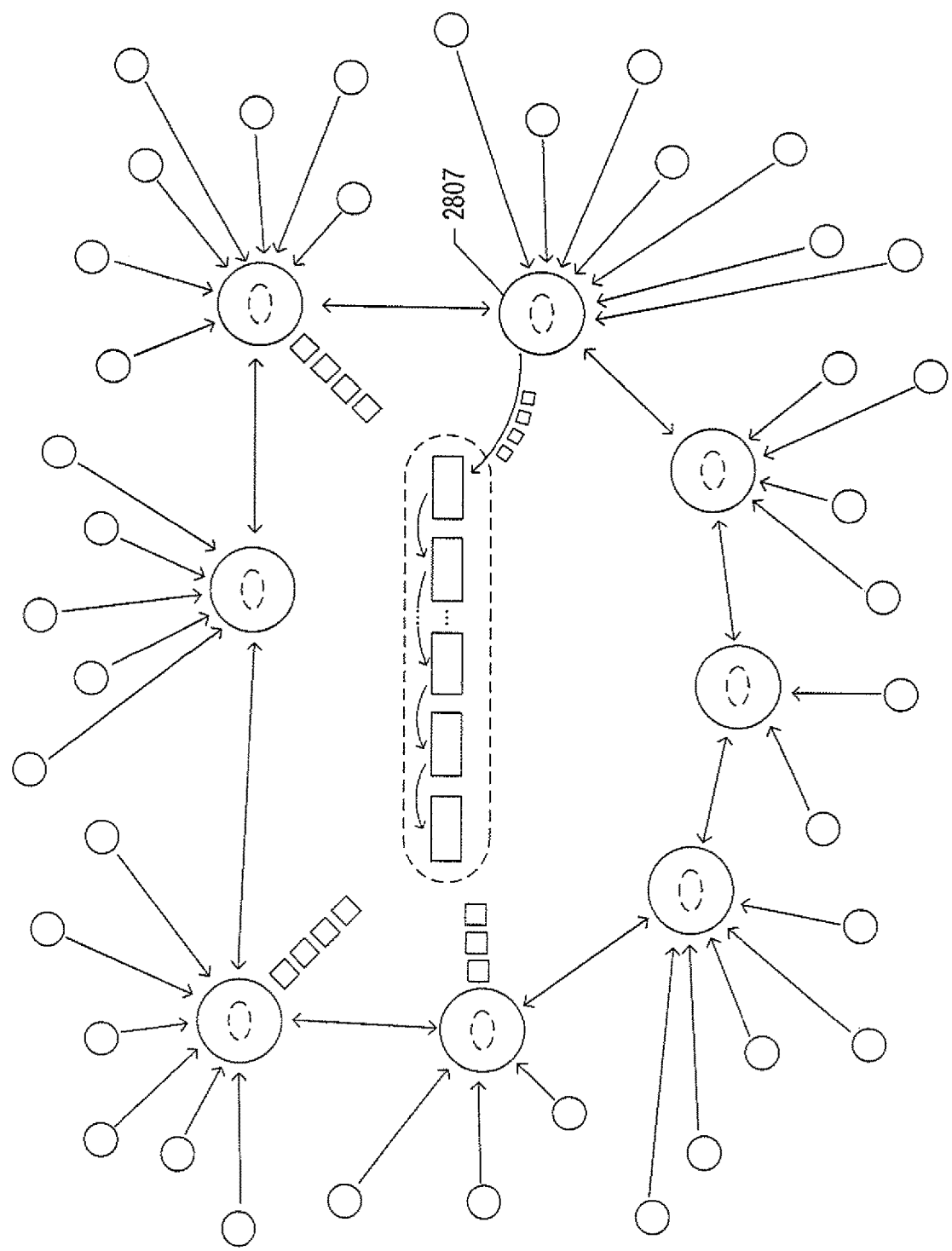

FIGS. 28-29 illustrates how the blockchain grows, over time. In FIG. 28, the blockchain 2802 is shown in the central portion of the figure surrounded by a dashed enclosing curve. FIG. 28 additionally shows a number of computational nodes 2804-2811. These computational nodes together cooperate to maintain the blockchain. The dashed ovals within each node, such as dashed oval 2812 within node 2804, indicate that each node maintains a copy of the blockchain data structure so that, as discussed above, the blockchain data structure is a distributed, shared data structure. In certain cases, only a portion of the blockchain may be stored by certain nodes. Each node, in turn, may be accessed by multiple client devices and systems, each represented by a smaller disk, such as disk 2814 representing client of node 2804. Double-headed arrows, such as double-headed arrow 2816, represent the fact that the nodes are in communication with one another. The arrows between clients and nodes, such as arrow 2818 between client 2814 and node 2804, represent client/server request/response communications between clients of the computational nodes.

There are various different types of computational nodes that cooperate to maintain the blockchain public ledger. Certain of the nodes shown in FIG. 28, including nodes 2804, 2806-2807, and 2811, are miner nodes. Miner nodes receive requests from clients to enter transactions into the blockchain. In FIG. 28, the miner nodes are shown to be associated with queues of pending transactions, such as the queue of pending transactions 2820 associated with miner node 2804. When a miner node has accumulated a sufficient number of transaction-recordation requests to fill a blockchain block, the miner node attempts to complete the block and enter the block into the blockchain by solving a generally difficult cryptographic problem. The difficulty of the cryptographic problem is variable, with the difficulty increasing as the frequency with which miner nodes attempt to enter blocks into the blockchain increases, so that there is a more or less constant average time between successive additions of blocks to the blockchain. When a miner node successfully prepares a next block and solves the cryptographic problem associated with the block, the block is a broadcast to the remaining nodes. When the remaining nodes verify that the cryptographic problem has been solved, verify the contents of the block, and verify the contents of the block with respect to the current contents of the blockchain, the nodes add the block to the head of the blockchain. FIG. 29 illustrates miner node 2807 successfully completing a block, solving of the cryptographic problem associated with the block, and adding the block to the blockchain. As discussed below, a block contains a cryptographic hash value for each transaction recorded in the block and additionally contains a Merkle-tree root computed from the cryptographic hash values associated with each of the transactions. One approach to verifying the contents of the block would be to recompute the hash value for the transactions and the Merkle-tree-root value to ensure that the recomputed values match the values within the block. However, there are a variety of other types of verification steps carried out by computational nodes to verify a block. The transactions within the block must also not have previously been recorded in the blockchain.

Figure 30A:
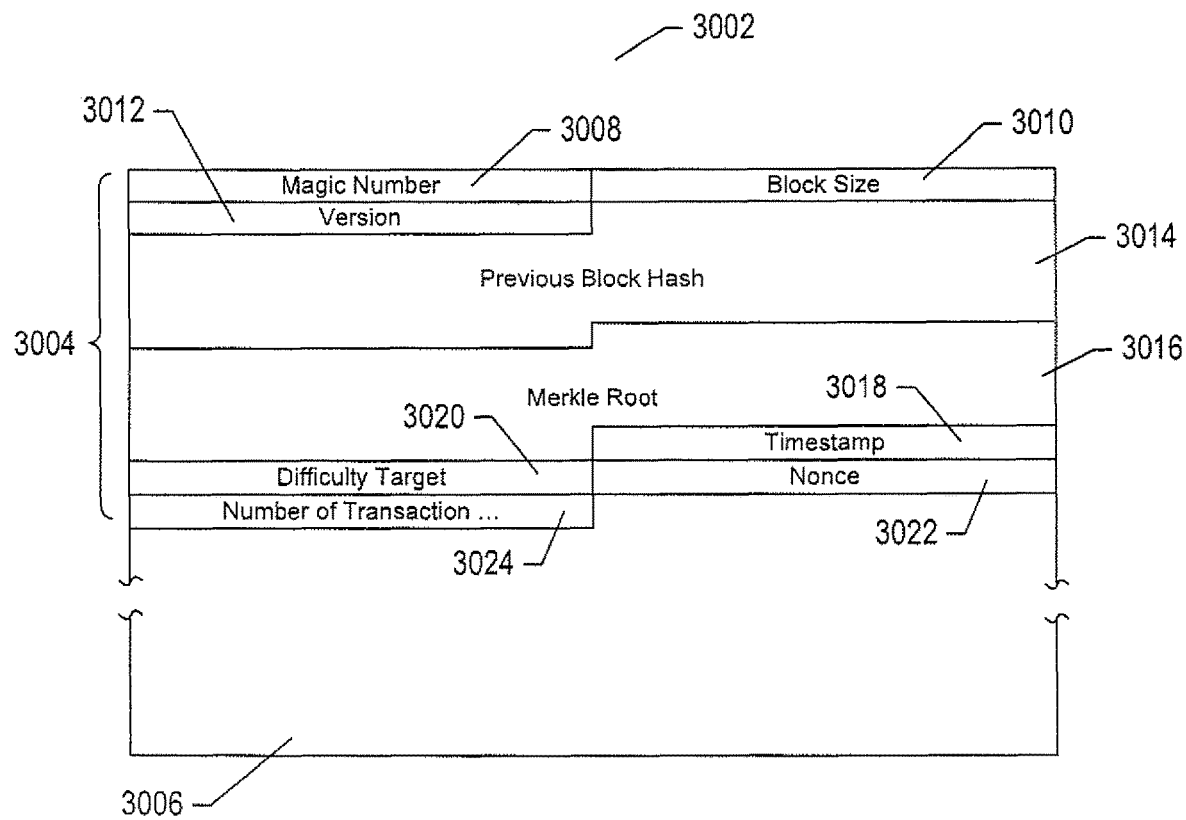
FIGS. 30A-B illustrate the contents of a blockchain block.
Figure 30B:
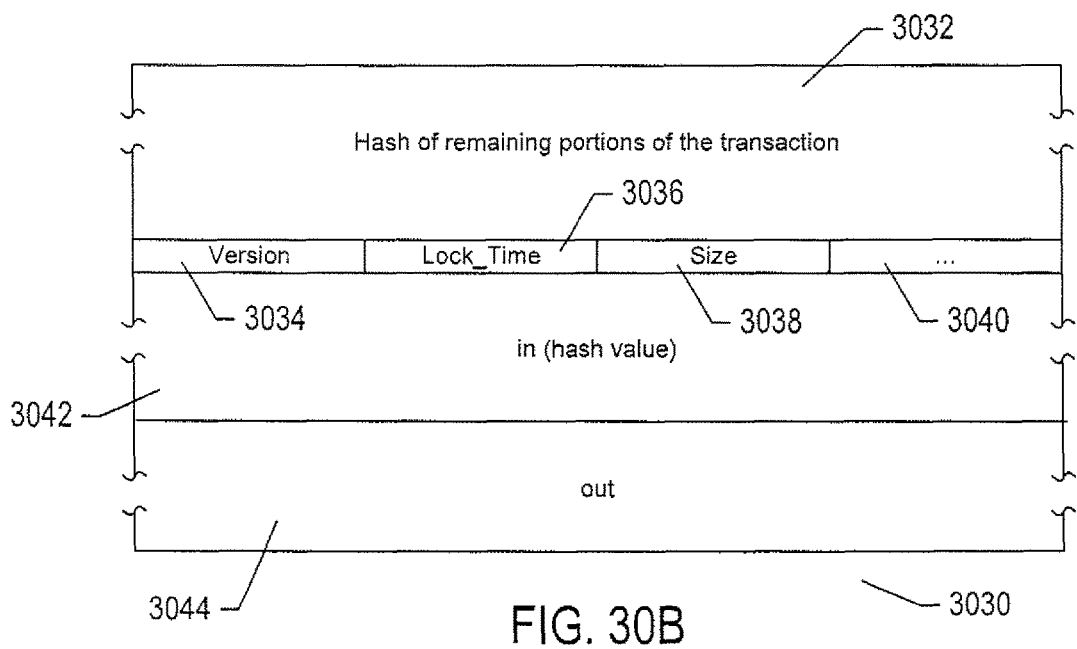

FIGS. 30A-B illustrate the contents of a blockchain block. A blockchain block 3002 includes a header 3004 and a body 3006. The header includes an identifying magic number 3008, an indication of the size of the block 3010, a version number 3012, the cryptographic hash value for the previous block in the blockchain 3014, discussed above, the Merkle root 3016, a timestamp 3018, a difficulty target 3020, and a nonce 3022. The body 3006 includes an indication of the number of transactions 3024 followed by descriptions of all the transactions recorded in the block. The difficulty target 3020 and the nonce 3022 are values related to the cryptographic problem that needs to be solved by a miner node in order to add the block to the blockchain. The miner node needs to determine a nonce, which is a 32-bit value, so that a cryptographic hash of the block header, including valid values for all of the fields, is a number with a value less than the difficulty target. Because, as discussed above, cryptographic hashes generally produce very different output values for similar input values, and because the output values are well distributed throughout the range of potential values output by the cryptographic hash, it is a computationally difficult problem to identify a nonce that will render the output value from a cryptographic hash less than the difficulty target.

FIG. 30B illustrates a transaction description 3030 included in the body 3006 of a blockchain block 3002 to record a transaction. The transaction description includes a cryptographic hash value 3032 generated from the remaining fields of the transaction description. These fields include a version number 3034, a lock-time indication 3036 that specifies a time interval prior to commitment of the transaction, the size of the transaction description 3038, and may potentially include additional fields 3040. In addition, the transaction description includes the hash value of a transaction already recorded in the blockchain 3042 and an output value 3044. In certain types of blockchains, there may be multiple input and output fields, and in other types of blockchains, the transaction description may contain different fields from those shown in FIG. 30B.

Figure 31:
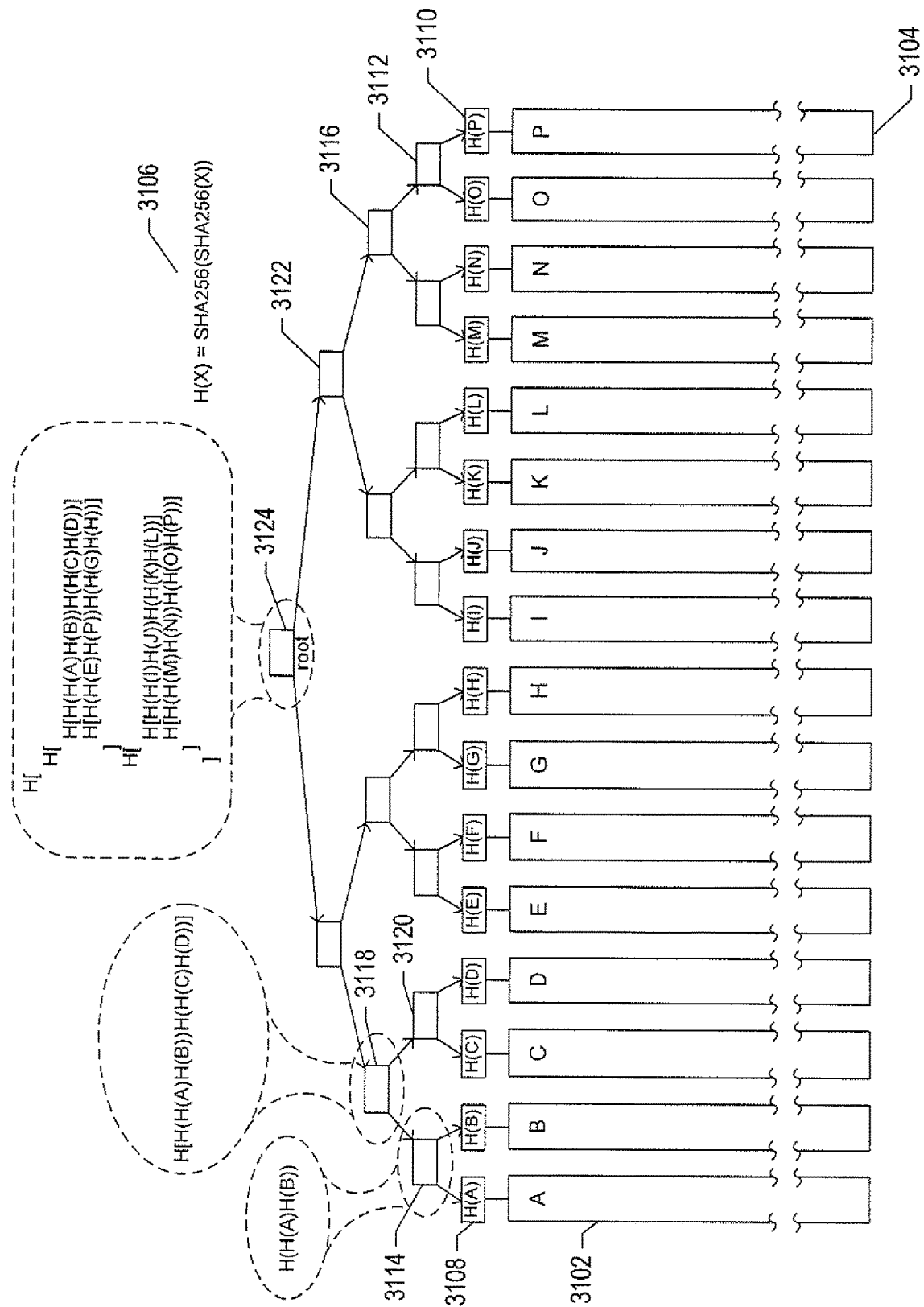
FIGS. 31-32 illustrates the Merkle-tree data structure.
Figure 32:
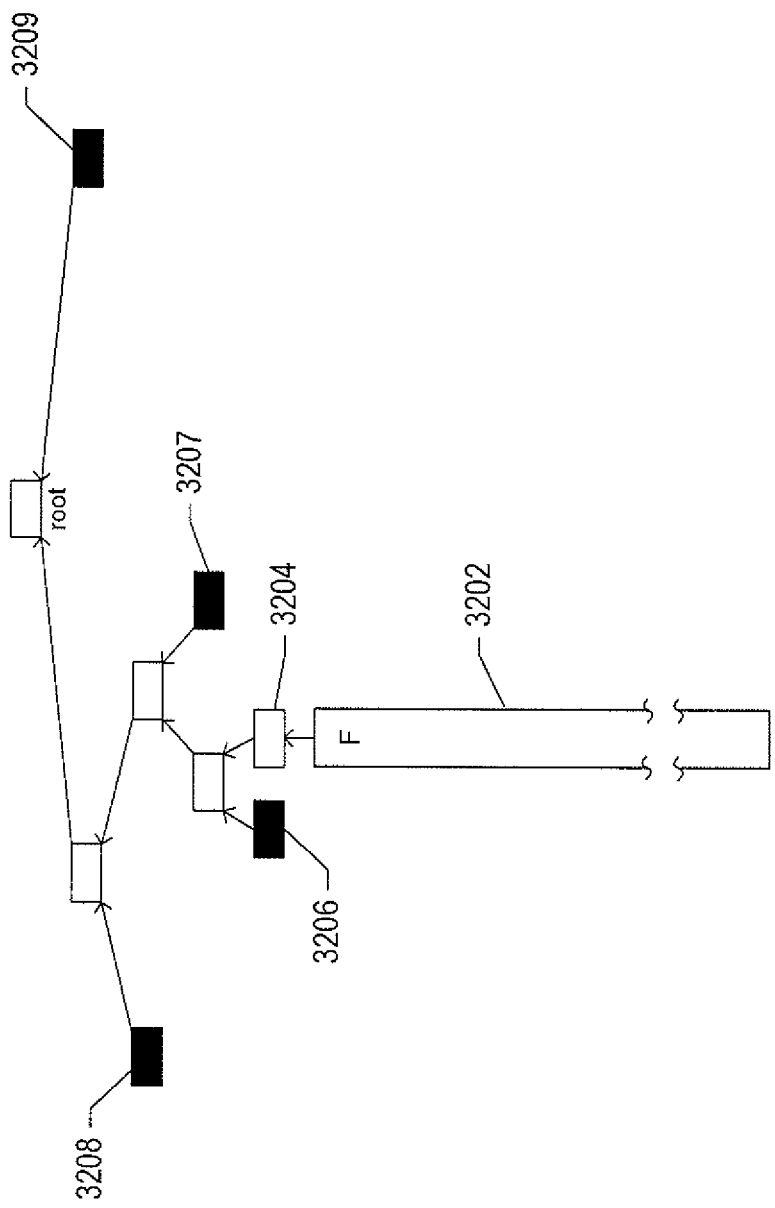

FIGS. 31-32 illustrates the Merkle-tree data structure. In FIG. 31, an ordered set of transaction descriptions is represented by a row of rectangles, including rectangle 3102, in the lower portion of the figure. These transaction descriptions have single-letter designations and include transaction descriptions A 3102 through P 3104. The cryptographic hash used for generating the Merkle-tree data structure 3106 is denoted H(x), where x is an input transaction description or a pair of concatenated hash values. One cryptographic hash used for this purpose is, as shown in expression 3106, obtained by application of the SHA256 cryptographic hash function to the input x to produce an intermediate result to which the SHA256 cryptographic hash function is again applied. The cryptographic hash H(x) is applied to each transaction description to generate a leaf node of the Merkle-tree data structure. For example, the cryptographic hash applied to transaction description A generates the hash value H(A) which is included in a leaf node 3108. The leaf nodes form a first, lowest level 3110 of the Merkle-tree data structure. A next level 3112 of the Merkle-tree data structure includes intermediate nodes, such as intermediate node 3114, that contains the hash value of the concatenated hash values of two leaf nodes. Intermediate nodes 3114, for example, contains the hash value H(H(A)H(B)). A third level of the Merkle-tree data structure 3116 includes intermediate nodes containing hash values of the concatenated hash values in two lower-level intermediate nodes. For example, third-level node 3118 includes the hash value of the concatenated hash values in second-level nodes 3114 and 3120. A fourth level of the Merkle-tree data structure 3122 includes two nodes and the final level of the Merkle-tree data structure includes only the root node 3124. The value contained in the root node thus depends on all of the transaction descriptions, the hash values of which are contained in leaf nodes. Thus, by including the Merkle-tree root-node value in the block header of blockchain blocks, the value of the block header depends on all of the transaction descriptions contained in the block. The depth, or number of levels, in a Merkle tree depends on the number of leaf-nodes needed to store the hash values for all of the transaction descriptions in a block.

FIG. 32 illustrates a relatively rapid and computationally efficient method, based on the Merkle-tree data structure, for determining whether or not a particular transaction description is included in a blockchain block. Given the transaction description 3202 and the cryptographic hash of the transaction description 3204, along with an additional number of node values equal to the number of non-root levels in the Merkle-tree data structure 3206-3209, the root-node value can be computed and compared to a known root-node value for the Merkle-tree data structure. When the computed root-node value is identical to the known root-node value, there is an extremely high probability that the transaction description is contained in the blockchain block containing the known Merkle-tree root-node value. This is generally significantly more computationally efficient than searching the block to find a matching transaction-description hash value.

Many different types of Merkle-tree data structures are possible. The Merkle-tree data structure shown in FIG. 31 is a binary tree, in which each non-leaf node has two child nodes. However, Merkle-tree data structures in which each non-leaf node has more than two child nodes are also possible. When the number of transaction descriptions of the blockchain block is insufficient to fill all of the leaf nodes for the Merkle-tree data structure, the final hash value generated for the final transaction description can be repeated in the remaining leaf nodes to complete the Merkle-tree data structure.

Figure 33:
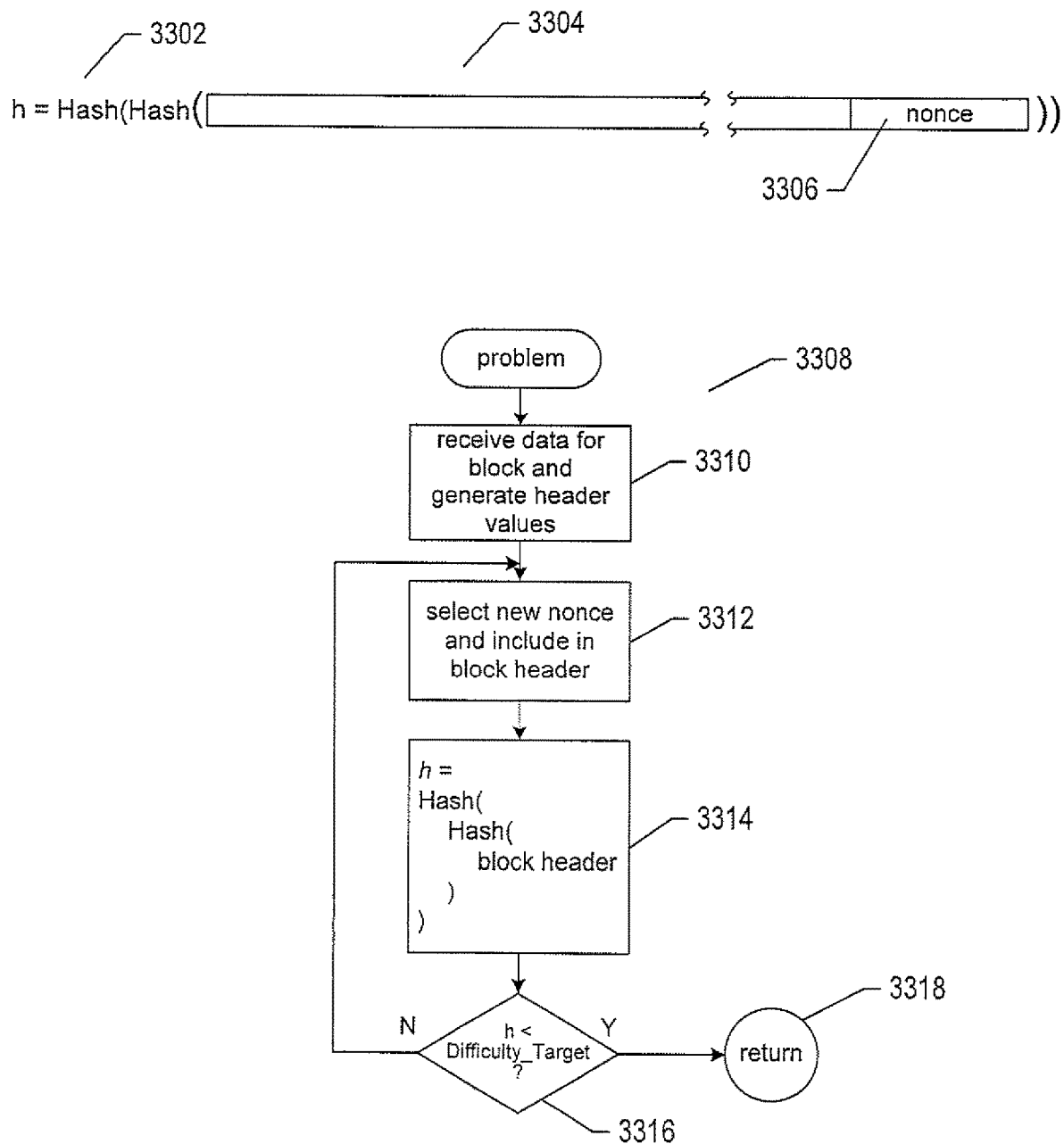
FIG. 33 illustrates the cryptographic problem that must be solved by a miner node in order to add a block to the blockchain.

FIG. 33 illustrates the cryptographic problem that must be solved by a miner node in order to add a block to the blockchain. As discussed above, a hash value h 3302 is generated from the block header 3304 that includes a nonce value 3306 selected by the miner node. The cryptographic problem shown in FIG. 33 in control-flow diagram 3308. In step 3310, the data for a new blockchain block is received and processed in order to generate the values for the fields of the block header other than the nonce. In step 3312, a nonce is selected and included in the block header. In step 3314, the hash value h is computed for the block header. When the hash value h is less than the difficulty target, as determined in step 3316, the selected nonce solves the cryptographic problem and the process terminates 3318. Otherwise, control flows back to step 3312, in which a new, different nonce is selected. There may be a variety of different methods for selecting candidate nonces and a variety of different approaches for solving the problem, but the basic problem is, as illustrated in FIG. 33, to find a nonce such that a cryptographic hash of the block header including the nonce and current values for the other fields generates a value less than the difficulty target. The timestamp field in the block header may need to be continuously updated during the process of finding an acceptable nonce.

Figure 34:
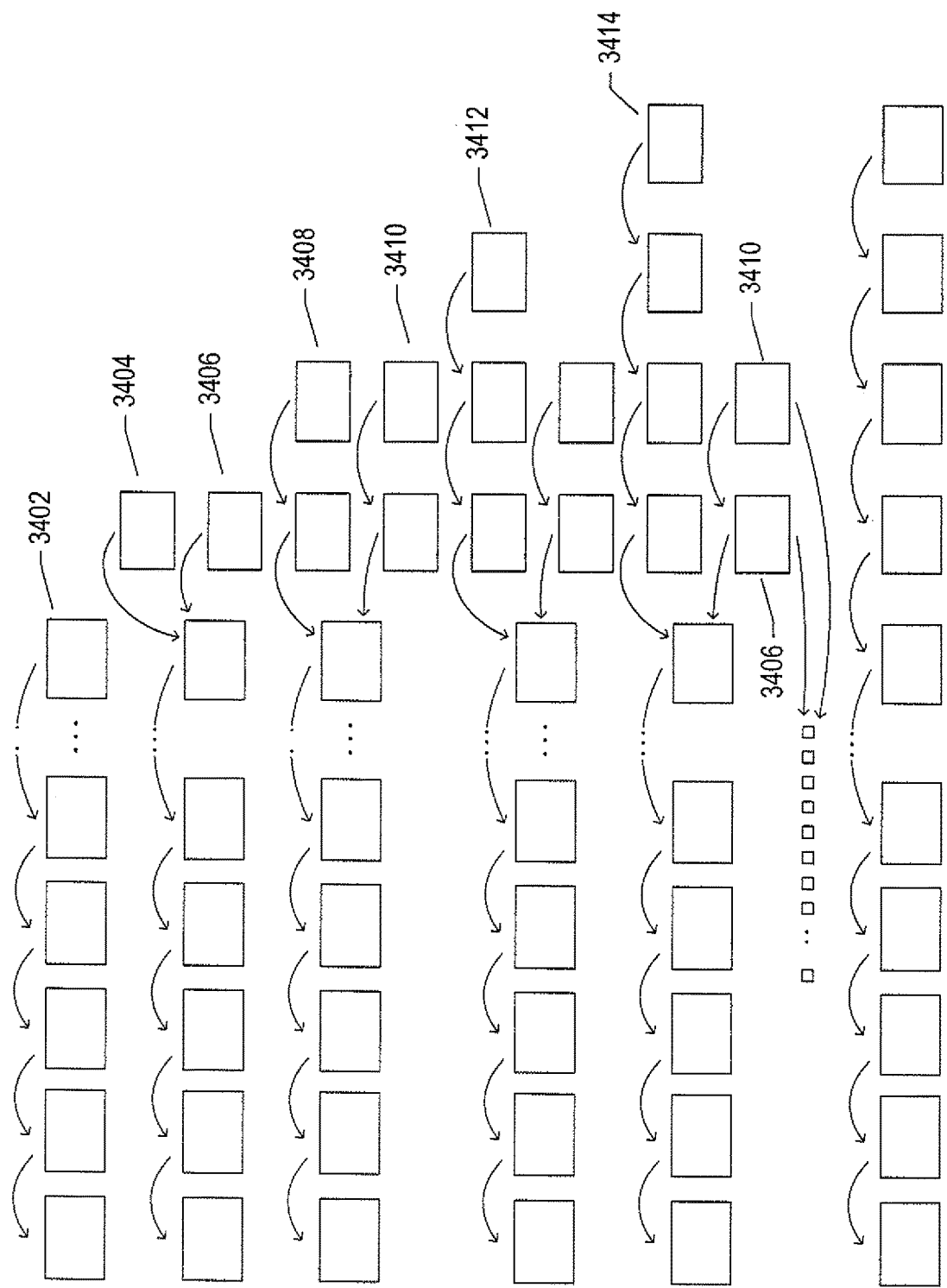
FIG. 34 illustrates an additional feature of the blockchain public ledger.

FIG. 34 illustrates an additional feature of the blockchain public ledger. A current blockchain 3402 is shown at the top of the figure. Then, two different miner nodes solve the cryptographic problem within a short time in order to add new blocks to the blockchain. Both able to add a different block to the blockchain 3404 and 3406. In this case, a fork has been introduced into the blockchain. The miner nodes may then continue attempting to add new blocks to the blockchain, some working on a first branch of the fork and others working on a second branch of the fork. In the example shown in FIG. 34, a next block has been added to each branch of the fork 3408 and 3410. However, the time needed to solve the cryptographic problem is variable, so that, eventually, a block is added to one of the forks well before another block can be added to the other of the forks. In the example shown in FIG. 34, block 3412 has been successfully added to the upper branch of the fork prior to addition of a block to the lower branch of the fork. The miner nodes follow a rule that blocks should only be added to the longest continuous chain within the blockchain. While it may make time for added data blocks to propagate among the miner nodes, because the time to solve the cryptographic problem is variable and the average time is significant, it is highly probable that one of the two branches of any particular fork will end up becoming the recognized longest chain within the blockchain within a relatively short period of time. Thus, in the example shown in FIG. 34, the upper branch has clearly been accepted as the longest branch and a next block 3414 has been added to it. Later on, monitoring nodes will discover that the two blocks 3406 and 3410 of the lower branch have timestamps indicating that they have been present in the blockchain for too great a period of time without having been accepted by consensus of the blockchain nodes. In this case, custody of the transactions within these blocks are returned to the miner nodes who added the blocks to the blockchain, the blocks are pruned from the blockchain, and the transactions will generally be incorporated into subsequently added blocks. In general, older transactions are given priority to ensure that transactions do not languish indefinitely in transaction queues.

In FIG. 28, four of the computational nodes 2804, 2806-2007, and 2811 are miner nodes. However, there are additional non-miner nodes that include nodes 2805 and 2808-2810. The non-miner nodes may carry out additional tasks related to blockchain maintenance which include monitoring the blockchain to verify each block within the blockchain and to verify the consistency of the blockchain data structure. Because the blockchain is distributed among multiple cooperating nodes, and because the contents of the blockchain are, as discussed above, secured by layers of cryptographic values, the likelihood that a malicious entity would be able to alter the data stored within the blockchain or employ any of a variety of strategies to defeat transaction uniqueness is so vanishingly small as to be nearly impossible. Because the blockchain is not controlled by a single entity, it is far less vulnerable to various types of attack than are centralized data repositories.

Figure 35:
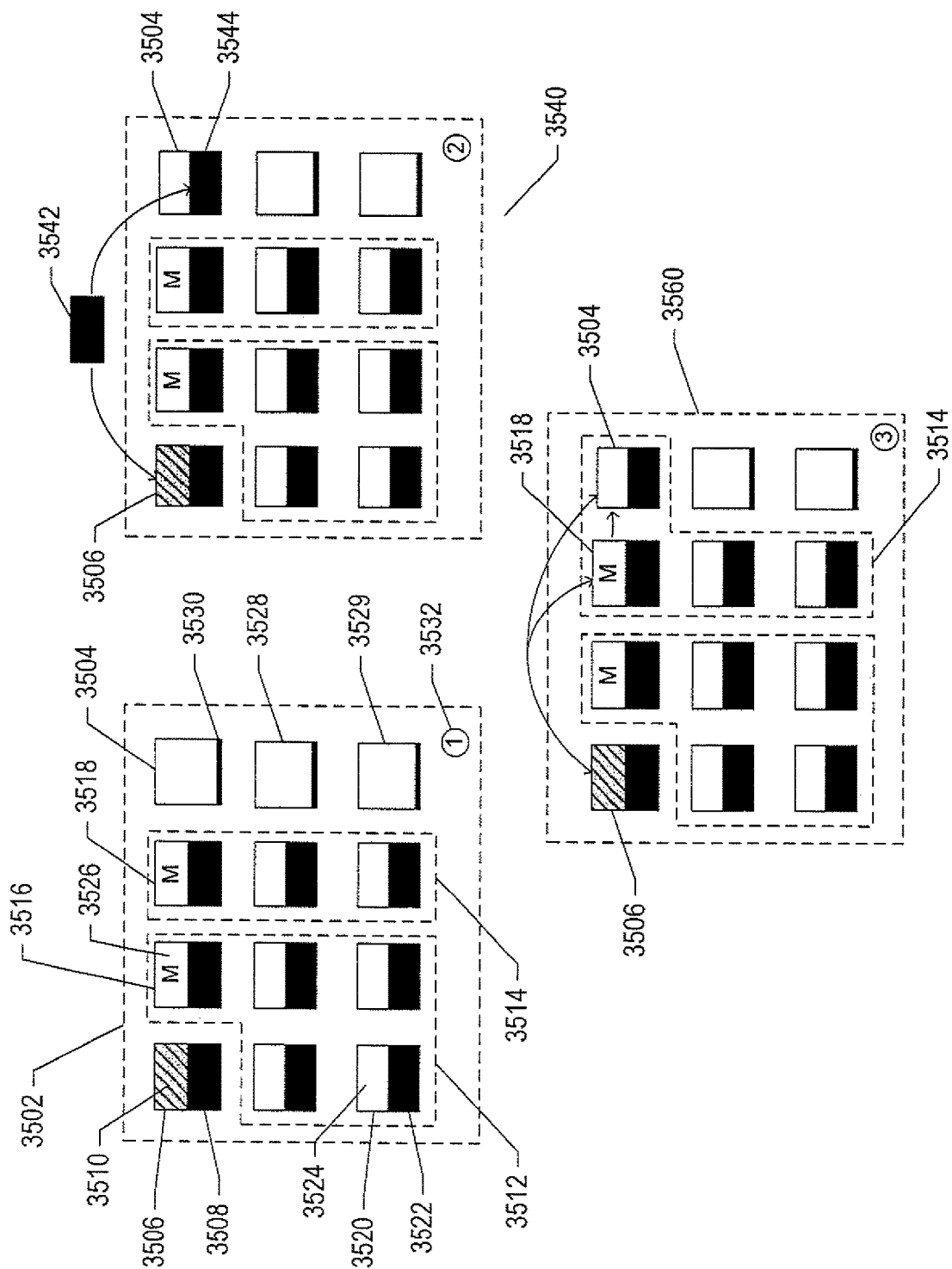
FIG. 35 illustrates imaging of a host server computer in a distributed computing environment.
Figure 36:
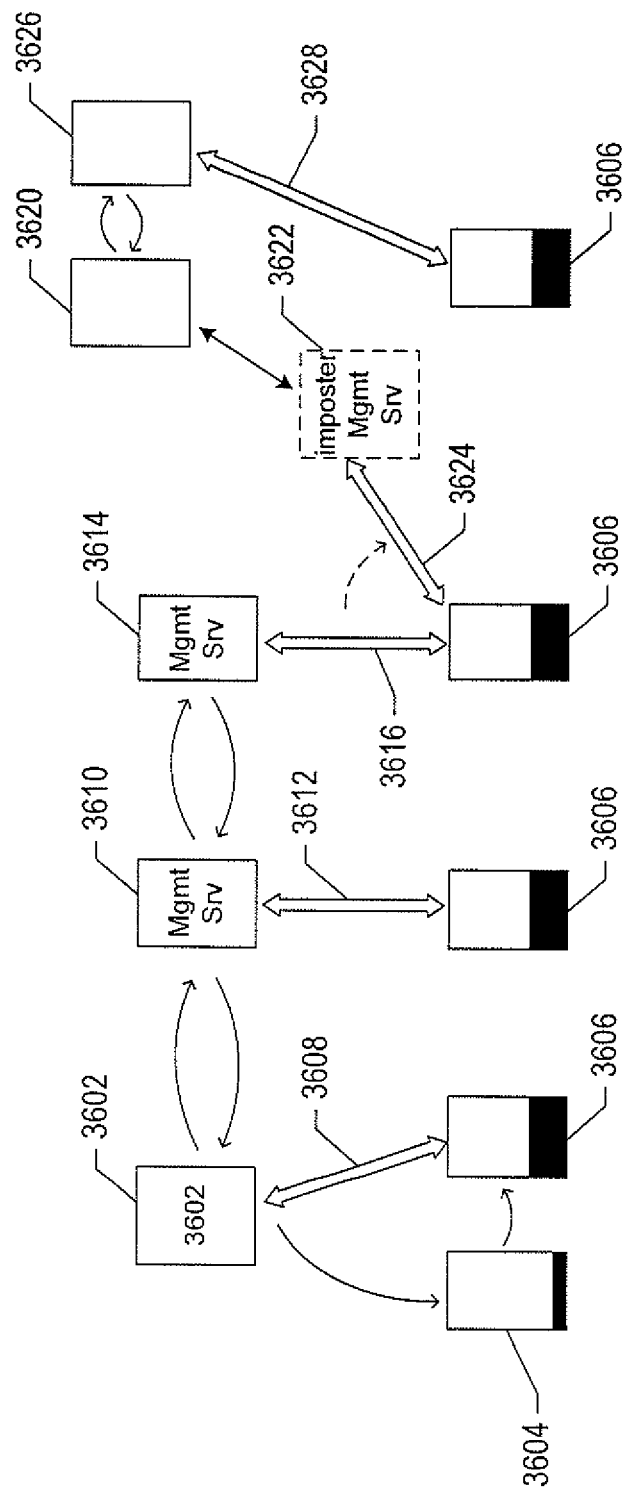
FIG. 36 illustrates one example of a control-transfer problem that may arise within a distributed computing system.

Secure Transfer of Control Over Computational Entities in a Distributed Computing Environment FIGS. 35-36 illustrate one example of the problem domain related to control over computational entities within distributed computing systems mentioned above, in the background section of the current document. FIG. 35 illustrates imaging of a host server computer in a distributed computing environment. In FIG. 35, the distributed computing environment is represented by an outer dashed rectangle 3502 that includes a number of server computers, each represented by a small rectangle, such as small rectangle 3504. Server 3506 is an imaging entity responsible for imaging host servers and for initial control of newly imaged host servers. The imaging entity includes a hardware layer and a full virtualization layer and operating system, represented by the shaded rectangle 3508, as well as a variety of executables and applications, represented by cross-hatched rectangle 3510, that implement imaging-entity functionality and logic. There are two different tenant-owned virtual data centers within the distributed computing system, each represented by a number of servers surrounded by a dashed boundary, including virtual data center 3512 and virtual data center 3514. Each virtual data center includes a management server. Management server 3516 manages virtual data center 3512 and management server 3518 manages virtual data center 3514. Each host server within a virtual data center, such as host server 3520, includes a hardware layer and full virtualization layer and operating system, represented by the shaded rectangle 3522, and one or more applications and other executables, represented by unshaded rectangle 3524, that constitutes the functionality and logic provided by the host server. The management server, such as management server 3516, includes data-center management applications and logic, represented by the unshaded rectangle 3526 labeled with the symbol "M." The distributed computing system additionally contains three unimaged servers 3504 and 3528-3529. The unimaged servers include only a hardware layer and a basic input/output system ("BIOS"), represented by the narrow, shaded rectangle, such as narrow shaded rectangle 3530 in unimaged server 3504. As indicated by the circled symbol "1" 3532, the representation of the distributed computing system 3502 is a representation of a first state of the distributed computing system.

Representations 3540 and 3560 provided representations of two subsequent states of the distributed computing system. In the second state of the distributed computing system, the imaging entity 3506 images the unimaged host server 3504 by installing a virtualization layer and operating system 3542 within the host server 3504, as a result of which the host server is shown to contain a full virtualization layer and operating system 3544. Once a host server is imaged, the host server is generally connected to one or more internal communications networks within the distributed computing system and is capable of receiving and executing executables, applications, and other logic. In general, the imaging entity 3506 maintains a pool of imaged host servers controlled by the imaging entity on which additional executables and applications have not yet been installed. The imaging entity subsequently transfers control of these imaged host servers to management servers within virtual data centers, which then install various executables and applications in the imaged host servers and fully incorporate the host servers within a virtual data center, where the host servers are managed by the management server. Of course, there are a variety of more complex configurations. For example, each virtual data center may include a separate imaging entity that images and initially controls host servers exclusively for the virtual data center. As another example, a virtual data center may include multiple management servers, in which case control of imaged host servers may be transferred from one management server to another management server within the virtual data center. As yet another example, in certain configurations, control of an imaged host server may be transferred from a management server within a first virtual data center to a management server within a second virtual data center. Furthermore, control of imaged host servers is but one example of the many types of control maintained over computational entities within distributed computing systems. For purposes of describing the currently disclosed methods and systems for secure transfer of control, the simple example shown in FIG. 35 provides a sufficient context, but the secure-control-transfer methods and systems disclosed in the current document can be used for secure transfer of control over other types of computational entities and components within a distributed computing system.

Representation 3560 illustrates transfer of control of the imaged host server 3504 to the management server 3518 within virtual data center 3514. The transfer of control is a three-party interaction involving the imaging entity 3506, management server 3518, and the imaged host server 3504. This interaction may be initiated by the management server requesting additional host-server resources from the imaging entity. The imaging entity then communicates with the imaged host server to prepare the imaged host server for control transfer and then may respond to the management service request by indicating, to the management server, the network address of the imaged host server and access information for the imaged host server. A centralized server-ownership data store may be updated by the imaging entity and a variety of other types of data may be recorded by the imaging entity and the management server to affect the transfer of control over the imaged host server to the management server.

FIG. 36 illustrates one example of a control-transfer problem that may arise within a distributed computing system. As shown in FIG. 36, an imaging entity 3602 images an unimaged host server 3604 to produce an imaged host server 3606 which the imaging entity initially controls, as represented by arrow 3608. Subsequently, the imaging entity transfers control of the imaged host server to a management server 3610. Arrow 3612 indicates that management server 3610 now controls the imaged host server 3606. Management server 3610 then transfers control to a different management server 3614, which assumes control 3616 of the imaged host server 3606. At this point, a malicious entity 3620 creates an imposter management-server interface 3622 that is able to assume at least partial control 3624 of the imaged host server 3606. The malicious entity then transfers control of the imaged host server to itself or to another entity 3626, which assumes control 3628 over the imaged host server 3606. Once the malicious entity assumes control of the imaged host server, the malicious entity may install various types of executables to allow the malicious entity to access confidential data within the virtual data center managed by management server 3614, damage or destroy data, run malicious applications using virtual-data-center resources, and breach additional security layers to access other components of the distributed computing system. Even when a malicious entity can obtain only partial control 3624 of the imaged host server, the malicious entity can often breach security measures to access confidential data and cause significant damage to the virtual data center. This is because management servers have privileged access to management agents within host servers managed by the management servers that allow management servers to bypass normal security measures to access data, alter host-server configuration, install and remove executables and applications, and perform many similar additional operations. Ultimately, the security of the distributed computing systems relies on uninterrupted control of computational entities within the distributed computing system by authenticated controlling entities, and generally relies on the fact that a given computational entity is controlled by a single controlling entity at each point in time. However, when control depends on centralized information and control-transfer protocols that are vulnerable to attack from malicious entities, a chain of authenticated and uninterrupted control cannot be guaranteed.

Figure 37:
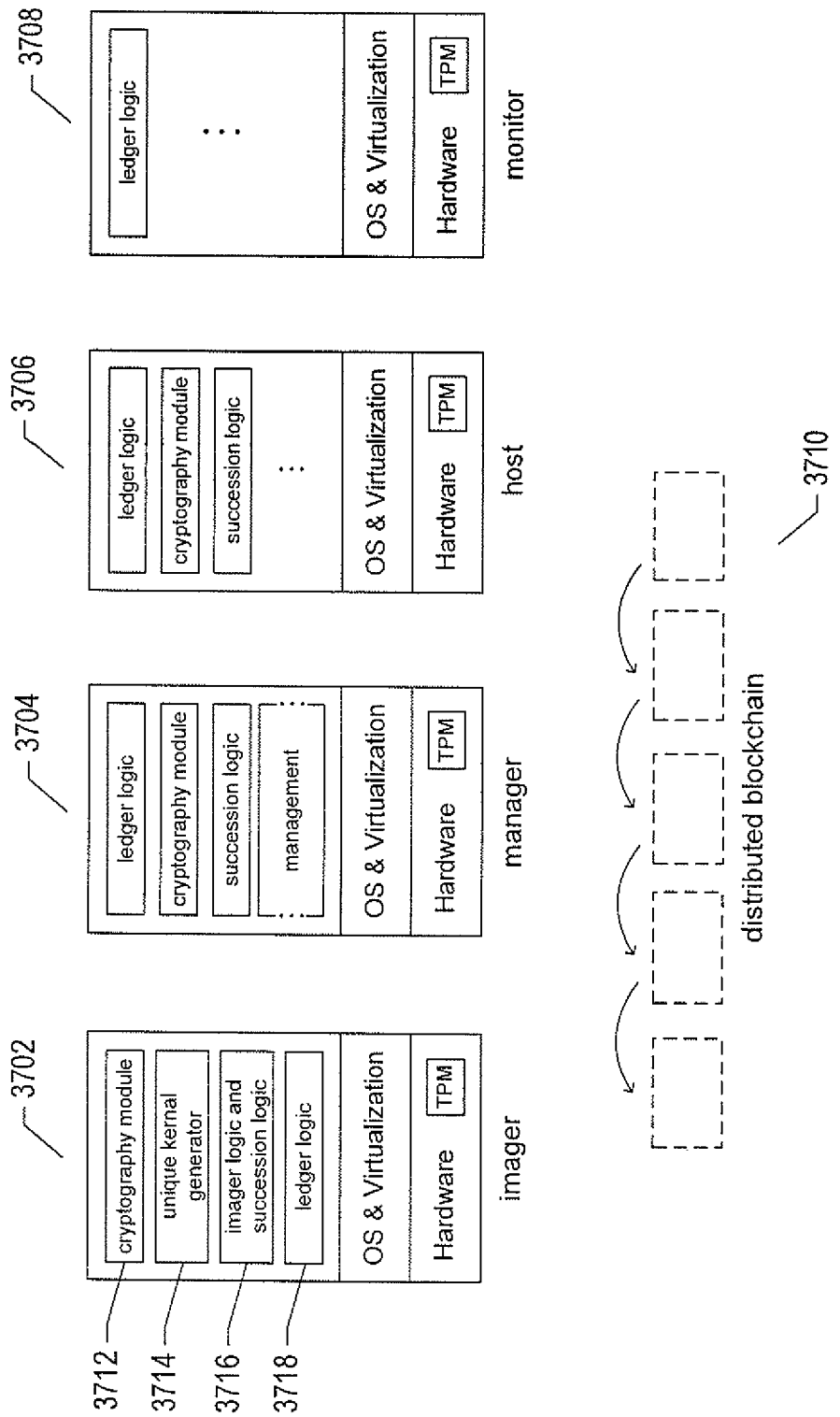
FIG. 37 illustrates components of the currently disclosed secure-control-transfer system related to the distributed-computing example, discussed above with reference to FIG. 35.

FIG. 37 illustrates components of the currently disclosed secure-control-transfer system related to the distributed-computing example, discussed above with reference to FIG. 35. As discussed above, the distributed computing system includes one or more imaging entities 3702, one or more management servers 3704, and host servers 3706 that together comprise the computational resources of, or shared among, data centers and virtual data centers. In addition, the system may include one or more monitoring nodes 3708 that cooperate with the imaging entity, management servers, and host servers to maintain a distributed blockchain 3710 that records the control transfers that occur within a distributed computing system. The imaging entity 3702 includes a cryptography module 3712 that provides encryption/decryption, digital-signing, and key-generation services, a unique kernel generator 3714 that generates unique kernels that are included in virtualization-layer and operating-system images installed in unimaged host servers by the imaging entity, imaging-entity logic and succession logic 3716, which includes logic related to control transfer, initial imaging, and other imaging-entity tasks, and ledger logic 3718 related to blockchain operations. A TPM included in the imaging entity may provide cryptographic services as well as permanent and non-volatile storage. Many of these modules and types of logic are also included in the management server 3704, imaged hosts 3706, and monitoring nodes 3708.

The currently disclosed secure-control transfer system employs the distributed public blockchain ledger to record all host-server imaging events and control-transfer events as well as a secure three-party control-transfer protocol to securely transfer control of computational entities between two controllers and record the control transfer in the blockchain. In addition, the blockchain may record the sequence of identities, encoded in encryption-key pairs, for the imaged host servers within the distributed computing system.

FIGS. 38A-D provide control-flow diagrams that illustrate secure imaging and establishment of a secure chain of control transfer within a distributed computing system according to the currently disclosed methods and systems. FIG. 38 *a* provides a control-flow diagram for a host-preparation method that prepares unimaged host servers for subsequent imaging. In step 3802, the unimaged host server is booted up to an initial BIOS-only state. In step 3803, the public key or keys of one or more imaging entities are transferred to the unimaged host server for secure storage. The current discussion, it is assumed that host servers and other components of the distributed computing system include TPMs, and the imaging-entity key or keys are stored in the TPM of the unimaged host server in step 3804. In alternative implementations, the needed TPM functionality can be provided by cryptographic modules, although at the cost of more complex and often less efficient methods. In certain implementations, a boot-request routine that can be invoked in the BIOS-only state is also transferred to the unimaged host server, in step 3805. Finally, the unimaged host server may be powered down, in step 3806, in the case that the unimaged host server is not designated for immediate addition to a distributed-computing-system resource pool.

FIGS. 38 B-D provide control-flow diagrams that illustrate secure imaging and establishment of a secure chain of control that is recorded in the blockchain. In these figures, host-server actions are shown in a right-hand column 3810 and imaging-entity actions are shown in a left-hand column 3812. The process begins, in the example shown in FIGS. 38B-D, when the unimaged host server, previously prepared by the process discussed above with reference to FIG. 38A, is powered on. In step 3814, the host server boots up into a BIOS-only state. In step 3815, information about the current contents and configuration of the unimaged host system is collected. Configuration metrics may be hashed and stored in the PCR registers of the TPM. In addition, a public/private key pair is generated by the TPM in securely stored within the TPM. The public key serves as a public identify of the host server. In step 3816, the collected environment information is encrypted, by the unimaged host server using a public imaging-entity encryption key retrieved from the TPM and sent to the imaging entity, along with an encrypted public key unimaged host server and a boot request. Arrow 3817 indicates sending of the information and boot request to the imaging entity. In step 3818, the imaging entity receives the boot request, decrypts the environment information and host key, and stores this information securely. In step 3819, the imaging entity retrieves, from mass-storage, a system download, or image, for installation in the unimaged host server. In step 3820, the imaging entity generates a unique kernel module for the unimaged host server and, in step 3821, includes the imaging entity's public key within the unique kernel as an indication of the current owner of the host server. The unique kernel module is generated by incorporating one or more unique values associated with the unimaged host server into the kernel executable, so that the cryptographic hash of the kernel code produces a unique value. The unique values may be derived, in part, from the public host key received in the boot request. In step 3822, a cryptographic hash value h is generated by application of a cryptographic hash function to the kernel. The host environment information is updated to include the image prepared by the imaging entity and a digital signature is generated for the hash value h using the imaging entity's private key. In step 3823, a portion of the unique kernel is encrypted, using the host public key, and that portion along with the remaining portion of the unit kernel and the remaining portion of the image, along with the encrypted and signed hash value h, is transmitted by the imaging entity to the unimaged host server. In step 3824, the unimaged host server receives the image and additional information and decrypts the encrypted portion of the information.

Figure 38A:
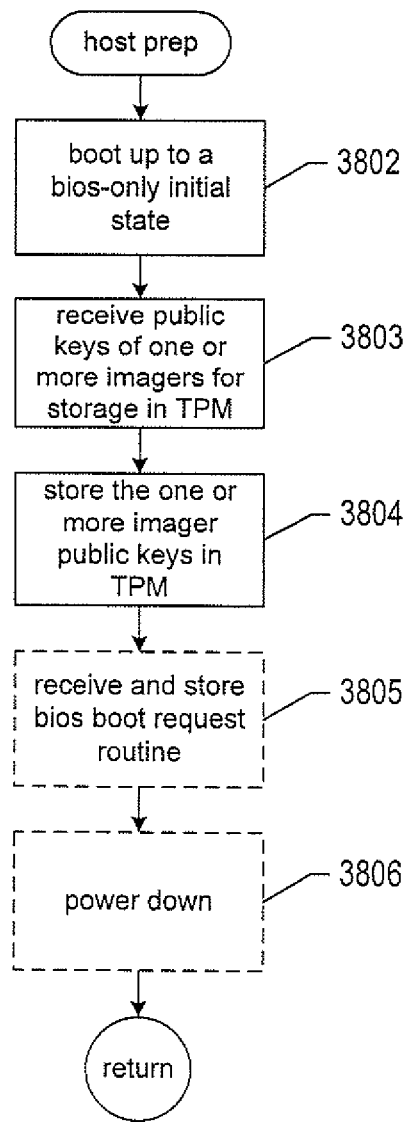
FIGS. 38A-D provide control-flow diagrams that illustrate secure imaging and establishment of a secure chain of control transfer within a distributed computing system according to the currently disclosed methods and systems.
Figure 38B:
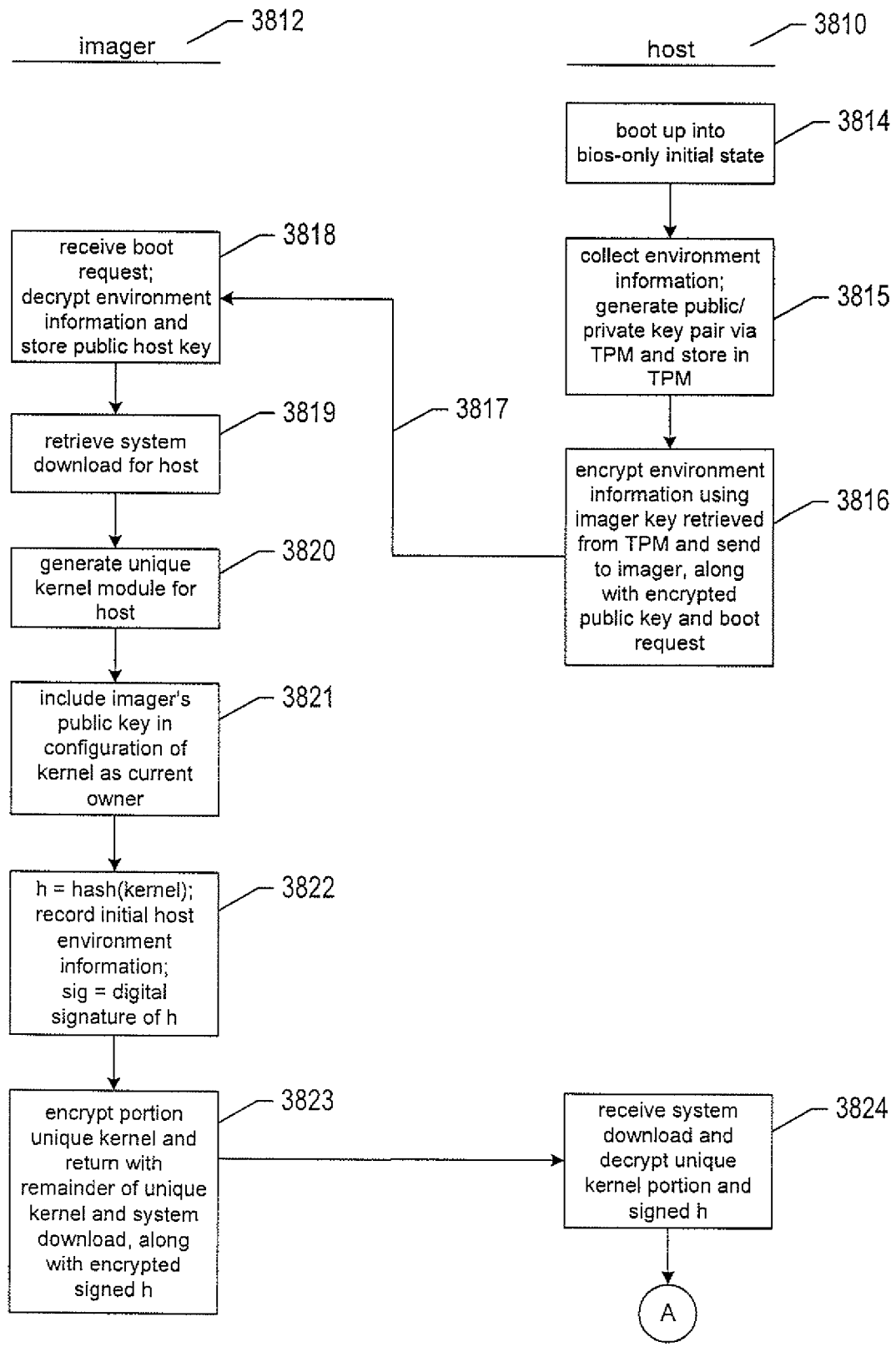
Figure 38C:
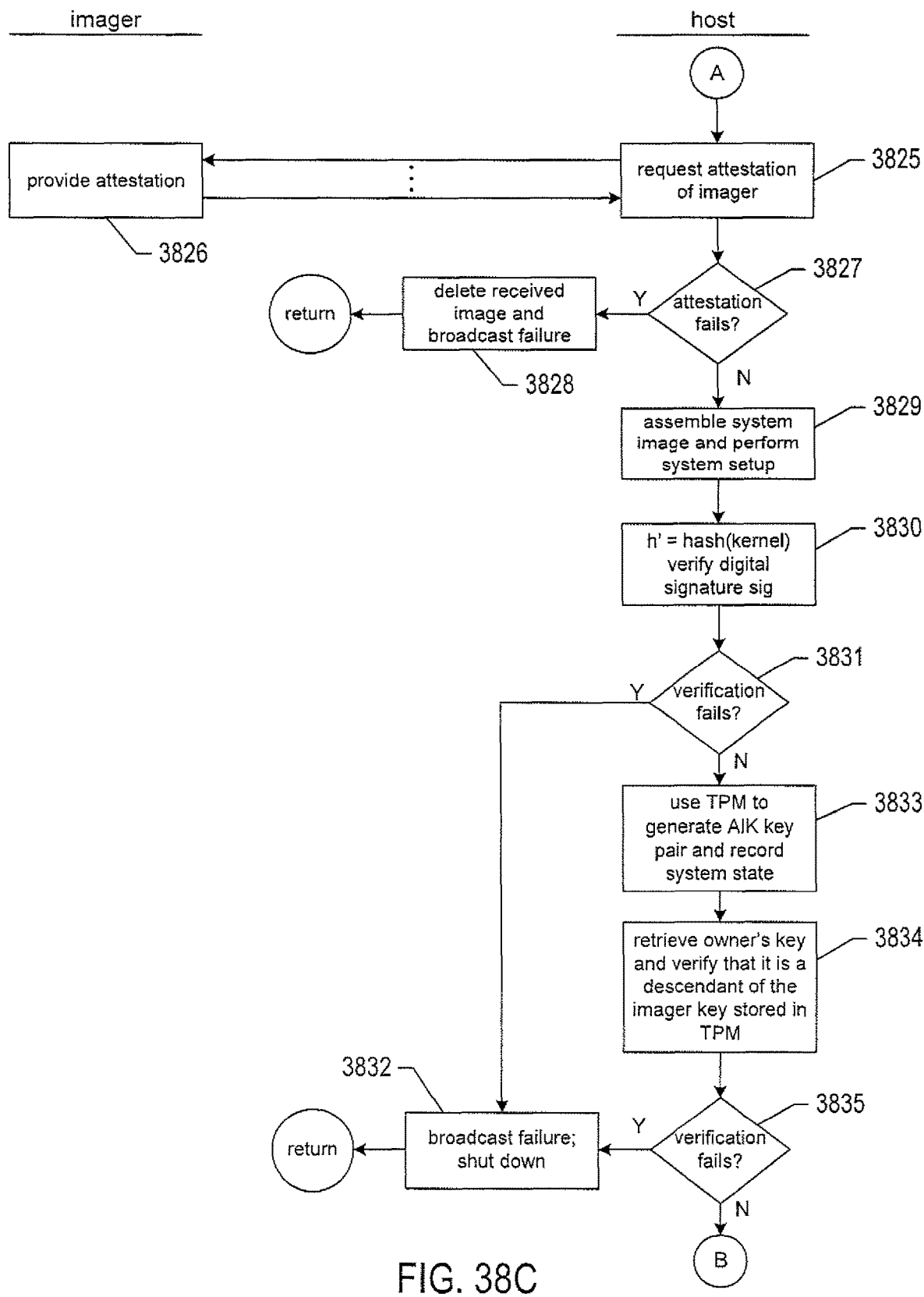
Figure 38D:
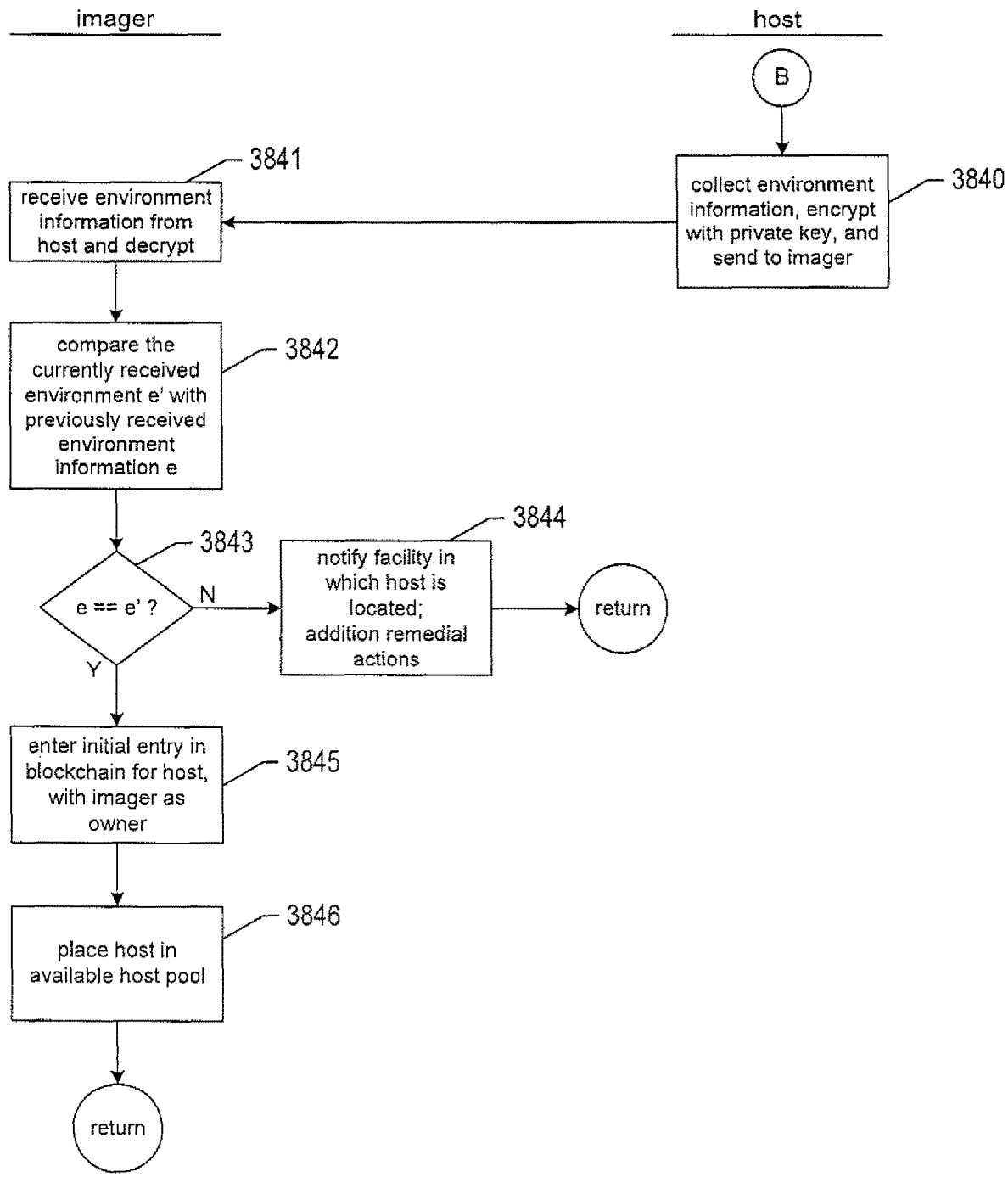

Continuing with FIG. 38C, upon receipt of the image and additional information, the unimaged host system, by running the boot-request routine downloaded to the unimaged host server in the host-preparation method discussed above with reference to FIG. 38A, requests remote attestation of the imaging entity, in step 3825, and, in step 3826, the imaging entity responds to the attestation request. Remote attestation provides a way for the unimaged host server to verify that it is communicating with the imaging entity corresponding to the imaging-entity public key stored in the unimaged host server's TPM. If remote attestation fails, as determined in step 3827 by the unimaged host server, the unimaged host server deletes the received image and other information and broadcasts a failure message within the distributed computing system, in step 3828. This, in turn, invokes various ameliorative actions within the distributed computing system to diagnose the failure and take steps to ensure that the distributed computing system is not further compromised by a hacked imaging entity or remote malicious entity that has managed to breach the distributed-computing-system' security measures. Otherwise, in step 3829, the unimaged host server assembles a complete image from the received image and decrypted unique-kernel portion and performs a system set up operation. In step 3830, the unimaged host server recomputes the cryptographic hash of the kernel to generate the hash value h' and uses the TPM-stored imaging-entity public key to verify the digital signature of the hash value received from the imaging entity. The hash value is subsequently used, by the host server, as a private identity known only the host server and the imaging entity. When verification fails, as determined in step 3831, a failure is broadcasts within the distributed computing system and the host server system shuts down, in step 3832. Otherwise, in step 3833, the host server uses the TPM to generate an AIK Key pair and record the state of the host server in the TPM PCR registers. In step 3834, the host server retrieves the owner key stored in the kernel and verifies that this key is a descendent of the imaging-entity key stored in the TPM. It may be a descendent of the imaging-entity key stored in the TPM since the imaging entity, as with other components of the distributed computing system, periodically change their identities, which are associated with their public/private encryption-key pair, to frustrate attempts by malicious entities could compromise the security of the distributed computing system. Periodic identify change is, in essence, analogous to the encryption-key-ratchet method discussed above with reference to FIG. 22. When the verification fails, as determined in step 3835, a failure message is broadcast within the distributed computing system and the host server shuts down, in step 3832. Otherwise, as shown in FIG. 38D, the host server collects environment information and metrics, encrypts the collected information and metrics with the host server's private key, and sends the encrypted information to the imaging entity in step 3840. In step 3841, the imaging entity receives the environment information from the host server and decrypts information to produce unencrypted information e'. In step 3842, the imaging entity compares the received environment information e' with the previously received environment information e. When the current environment information e' and the previously received environment information e are not identical, as determined in step 3843, the imaging entity notifies the computing facility in which the host server is located of the problem and may take additional remedial actions, in step 3844. Otherwise, the imaging entity enters an initial entry in the blockchain for the host, indicating that the imaging entity is the owner, in step 3845. As discussed above, the imaging entity, or another blockchain-maintenance node, may package the ownership information into a transaction for entry into the blockchain by a miner node. In certain implementations, the imaging entity may itself carry out miner-node actions, such as entering a block into the blockchain. In step 3846, the host server is placed in an available host pool for subsequent transfer to a management server. As discussed above, there is a significant lag time between initiating recordation of the ownership information in the blockchain and when the information is actually reliably stored in the blockchain. That lag time is a function of various different blockchain parameters, including the threshold number of subsequent blocks added to the blockchain prior to considering a block to be committed. Ownership of the host server cannot be transferred until the initial-imaging transaction, requested for storage in step 3845, has been reliably recorded within the blockchain. The initial-imaging transaction establishes a root ownership recordation for the host server within the blockchain, and every subsequent transfer of ownership is recorded in the blockchain to create a secure chain of ownership transfer for the host server. Therefore, at each point in time, there is a single owner or controller of the host server, and the ownership is securely recorded in the public ledger.

Figure 39A:
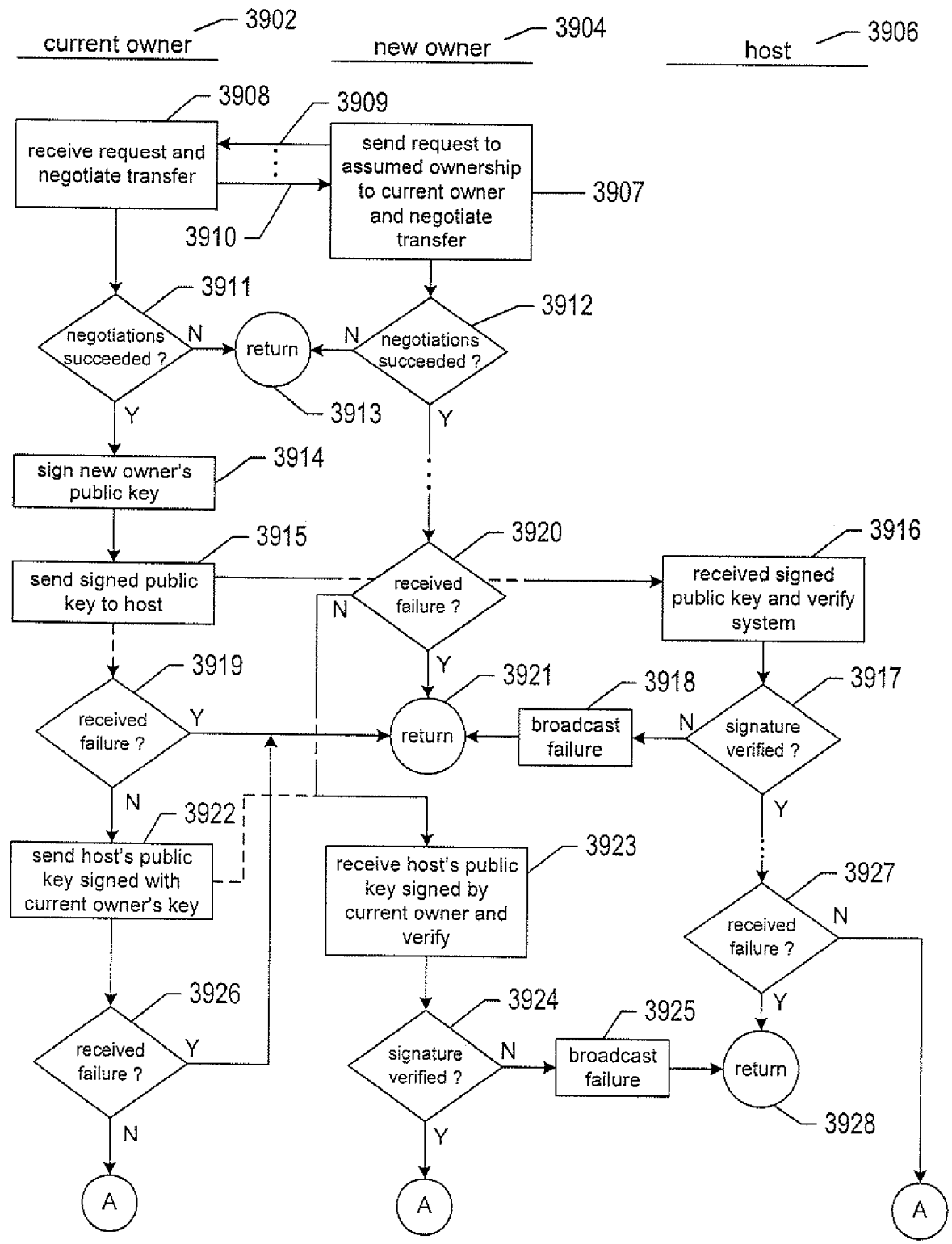
FIGS. 39A-D illustrate three-party a secure control-transfer method by which a current owner or controlling component transfers control of a computational entity or other resource within a distributed computing system to a new or subsequent owner or controlling component and records the control-transfer transaction in the blockchain.
Figure 39B:
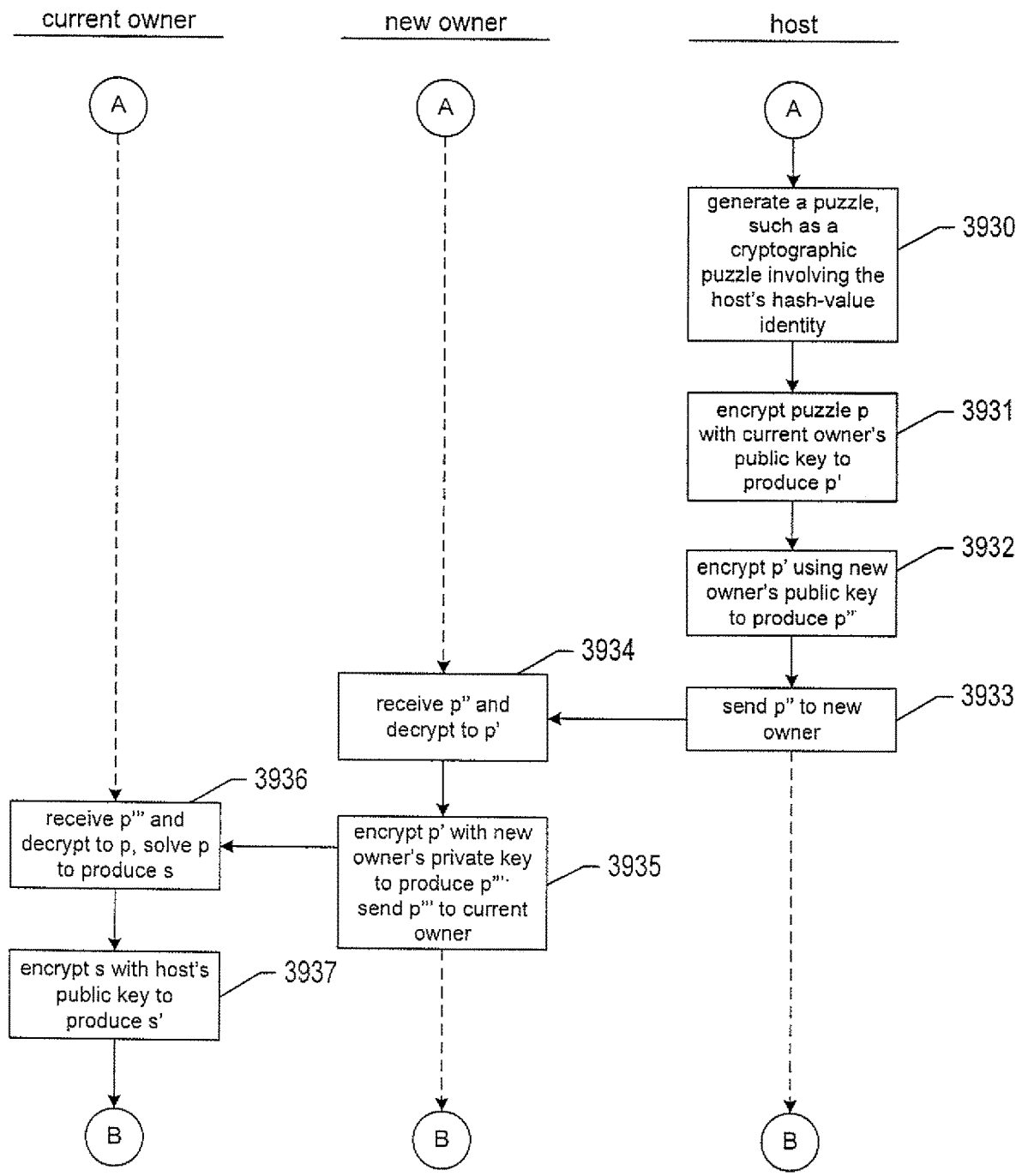
Figure 39C:
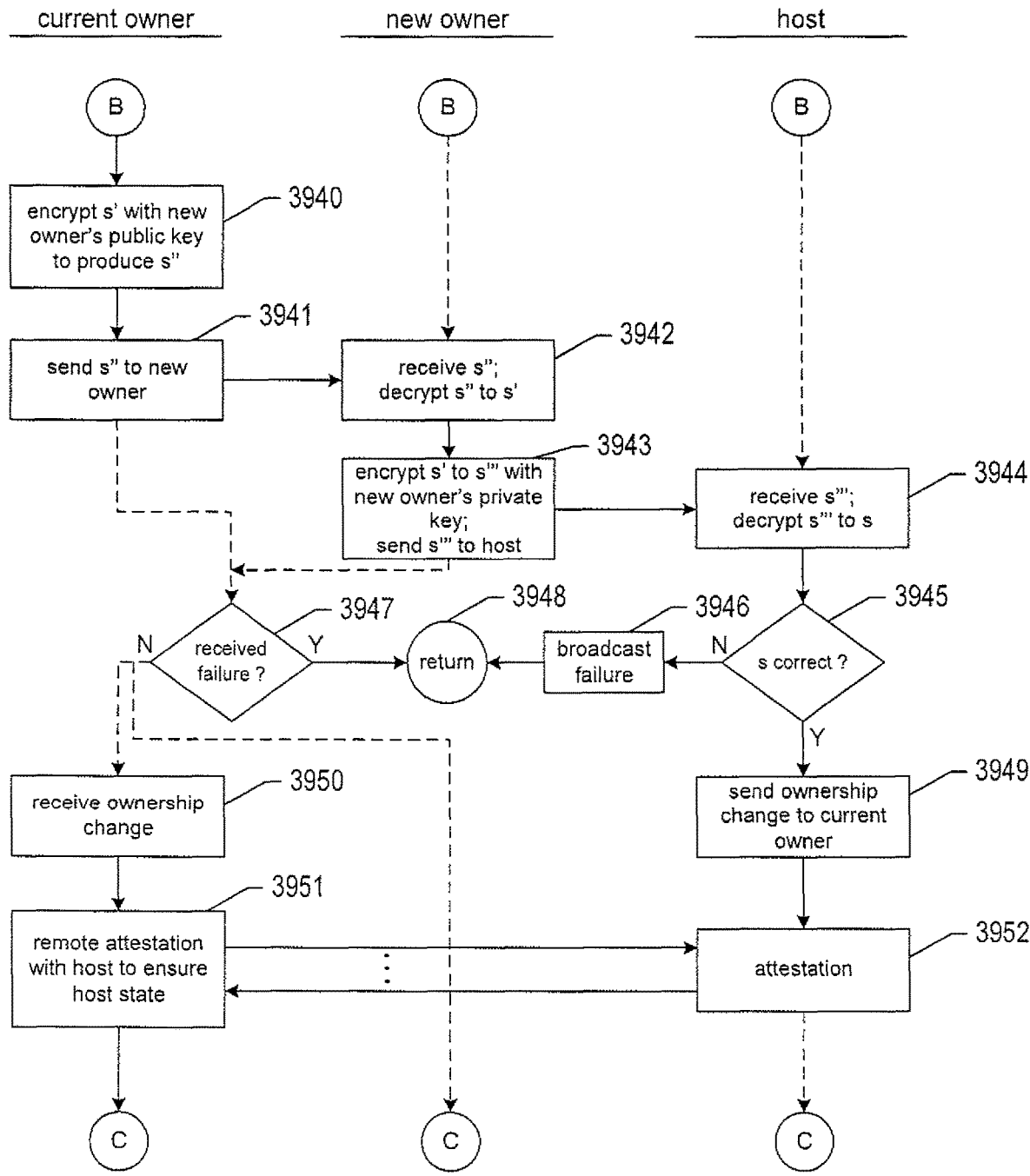
Figure 39D:
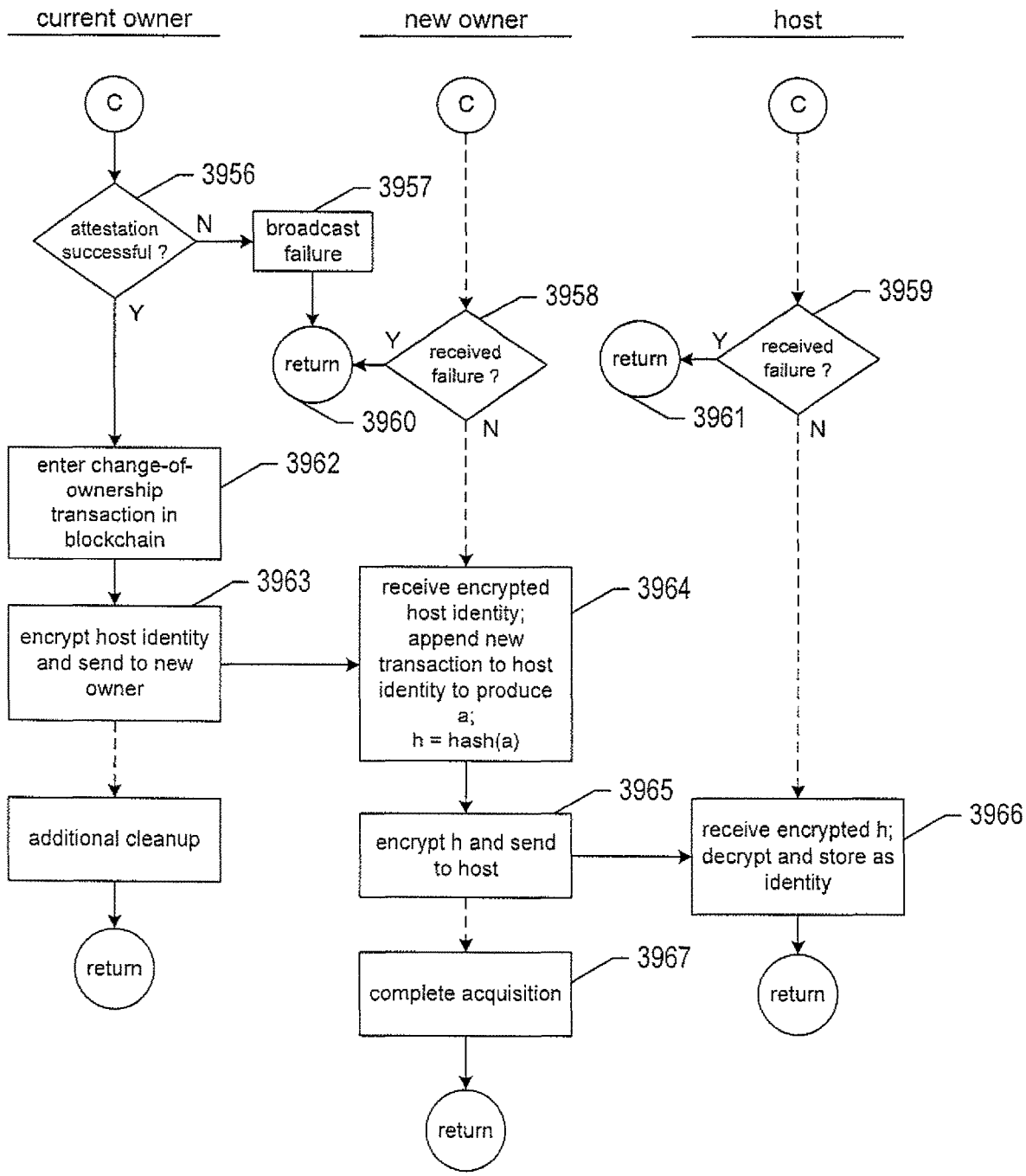

FIGS. 39A-D illustrate three-party a secure control-transfer method by which a current owner or controlling component transfers control of a computational entity or other resource within a distributed computing system to a new or subsequent owner or controlling component and records the control-transfer transaction in the blockchain. In FIGS. 39A-D, steps carried out by the current owner are shown in a left-hand column 3902, steps carried out by the new owner are shown in a center column 3904, and steps carried out by a host server, control of which is being transferred from the current owner to the new owner, are shown in a right-hand column 3906. The process begins, as shown in FIG. 39A, when the management server, seeking to become the new owner of the host server, sends a request to assume ownership to the current owner, in step 3907. The current owner receives the request in step 3908. As indicated by arrows 3909-3910, the new owner and current owner exchange messages to negotiate the ownership transfer. When the negotiations fail, as determined in steps 3911 and 3912, the process terminates, in step 3913. Otherwise, in step 3914, the current owner digitally signs the new owner's public key and sends the signed public key to the host server, in step 3915. The host server receives the signed public key, in step 3916, and verifies the signature. The host server maintains the current owner's public encryption key as a stored value within the kernel, and is thus able to decrypt encrypted messages sent by the current owner and verify the current owner's signature. When the signature is not verified, as determined in step 3917, a failure message is broadcast within the distributed computing system, in step 3918, and the failure message is detected by the current owner in step 3919 and the new owner in step 3920, as a result of which the process terminates in step 3921. Otherwise, in step 3922, the current owner sends the host's public key, signed with the current owner's private key, to the new owner. The new owner receives the signed host-server public key, in step 3923, and verifies the signature. When the signature is not verified, as determined in step 3924, a failure message is broadcast within the distributed computing system, in step 3925, which is detected in steps 3926 and 3927 by the current owner and host server, resulting in termination of the process, in steps 3928 and 3921. Otherwise, in step 3930 shown in FIG. 39E, the host server generates a cryptographic puzzle p, such as a cryptographic puzzle related to the host's hash-value-based private identity, maintained by the current owner. In step 3931, the host server encrypts the puzzle p with the current owner's public key to produce encrypted puzzle p'. Then, in step 3932, the host server encrypts encrypted puzzle p' with the new owner's public key to produce the doubly encrypted puzzle p". In step 3933, the host server sends the doubly encrypted puzzle p" to the new owner, who receives the doubly encrypted puzzle and decrypts the doubly encrypted puzzle to encrypted puzzle p' in step 3934. In step 3935, the new owner encrypts p' with its private key to produce p''' and sends the doubly encrypted puzzle p''' to the current owner, who, in step 3936, receives and decrypts the puzzle and solves the decrypted puzzle p to produce a solution s. Note that only the current owner is able to solve the cryptographic puzzle, since the cryptographic puzzle is designed to require information known only to the host server and the current owner. To this end, during ownership transfer, as discussed below, the hash-value identity of the host is updated by the new owner and securely shared with the host server so that the host server and new owner share a secret unknown to other components of the distributed computing system and unknown to any remote processor-controlled systems and devices. In step 3937, the current owner encrypts the solution s with the host's public key to produce encrypted solution s'. Then, as shown in FIG. 39C, the current owner encrypts encrypted solution s' with the new owner's public key to produce the doubly encrypted secret s", in step 3940. In step 3941, the current owner sends the doubly encrypted solution s" to the new owner, who receives the doubly encrypted solution s" and decrypts the doubly encrypted solution to the singly encrypted solutions' in step 3942. In step 3943, the new owner encrypts singly encrypted solution s' to s''' with the new owner's private key and sends the doubly encrypted solution s''' to the host server, which receives and decrypts the doubly encrypted solution in step 3944. When the solution cannot be decrypted, has been seen before, or is not correct, as determined in step 3945, the host server broadcasts a failure message within the distributed computing system, in step

3946, which is detected by the current and new owners in step 3947, resulting in termination of the process in step 3948. Otherwise, in step 3949, the host server sends an ownership-change confirmation to the current owner. The current owner receives the ownership-change confirmation in step 3950. In step 3951, the current owner initiates a remote attestation with the host server to ensure the state of the host server matches the state maintained by the current owner, and the attestation request is carried out by the host server in step 3952. When the remote attestation fails to successfully complete, as determined in step 3956 shown in FIG. 39D, a failure message is broadcast, in step 3957, within the distributed computing system, which is detected by the new owner and the host server in steps 3958 and 3959, resulting in termination of the process, in steps 3960 and 3961. Otherwise, the current owner enters a change-of-ownership transaction in the blockchain, in step 3962, and then, in step 3963, encrypts the host identity and sends the encrypted host identity to the new owner. In step 3964, the new owner receives encrypted host identity, appends the ownership-change transaction information to the host identity to produce a value a, and then computes a hash value h from the value a. In step 3965, the new owner encrypts the hash value h and sends the encrypted hash value to the host server. The host server receives the encrypted hash value in step 3966, decrypts the encrypted hash value, and stores the hash value as its new identity. Finally, in step 3967, the new owner completes the acquisition of control over the host server, which may involve additional message exchanges with the host server.

By carrying out the three-party secure control-transfer protocol, the secure transfer of ownership of the host server to the new owner transpires and is reliably recorded in the public blockchain ledger. This establishes a next link in the secure chain of control transfer for the host server.

Figure 40:
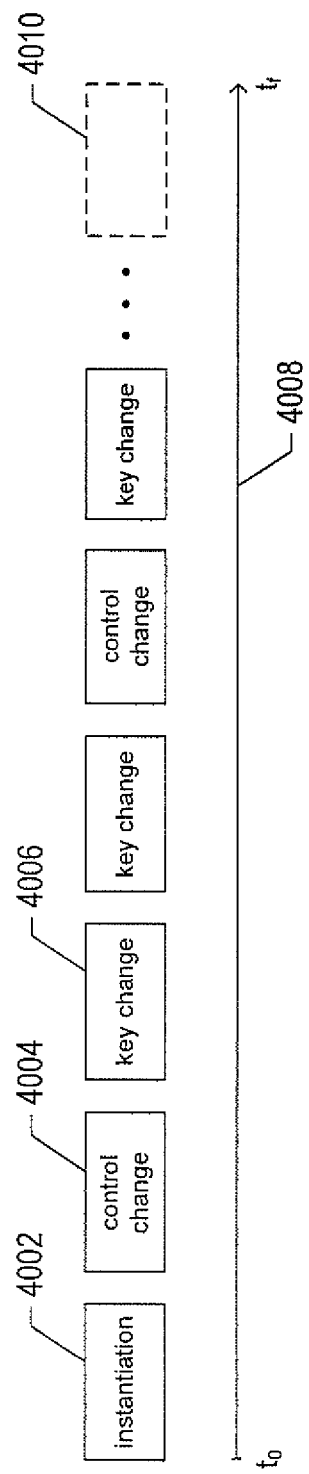
FIG. 40 illustrates the entries in the blockchain related to control of a particular host server, in the current example, and control of any other type of computational entity in other contexts.

FIG. 40 illustrates the entries in the blockchain related to control of a particular host server, in the current example, with similar entries added to the blockchain with respect to control transfers related to other types of computational entity in other contexts in which the currently disclosed methods and systems for secure transfer of control are employed. The first entry in the blockchain, as discussed above, is the initial entry generated by the imaging entity upon successful imaging of the host server 4002. Then, a series of control-change transactions, such as control-change transaction 4004, and key-change transactions, such as key-change transaction 4006, are recorded at subsequent times, represented by horizontal timeline 4008 in FIG. 40. Ultimately, there is a final recorded transaction 4010 which may, in certain implementations, be a host-server-termination transaction or, in other implementations, the last control change or key change carried out with respect to the host server. The key-change transactions record changes in the public/private encryption-key pair, the public key of which represents the public identity of the host server at any given point in time. These series of key changes may be implemented by an encryption-key-generation ratchet, similar to that discussed above with reference to FIG. 22, an encryption-key sequence implemented using a KDF function, similar to that discussed above with reference to FIG. 23, or an encryption-key double ratchet, similar to that discussed above with reference to FIG. 25. The key-change transactions may be carried out as part of a two-party secure transaction involving the host server and the current owner, in certain implementations, or may involve an additional third party, in other implementations.

As discussed above, the transaction description stored in a blockchain block includes an in field 3042 and an out field 3044, as shown in FIG. 30B. For both control-transfer transactions and key-change transactions, the in field stores the hash value of the preceding recorded transaction for the host server in the blockchain. For control-change transactions, the out field may contain an indication of the transaction type as well as an indication of the new owner of the host server, such as the new owner's public key. The out field for a key-change transaction may include the new public key for the host server as well as an indication of the transaction type.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. The secure control-transfer system may record additional types of transactions with respect to host servers or other computational entities that are passed between current owners or controllers and new owners or controllers. Any of a variety of different types of cryptographic methods may be employed to secure information exchange during transactions as well as to generate public identifiers for distributed-computing-system components. The secure control-transfer methods and systems to which the current document is directed rely both on secure control-transfer protocols and secure three-party control transfers as well as recordation of the control transfers in the reliable and generally uninhabitable and unalterable blockchain public ledger. In general, the currently disclosed methods and system can be used for secure control of any of many different types of resources within a distributed computing system, including host servers, as discussed above, but also including management servers, imagining entities, storage devices, network-communications devices, and other such resources.

The invention claimed is:

1. A distributed computing system comprising:
    multiple computer systems, each having one or more processors, one or more memories, one or more mass storage devices;
    a distributed blockchain data structure stored in at least a multi-computer-system subset of the multiple computer systems; and
    secure-control-transfer subsystems installed in the multiple computer systems that securely instantiate an uninstantiated resource within the distributed computing system by an instantiation component to generate an instantiated resource, establish initial control of the instantiated resource b the instantiation component, and record the initial control of the instantiated resource by the instantiation component in the distributed blockchain data structure, and securely transfer control of the instantiated resource within the distributed computing system from a current controlling component to a subsequent controlling component using a secure three-party control-transfer protocol and record the control-transfer transaction in the distributed blockchain data structure.

2. The distributed computing system of claim 1 wherein the instantiated resource includes:

a public identity comprising the public key of a public/private key pair, the private key of the public/private key pair securely stored within the instantiated resource; and a private identity known only to the resource and to a single component selected from an instantiation component and a controlling component.

3. The distributed computing system of claim 2 wherein a current owner of the instantiated resource securely stores the private identity of the resource.

4. The distributed computing system of claim 3 wherein securely transferring control of the instantiated resource within the distributed computing system from a current controlling component to a subsequent controlling component using a secure three-party control-transfer protocol further comprises:

receiving, by the current controlling component, a public encryption key for the subsequent controlling component;

sending, by the current controlling component, a verifiable public encryption key for the subsequent controlling component to the instantiated resource;

sending, by the current controlling component, a verifiable public encryption key of the instantiated resource to the subsequent controlling component;

generating a cryptographic puzzle, by the instantiated resource, and securely sending the cryptographic puzzle via the subsequent controlling component to the current controlling component;

securely receiving a solution to the cryptographic puzzle via the subsequent controlling component from the current controlling component; and when the received solution is correct, sending a control-change confirmation to the current controlling component by the instantiated resource.

5. The distributed computing system of claim 4 wherein sending, by the current controlling component, a verifiable public key further comprises digitally signing the public key.

6. The distributed computing system of claim 4 wherein the cryptographic puzzle can be solved by using secret information shared only by the instantiated resource and the current controlling component.

7. The distributed computing system of claim 4 wherein securely sending the cryptographic puzzle further comprises:

encrypting the cryptographic puzzle by the instantiated resource using the current controller component's private key to produce an encrypted cryptographic puzzle;

encrypting the encrypted cryptographic puzzle by the instantiated resource using the subsequent controlling component's private key to produce a doubly encrypted cryptographic puzzle;

sending the doubly encrypted cryptographic puzzle to the subsequent controlling component by the instantiated resource;

decrypting the doubly encrypted cryptographic puzzle by the subsequent controlling component to regenerate the encrypted cryptographic puzzle;

sending the encrypted cryptographic puzzle by the current controlling component to the current controlling component; and decrypting the encrypted cryptographic puzzle by the current controlling component to generate the cryptographic puzzle.

8. The distributed computing system of claim 4 wherein securely receiving the solution to the cryptographic puzzle via the subsequent controlling component from the current controlling component further comprises:

encrypting the solution of the cryptographic puzzle by the current controller component using the instantiated resource's private key to produce an encrypted solution;

encrypting the encrypted solution by the current controller component using the subsequent controlling component's private key to produce a doubly encrypted solution;

sending the doubly encrypted solution to the subsequent controlling component by the current controller component;

decrypting the doubly encrypted solution by the subsequent controlling component to regenerate the encrypted solution;

sending the encrypted solution by the current controlling component to the instantiated resource; and decrypting the encrypted solution by the instantiated resource.

9. The distributed computing system of claim 4 further comprising:

requesting remote attestation of the instantiated resource by the current controlling component;

securely sending the private identity of the instantiated resource by the current controlling component to the subsequent controlling component;

generating, by the subsequent controlling component, a new private identity for the instantiated resource; and sending, by the subsequent controlling component, the newly generated private identity for the instantiated resource to the instantiated resource.

10. The distributed computing system of claim 1 wherein the uninstantiated resource securely stores a public encryption key for one or more instantiation components of the distributed computing system, and an instantiation-request executable.

11. The distributed computing system of claim 10 wherein the uninstantiated resource is securely instantiated by:

requesting, by the uninstantiated resource, instantiation by an instantiation component of the distributed computing system by executing the instantiation-request executable to send an instantiation request to the instantiation component;

receiving the instantiation request b the instantiation component and storing information contained in the instantiation request;

preparing a unique executable and instantiation information by the instantiation component;

securely transmitting the unique executable and instantiation information to the uninstantiated resource by the instantiation component;

receiving and verifying the instantiation information by the uninstantiated resource;

installing and launching the unique executable by the uninstantiated resource to become the instantiated resource;

collecting and returning configuration information by the instantiated resource to the instantiation component;

verifying the returned configuration information by the instantiation component; and recording the instantiation and initial control of the instantiated resource by the instantiation component in the distributed blockchain data structure.

12. The distributed computing system of claim 11 wherein the instantiation request includes configuration information collected by the uninstantiated resource and encrypted using the instantiation-component public key and a public key of a public/private key generated by the uninstantiated resource that becomes the initial public identity of the instantiated resource.

13. The distributed computing system of claim 11 wherein the instantiation information includes a private identity for the instantiated resource generated from the unique executable.

14. The distributed computing system of claim 11 wherein securely transmitting the unique executable and instantiation information to the uninstantiated resource by the instantiation component further comprises;
  digitally signing a private identity included in the instantiation information;
  encrypting the unique executable and instantiation information by the instantiation component using the private key of the instantiation component;
  decrypting the encrypted unique executable and instantiation information by the uninstantiated resource using the public key of the instantiation component; and
  requesting remote attestation of the instantiation component by the uninstantiated resource.

15. The distributed computing system of claim 11 wherein verifying the instantiation information by the uninstantiated resource further comprises:
  computing a private identity from the received unique executable;
  verifying the digital signature of the received private identity from the instantiation component; and
  verifying that the computed private identity is identical to the computed private identity.

16. The distributed computing system of claim 11 wherein verifying the returned configuration information by the instantiation component further comprises:
  comparing the configuration information received in the instantiation request to the configuration information collected and returned by the instantiated resource; and
  when the configuration information received in the instantiation request is equivalent to the configuration information collected and returned by the instantiated resource, determining the returned configuration information to be verified.

17. The distributed computing system of claim 1 further comprising:
  periodically generating a new public/private encryption key by the instantiated resource; and
  recording the newly generated public encryption key by the instantiated resource in the distributed blockchain data structure.

18. The distributed computing system of claim 1 further comprising:
  periodically generating a new public/private encryption key by the instantiated resource; and
  recording the newly generated public encryption key by the instantiated resource in the distributed blockchain data structure.

19. A method for securely establishing and maintaining control of resources in a distributed computing system that includes multiple computer systems, each having one or more processors, one or more memories, one or more mass storage devices, the method comprising:
  establishing and maintaining a distributed blockchain data structure stored in at least a multi-computer-system subset of the multiple computer systems;
  securely instantiating an uninstantiated resource within the distributed computing system by an instantiation component to generate an instantiated resource, establishing initial control of the instantiated resource by the instantiation component, and recording the initial control of the instantiated resource by the instantiation component in the distributed blockchain data structure, and
  securely transferring control of the instantiated resource within the distributed computing system from a current controlling component to a subsequent controlling component using a secure three-party control-transfer protocol and record the control-transfer transaction in the distributed blockchain data structure.

20. Computer instructions, encoded in a physical storage device, that, when executed by multiple computer systems within a distributed computer system having the multiple computer systems, each having one or more processors, one or more memories, and one or more mass storage devices and having a distributed blockchain data structure stored in at least a multi-computer-system subset of the multiple computer systems, control the distributed computer system to
  securely instantiate an uninstantiated resource within the distributed computing system by an instantiation component to generate an instantiated resource, establish initial control of the instantiated resource by the instantiation component, and record the initial control of the instantiated resource by the instantiation component in the distributed blockchain data structure, and
  securely transfer control of the instantiated resource within the distributed computing system from a current controlling component to a subsequent controlling component using a secure three-party control-transfer protocol and record the control-transfer transaction in the distributed blockchain data structure.

* * * * *